US011723301B2

(12) United States Patent
Schaffert et al.

(10) Patent No.: US 11,723,301 B2
(45) Date of Patent: Aug. 15, 2023

(54) TRAILING ARM DEVICE AND ASSEMBLY WITH PARALLEL LINKAGE

(71) Applicant: SCHAFFERT MANUFACTURING COMPANY, INC., Indianola, NE (US)

(72) Inventors: Paul E. Schaffert, Indianola, NE (US); Kris Schaffert, Indianola, NE (US); Matthew Hornung, Dodge City, KS (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 351 days.

(21) Appl. No.: 17/068,652

(22) Filed: Oct. 12, 2020

(65) Prior Publication Data

US 2021/0161063 A1 Jun. 3, 2021

Related U.S. Application Data

(63) Continuation of application No. 15/415,755, filed on Jan. 25, 2017, now Pat. No. 10,798,870.
(Continued)

(51) Int. Cl.
*A01C 7/06* (2006.01)
*A01C 5/06* (2006.01)
*A01C 7/20* (2006.01)

(52) U.S. Cl.
CPC .............. *A01C 7/06* (2013.01); *A01C 5/068* (2013.01); *A01C 7/208* (2013.01)

(58) Field of Classification Search
CPC ........... A01C 7/06; A01C 5/068; A01C 7/208; A01C 7/00; A01C 5/066; A01C 5/06; A01C 5/00; A01C 7/20
See application file for complete search history.

(56) References Cited

U.S. PATENT DOCUMENTS 13,683 A 10/1855 McCormick
35,510 A 6/1862 Haven
(Continued)

FOREIGN PATENT DOCUMENTS

AU 2017399124 A1 8/2019
CA 3052323 A1 8/2018
(Continued)

OTHER PUBLICATIONS

Author Unknown, "1200 Series Advanced Seed Meter Planters," Case lil, 2005, 36 pages.
(Continued)

*Primary Examiner* — Christopher J. Novosad
(74) *Attorney, Agent, or Firm* — Dorsey & Whitney LLP

(57) ABSTRACT

A trailing arm assembly includes a frame bracket attachable to a planter towing frame, a first frame, and a four bar parallel linkage connecting the frame bracket and the first frame with a first pivot and a second pivot on the frame bracket and a first pivot and a second pivot on the first frame. The trailing arm assembly also includes an adjustable biasing member extending from the parallel linkage to the frame bracket. The parallel linkage is connected between the first frame and the frame bracket such that the parallel linkage maintains a parallel orientation of the first frame. The adjustable biasing member is adjustably connected to a portion of the parallel linkage.

17 Claims, 32 Drawing Sheets

Related U.S. Application Data

(60) Provisional application No. 62/395,265, filed on Sep. 15, 2016, provisional application No. 62/326,489, filed on Apr. 22, 2016, provisional application No. 62/286,906, filed on Jan. 25, 2016.

(56) References Cited

U.S. PATENT DOCUMENTS

| | | |
|---|---|---|
| 122,299 A | 12/1871 | Wight et al. |
| 166,597 A | 8/1875 | Evans |
| 176,708 A | 4/1876 | Templin |
| 203,207 A | 4/1878 | Springer |
| 211,601 A | 1/1879 | Springer |
| 252,265 A | 1/1882 | Scofield |
| 288,661 A | 11/1883 | Purdy et al. |
| 308,327 A | 11/1884 | Runstetler |
| 322,841 A | 7/1885 | Miskimen |
| 555,897 A | 3/1896 | Crane |
| 700,109 A | 5/1902 | Wilkinson |
| 889,947 A | 6/1908 | Miller |
| 907,278 A | 12/1908 | Hammonds |
| 909,137 A | 1/1909 | Bellerive |
| 952,447 A | 3/1910 | Hammonds |
| 974,247 A | 11/1910 | Douglass et al. |
| 1,059,534 A | 4/1913 | Forrest |
| 1,377,073 A | 5/1921 | Amon |
| 1,473,297 A | 11/1923 | Knight |
| 1,483,789 A | 2/1924 | Earhart |
| 1,498,378 A | 6/1924 | Irwin |
| 2,039,166 A | 4/1936 | Karl |
| 2,061,694 A | 11/1936 | Cuddigan |
| 2,401,577 A | 6/1946 | Melling |
| 2,533,374 A | 12/1950 | Hyland |
| 2,601,591 A | 6/1952 | Colombo |
| 2,668,490 A | 2/1954 | Oehler et al. |
| 2,805,486 A | 9/1957 | Barrett |
| 2,849,969 A | 9/1958 | Taylor |
| 2,872,883 A | 2/1959 | Padrick |
| 2,912,055 A | 11/1959 | Cornelius et al. |
| 2,991,836 A | 7/1961 | Le Roy |
| 3,115,192 A | 12/1963 | Bushmeyer |
| 3,173,498 A | 3/1965 | Harold |
| 3,177,830 A | 4/1965 | Zimmerman |
| 3,212,585 A | 10/1965 | Bezzerides |
| 3,306,371 A | 2/1967 | Eugene |
| 3,336,885 A | 8/1967 | Lebow |
| 3,599,729 A | 8/1971 | Greemore |
| 3,666,572 A | 5/1972 | Nakagawa et al. |
| 3,734,201 A | 5/1973 | Zaun |
| 3,895,589 A | 7/1975 | Garner et al. |
| 4,037,755 A | 7/1977 | Reuter |
| 4,070,974 A | 1/1978 | Stacy, Jr. |
| 4,108,089 A | 8/1978 | van der Lely |
| 4,148,267 A | 4/1979 | Bennett et al. |
| 4,253,412 A | 3/1981 | Hogenson |
| 4,276,836 A | 7/1981 | Pust |
| 4,294,181 A | 10/1981 | Smith |
| 4,296,670 A * | 10/1981 | Northup .............. F41A 25/20 89/43.01 |
| 4,373,455 A | 2/1983 | Friggstad |
| 4,398,478 A | 8/1983 | Frase et al. |
| 4,407,207 A | 10/1983 | Dreyer |
| 4,542,705 A | 9/1985 | Orth |
| 4,565,141 A | 1/1986 | Kopecky |
| 4,580,507 A | 4/1986 | Dreyer et al. |
| 4,607,581 A | 8/1986 | Kopecky |
| 4,628,841 A | 12/1986 | Powilleit |
| 4,671,193 A | 6/1987 | States |
| 4,674,419 A | 6/1987 | Kopecky |
| 4,744,316 A | 5/1988 | Lienemann et al. |
| 4,819,737 A | 4/1989 | Frase |
| 4,834,189 A | 5/1989 | Peterson et al. |
| 4,858,698 A | 8/1989 | Williamson et al. |
| D305,337 S | 1/1990 | Plummer |
| 4,911,090 A | 3/1990 | Schimke |
| 5,000,270 A | 3/1991 | Phillips |
| 5,078,528 A | 1/1992 | Schmidt |
| 5,092,255 A | 3/1992 | Long et al. |
| 5,341,754 A | 8/1994 | Winterton |
| 5,361,848 A | 11/1994 | Fleischer et al. |
| 5,375,542 A | 12/1994 | Schaffert |
| 5,398,771 A | 3/1995 | Hornung et al. |
| 5,419,402 A | 5/1995 | Heintzman |
| 5,425,318 A | 6/1995 | Keeton |
| 5,443,023 A | 8/1995 | Carroll |
| 5,497,836 A | 3/1996 | Groff |
| 5,517,932 A | 5/1996 | Ott et al. |
| D377,356 S | 1/1997 | Bruns |
| 5,626,196 A | 5/1997 | Hughes |
| 5,628,372 A | 5/1997 | Creyke |
| 5,640,915 A | 6/1997 | Schaffert |
| 5,645,000 A | 7/1997 | Carroll |
| 5,662,173 A | 9/1997 | Blesing |
| 5,673,638 A | 10/1997 | Keeton |
| D386,191 S | 11/1997 | Bruns |
| 5,730,074 A | 3/1998 | Peter |
| 5,732,780 A | 3/1998 | Nikkel et al. |
| D396,863 S | 8/1998 | Bruns |
| 5,852,982 A | 12/1998 | Peter |
| 5,884,711 A | 3/1999 | Shoup |
| 5,896,932 A | 4/1999 | Bruns et al. |
| 5,904,107 A | 5/1999 | Kester |
| 5,918,557 A | 7/1999 | Schaffert |
| 5,970,891 A | 10/1999 | Schlagel |
| 5,996,514 A | 12/1999 | Arriola et al. |
| 6,082,274 A | 7/2000 | Peter |
| 6,082,275 A | 7/2000 | Schaffert |
| 6,119,608 A | 9/2000 | Peterson et al. |
| 6,148,747 A | 11/2000 | Deckler et al. |
| D440,985 S | 4/2001 | Noonan et al. |
| 6,209,466 B1 | 4/2001 | Wodrich |
| 6,220,191 B1 | 4/2001 | Peter |
| 6,283,050 B1 | 9/2001 | Schaffert |
| 6,314,897 B1 | 11/2001 | Hagny |
| 6,321,667 B1 | 11/2001 | Shoup |
| 6,453,832 B1 | 9/2002 | Schaffert |
| 6,530,334 B2 | 3/2003 | Hagny |
| 6,640,732 B2 | 11/2003 | Prairie et al. |
| 6,763,773 B2 | 7/2004 | Schaffert |
| 6,918,343 B2 | 7/2005 | Kester |
| 7,121,216 B2 | 10/2006 | Schaffert |
| 7,246,563 B2 | 7/2007 | Kester |
| 7,322,302 B1 | 1/2008 | Reidhar |
| 7,360,495 B1 | 4/2008 | Martin |
| 7,410,005 B2 | 8/2008 | Lung et al. |
| 7,520,338 B2 | 4/2009 | Stokes |
| D594,477 S | 6/2009 | Dawson et al. |
| 7,552,689 B2 | 6/2009 | Schaffert |
| 7,581,503 B2 | 9/2009 | Martin |
| D611,507 S | 3/2010 | Martin |
| 7,707,952 B2 | 5/2010 | Schaffert |
| 7,730,961 B2 | 6/2010 | Ward et al. |
| 7,975,629 B1 | 7/2011 | Martin |
| 8,047,301 B2 | 11/2011 | Friggstad et al. |
| D663,326 S | 7/2012 | Allensworth et al. |
| 8,267,021 B2 | 9/2012 | Mariman et al. |
| 8,291,998 B1 | 10/2012 | Berg et al. |
| 8,333,161 B2 | 12/2012 | Arnett et al. |
| 8,343,291 B1 * | 1/2013 | Loen .............. B32B 41/00 156/324 |
| 8,356,563 B2 | 1/2013 | Schaffert et al. |
| 8,359,988 B2 | 1/2013 | Bassett |
| 8,397,612 B2 | 3/2013 | Koplin et al. |
| 8,544,398 B2 | 10/2013 | Bassett |
| 8,555,798 B2 | 10/2013 | Friggstad et al. |
| D699,267 S | 2/2014 | Nelson |
| 8,863,857 B2 | 10/2014 | Bassett |
| 8,910,581 B2 | 12/2014 | Bassett |
| 8,910,582 B2 | 12/2014 | Mariman et al. |
| 8,939,095 B2 | 1/2015 | Freed |
| D727,975 S | 4/2015 | Brockway |
| D727,976 S | 4/2015 | Brockway |
| 9,204,590 B2 | 12/2015 | Schaffert et al. |
| 9,232,689 B2 | 1/2016 | Trevino et al. |

(56) References Cited

U.S. PATENT DOCUMENTS

| | | | |
|---|---|---|---|
| 9,365,996 | B2 | 6/2016 | Brockway |
| 9,516,803 | B1 | 12/2016 | Rosenboom |
| 9,681,599 | B2 | 6/2017 | Whalen et al. |
| 10,060,467 | B2 | 8/2018 | Schaffert et al. |
| D844,675 | S | 4/2019 | Schaffert |
| 10,383,274 | B2 | 8/2019 | Whalen et al. |
| 10,624,252 | B2 | 4/2020 | Nance |
| D883,345 | S | 5/2020 | Schaffert |
| 10,798,870 | B2 | 10/2020 | Schaffert |
| 11,477,931 | B2 | 10/2022 | Hake et al. |
| 2002/0078869 | A1 | 6/2002 | Brummelhuis |
| 2003/0051650 | A1 | 3/2003 | Engelke et al. |
| 2005/0072344 | A1 | 4/2005 | Kester |
| 2005/0155536 | A1 | 7/2005 | Wendte et al. |
| 2007/0113763 | A1 | 5/2007 | Schaffert |
| 2007/0278272 | A1 | 12/2007 | Fast |
| 2008/0011208 | A1 | 1/2008 | Martin |
| 2008/0066662 | A1 | 3/2008 | Hesla |
| 2008/0257237 | A1 | 10/2008 | Friesen et al. |
| 2008/0303238 | A1 | 12/2008 | Fighter |
| 2009/0000796 | A1 | 1/2009 | Cooper et al. |
| 2009/0056962 | A1 | 3/2009 | Martin et al. |
| 2009/0084295 | A1 | 4/2009 | Schaffert |
| 2009/0235853 | A1 | 9/2009 | Schaffert |
| 2011/0155031 | A1 | 6/2011 | Arnett et al. |
| 2012/0048160 | A1 | 3/2012 | Adams et al. |
| 2012/0210919 | A1 | 8/2012 | Van et al. |
| 2012/0210920 | A1 | 8/2012 | Bassett |
| 2012/0241181 | A1 | 9/2012 | Horsch |
| 2012/0325133 | A1 | 12/2012 | Whalen et al. |
| 2013/0074747 | A1 | 3/2013 | Schaffert et al. |
| 2013/0160684 | A1 | 6/2013 | Whalen et al. |
| 2013/0263767 | A1 | 10/2013 | Trevino et al. |
| 2014/0033958 | A1 | 2/2014 | Bassett |
| 2014/0116735 | A1 | 5/2014 | Bassett |
| 2015/0075825 | A1 | 3/2015 | Dufty |
| 2016/0014951 | A1 | 1/2016 | Stark et al. |
| 2016/0050837 | A1 | 2/2016 | Schaffert et al. |
| 2016/0106025 | A1 | 4/2016 | Nelson et al. |
| 2016/0120096 | A1 | 5/2016 | Patwardhan et al. |
| 2017/0000006 | A1 * | 1/2017 | Raetzman ............ A01B 49/06 |
| 2017/0208736 | A1 | 7/2017 | Schaffert et al. |
| 2019/0271356 | A1 | 9/2019 | Schaffert et al. |
| 2019/0364747 | A1 | 12/2019 | Freeman |
| 2020/0396894 | A1 | 12/2020 | Radtke et al. |
| 2021/0301863 | A1 | 9/2021 | Schaffert et al. |
| 2022/0078966 | A1 | 3/2022 | Schaffert et al. |
| 2022/0240439 | A1 | 8/2022 | Schaffert |

FOREIGN PATENT DOCUMENTS

| | | | |
|---|---|---|---|
| DE | 3321490 A1 | 12/1984 | |
| DE | 3441610 A1 | 5/1986 | |
| DE | 4235389 A1 | 3/1994 | |
| EP | 2055509 A1 * | 5/2009 | ........... B60G 17/005 |
| EP | 1964459 B1 | 12/2011 | |
| GB | 2572309 A | 9/2019 | |
| WO | 2018148776 A1 | 8/2018 | |

OTHER PUBLICATIONS

Kinze, "3000 Series Kinze Planters," 2003, pp. 3-6 and 12.
White Planters "8000 Series Planters: Simply Advanced," 2001, pp. 13-15.
Monosem, "Brochure: The Precision Vacuum Planter, NG Plus Series," ATI Inc., Lenexa, Kansas, at least as early as Dec. 21, 2007, 10 pages.
Author Unknown , "Changing Planting Depth," at least as early as Dec. 21, 2007, 3 pages.
Yetter Profitable Solutions, "Cost-Effective Solutions for Real-World Needs", at least as early as Dec. 21, 2007, 29 pages.
Dawn Equipment Co., "Dawn 1572/1500 Coulter Combo", Jul. 28, 2004, 2 pages.
Dawn Equipment Co., "Dawn Curvtine™ Closing Wheel", 1997, 2 pages.
Dawn Equipment Co., "Dawn Trashwheels Row Cleaner," at least as early as Dec. 21, 2007, 1 page.
Schaffert MFG. Co., Inc., "Ferti-Placer," at least as early as Dec. 21, 2007, 2 pages.
Groff AG Improvements, LLC, Brochure: "Groff AG Improvements, LLC," at least as early as Dec. 21, 2007, 4 pages.
Hawkins Manufacturing Inc., Information Sheet entitled "Hawkins Manufacturing Inc.," at least as early as 2002, 1 page.
Author Unknown , "Heavy-Duty Coulter," at least as early as Dec. 21, 2007, 3 pages.
Precision Planting, "Keeton Seed Firmer: One simple step can boost your corn yields by 6 bushels," http://precision_planting.com/html/keeton.html, at least as early as Dec. 30, 2000, 1 page.
J & K Enterprises , "Keeton Seed Firmer," 1994, 2 pages.
Precision Planting, "Keeton Seed Firmer, A Simple Solution to Precision Seed Placement," at least as early as Apr. 9, 2001, 4 pages.
Author Unknown , Photos Labeled "Photo A" and "Photo B", Oct. 17, 2007, 1 page.
Hawkins Manufacturing Inc., "Planter Fertilizer Attachments: The Planter "N" Forcer Has These Advantages," online product information description retrieved from http://www.hawkinsmfg.com/attachments.htm on Dec. 9, 2012, 2 pages.
Hawkins Manufacturing Inc., "Planter Fertilizer Attachments," at least as early as Dec. 21, 2007, 4 pages.
Author Unknown , "Seed to Soil Inforcer," Seed Flap, Spring 1995, 1 page.
Sunco, "Sunco Saber Tooth Trash Discs: Effectively Moves Trash in All Conditions!," at least as early as Dec. 21, 2007, 2 pages.
Sunco, "Sunco Nutri Mate II: Your Solution for Accurate Starter Fertilizer Placement," at least as early as Dec. 21, 2007, 2 pages.
Author Unknown, "Tine-Tooth Row Tillage Attachment," at least as early as Dec. 21, 2007, 9 pages.
M & J Cotton Farms, Inc., "Tube Alignment Brackets," at least as early as Oct. 30, 1995, 1 page.
Yetter Profitable Solutions, "We Know It's All About Strong Roots," at least as early as Dec. 21, 2007, pp. 1-29.
Great Plains MFG., "Yield-Pro Planters: Unsurpassed in form, function and safety," at least as early as Dec. 21, 2007, pp. 4, 5 and 10.
Great Plains MFG., "Yield-Pro Planters: Yield increasing row spacing options coupled with best in class productivity and accuracy," at least as early as Dec. 21, 2007, 3 pages.
Finck, "Where to start with starter fertilizer," Farm Journal, Jan. 1996, pp. 15-16.
Prosecution Document, Application as filed, U.S. Appl. No. 13/428,922, filed Mar. 23, 2012, 136 pages.
Prosecution Document, Application as filed, U.S. Appl. No. 13/646,507, filed Oct. 5, 2012, 126 pages.
Agco, Tye, "Parts Catalog, 2015/2020 Rice and Soybean Drill EFF. S/N K-6-1367-10-RD," Jun. 1996, Form No. 79017760, Litho in U.S.A., 3 pages.

* cited by examiner

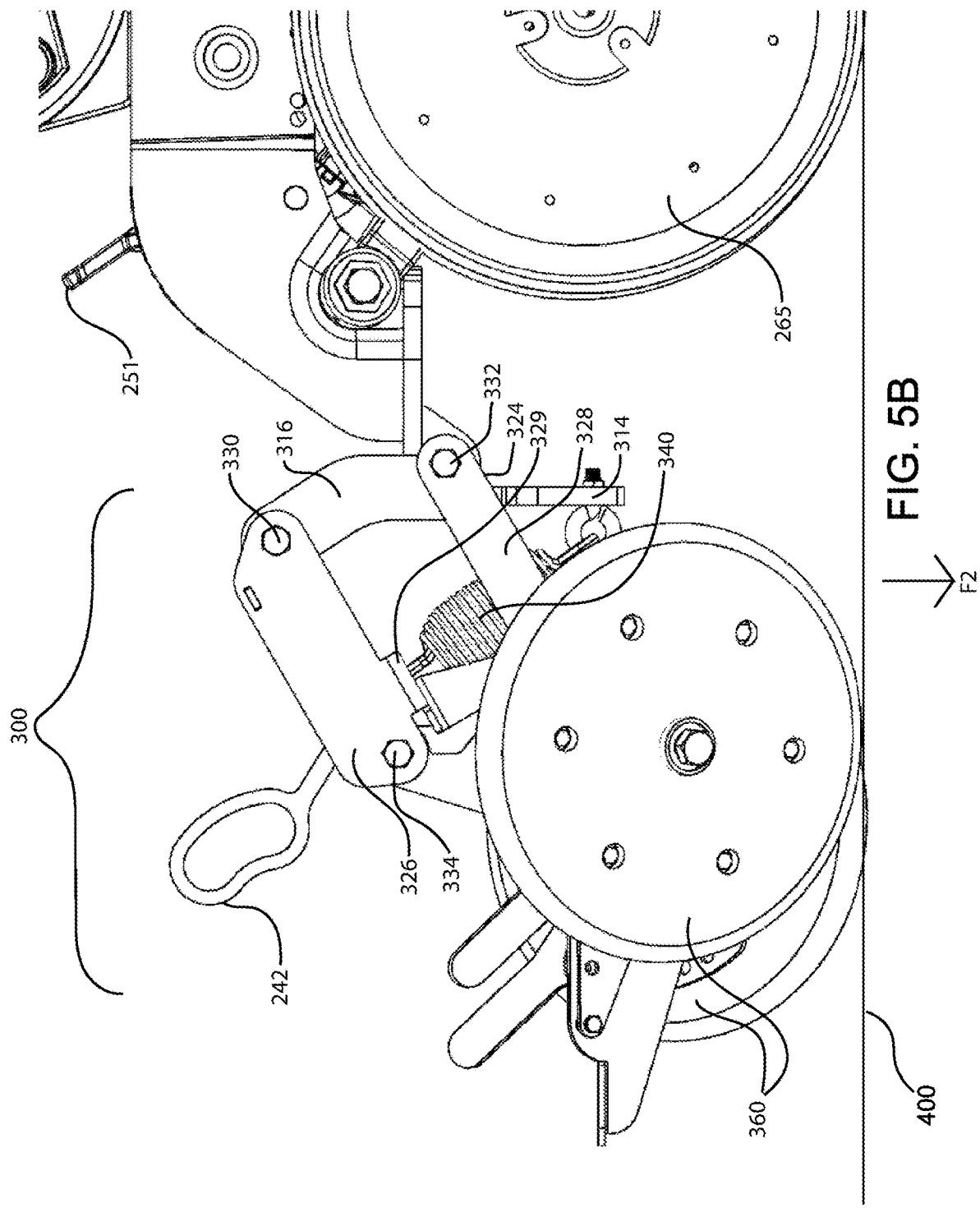

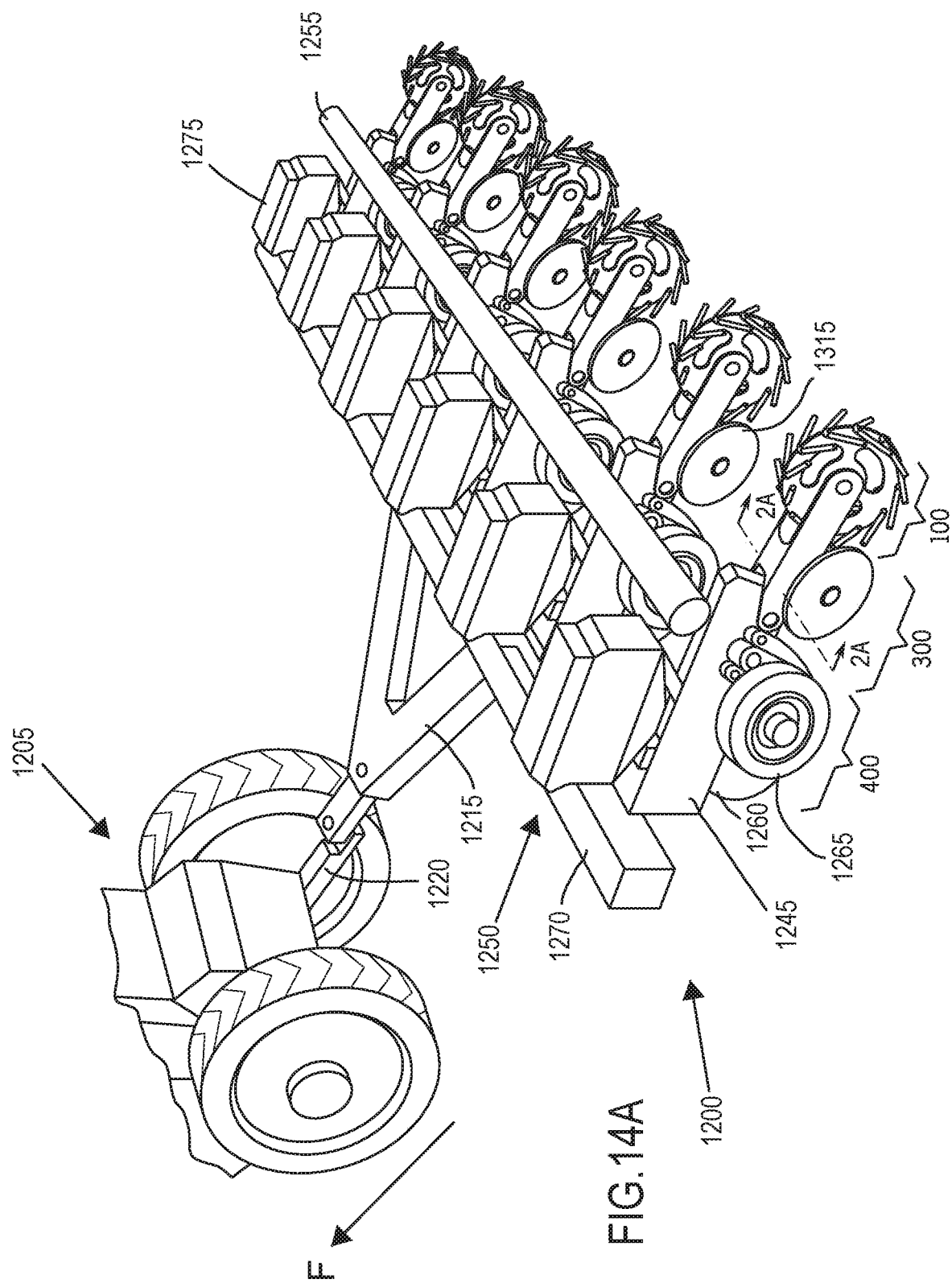

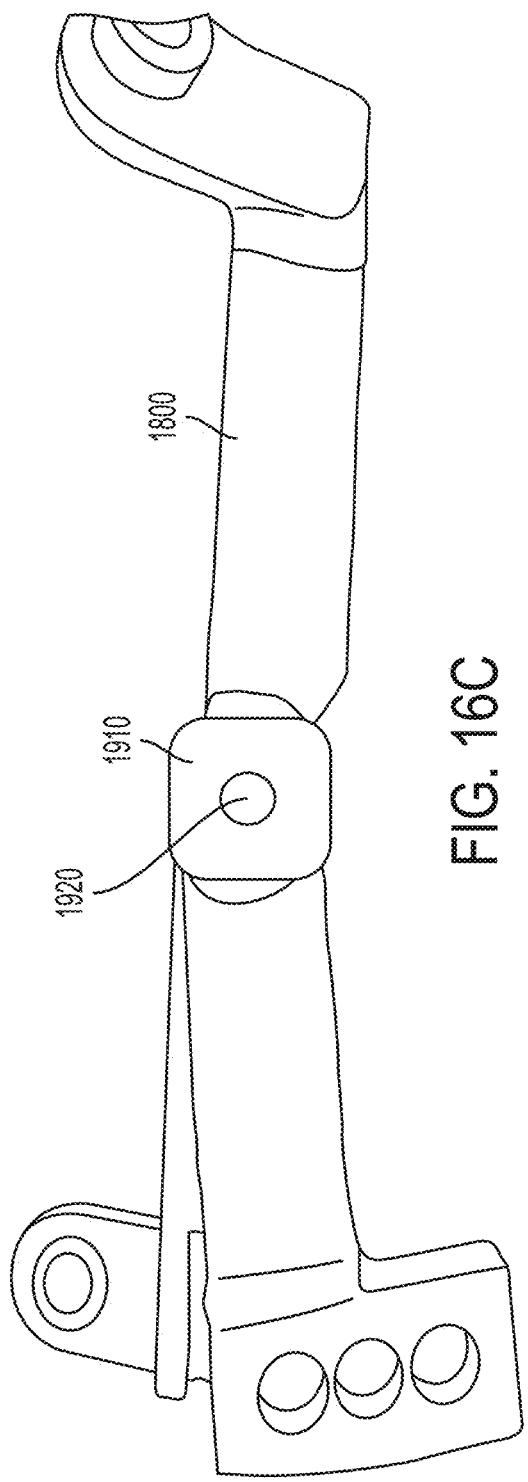
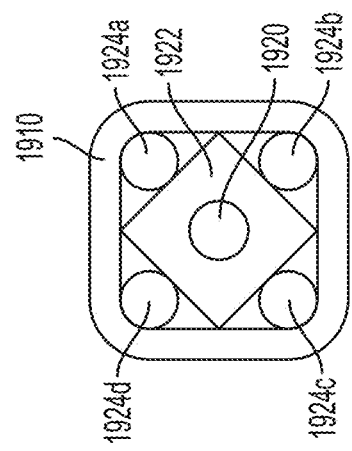
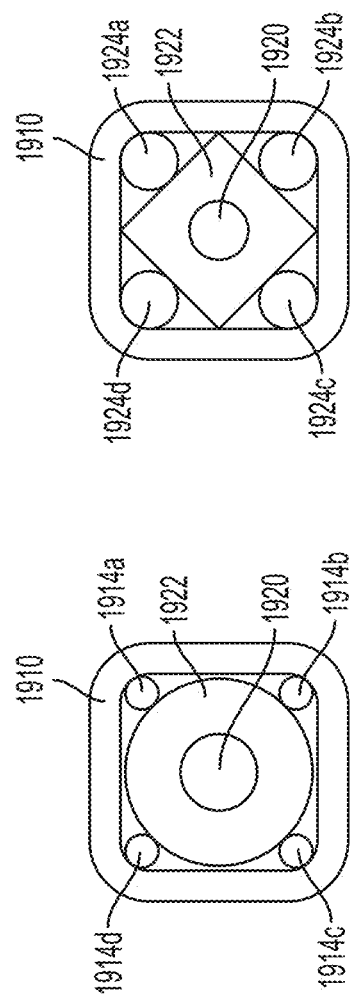
FIG. 16C
FIG. 16E
FIG. 16D

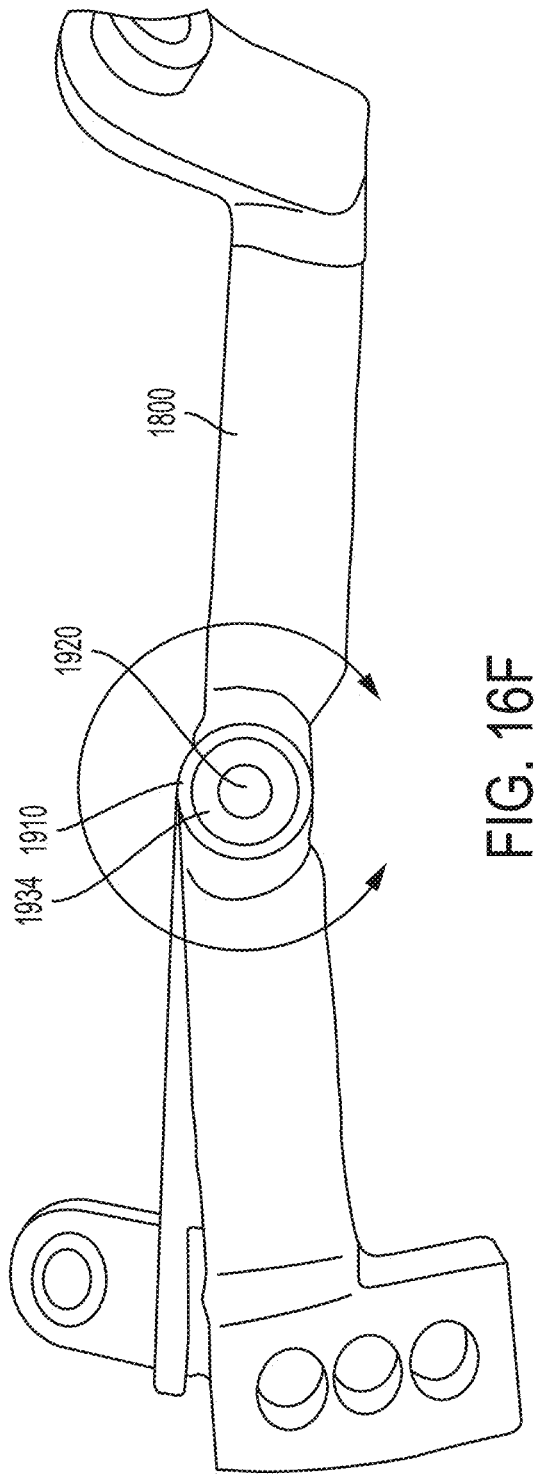
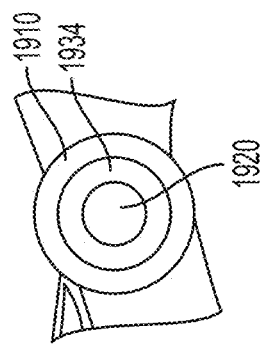
FIG. 16F
FIG. 16G

TRAILING ARM DEVICE AND ASSEMBLY WITH PARALLEL LINKAGE

CROSS-REFERENCE TO RELATED APPLICATIONS

This application is a continuation application of U.S. Non-Provisional application No. 15/415,755 filed 25 Jan. 2017, now U.S. Pat. No. 10,798,870, issued 13 Oct. 2020, entitled "Trailing Arm Device and Assembly with Parallel Linkage," which claims priority to U.S. Provisional Application No. 62/286,906 filed 25 Jan. 2016 entitled "Trailing Arm Device and Assembly With Parallel Linkage," and U.S. Provisional Application No. 62/326,489 filed 22 Apr. 2016 entitled "Trailing Arm Device and Assembly With Parallel Linkage," and U.S. Provisional Application No. 62/395,265 filed 15 Sep. 2016 entitled "Trailing Arm Device and Assembly With Parallel Linkage," each of which is hereby incorporated by reference herein in their respective entireties.

TECHNICAL FIELD

The technical field relates to agricultural seed planters and drills. More specifically, the technical field relates to parallel linkage-connecting mechanisms between opening assemblies and closing assemblies on planters and drills.

BACKGROUND

Agricultural seed planting is typically accomplished by multi-row planters. Each planter may include multiple row units adapted for opening a seed furrow, depositing seeds within the furrow, and closing the seed furrow around the seeds. In some cases, each row unit of the planter may also open a fertilizer furrow adjacent to each seed furrow, deposit liquid fertilizer in each fertilizer furrow, and close each fertilizer furrow.

Some planters are equipped or retrofitted to be equipped with fertilizer depositing equipment (e.g., fertilizer furrow opener discs and fertilizer deposit tubes) located on a leading or front side of the planter. Planters so configured can have problems in fields with moist or wet soil. Specifically, disturbing the soil with the fertilizer equipment located in front of the planter gauge wheels can cause the moist or wet soil to accumulate on the gauge wheels. The soil accumulation increases the effective diameters of the gauge wheels and causes the planter to run too shallow with respect to the depositing of the seed in the seed furrows.

Planters are increasingly used in no-till situations, resulting in the planter traversing fields with substantial deviation in the field surface and a substantial amount of obstructions (e.g., debris, clods, stubble, old furrows, etc.). Furthermore, in certain Midwest farm areas, ditches must be plowed in fields between planting seasons to facilitate the drainage of spring showers from the fields. Most planters have proven ineffective in such rough field surface conditions. It is not unusual for the use of planters in rough field conditions to result in seed depths that radically range between too deep and too shallow. Also, it is not unusual for the use of planters in such field conditions to result in the planter components being damaged.

Traditional closing assemblies use standard swing arm tail sections, which can be found on many of the planters built today. But, these swing arm tail sections have a limited amount of travel up and down (roughly 4") throughout full movement when planting. These tail sections are limited when there are ditches to cross or terraces to plant over, as the amount of travel is limited to 2" both ways of center. Sometimes this isn't enough as it gives poor seed to soil contact by not closing the seed V properly or leaving weeds on top of the ground. Whenever the press wheels flex up the contact points on the press wheels get wider causing them to be toe out and they tend to over cover the width of the seed V. When the press wheels go down past center they under cover resulting in toe in, which causes the seed V to not close properly. Also when the wheels max out, the wheels on the top side can raise the planter unit out of the ground causing seed depth to change. By running extra spring pressure on the press wheels you create up pressure on the row units. Thus, swing arm tail sections have severe limitations. Furthermore, as the planter travels through the field at speeds above 5 MPH the swing arm closing systems are constantly moving or vibrating up and down along the planter unit itself causing uneven depth control. Also when planting up and over terraces, there are areas over the top of the terrace cause the double discs of the planter to lift out of the ground (planting the seeds on top of the ground). Or, in some instances cause the press wheels to carry the weight of whole planter on one side or other of the terrace, and then on the opposite side of the terrace, the double discs openers are totally bottomed out for depth and the press wheels are off the ground not closing the furrow. This leaves several feet of seeded area across a ditch or terrace that is blanked out due to poor seed to soil contact.

There is a need in the art for a planter capable of providing liquid fertilizer in rough fields without adverse impact on seed depth and damage to planter components. There is also a need in the art for a planter capable of maintaining a parallel relationship to the field with adequate but separate pressure adjustments between opener assemblies and closer assemblies.

A press wheel or firmer wheel is a wheel attachment on an agricultural unit for compacting the soil in the seeded furrows after the soil has been planted and, in some instances, after a closing wheel has deposited loose soil overtop of the seed. Traditional press wheels are frequently rubberized tires that are pulled across a furrow. This type of press wheel tire tends to smear the soil over the area on which they press. In response to a hot, windy day, the soil will crack and become like concrete over the seed trench area.

The use of press wheels on planters to compact soil around and over seeds deposited in the bottom of a seed furrow has been practiced for many years. The purpose of compacting the soil is to promote seed germination by minimizing air pockets, thus improving the capillary action of the moisture in the soil as well as reducing wind erosion of the soil over the seed. Traditional press wheels compress and mold the bottom of the furrow to establish an environment conducive to good germination, but they tend to displace the soil away from the furrow by smashing it with portions other than the tread of the wheel. Forcing the soil in undesired directions may result in soil conditions conducive to drying and cracking.

Some traditional press wheels, particularly in dry soil conditions, cause the sides of the furrow to cave in as the press wheels pass and the seeds are then covered by random depths of the soil. Movement of the press wheels through the furrow actually promotes collapse of the furrow sides. The sides of the furrows have little resistance to being washed in the first time it rains. The loosened condition of the sides of the furrows provides little resistance to wind erosion as well as to erosion from rain.

Some traditional wheels do not even compress over the top of the furrow but instead work the sides of the furrow again, leaving undesirable conditions on the top of the furrow. These wheels also may form rooster tails, kicking up dirt in random directions and leaving it uncompressed.

Another problem is that to avoid plugging of the press wheels. For heavy liquid fertilizers, it has been found that the liquid dispensing device in some instances functions most efficiently if the liquid fertilizer is diluted so that the fertilizer flows evenly and without plugging. However, the greater volume of liquid in the furrow additionally produces wetness in the furrow that can cause the press wheels to build up with mud, which, in turn, leads to closing problems with the press wheels.

SUMMARY

In one embodiment of an agriculture planter, the planter may include a planter frame, a seed hopper and a trailing arm assembly. The planter frame may include a hitch tongue extending forward from the planter frame. The trailing arm assembly may be coupled to a rear portion of the planter frame via a parallel linkage and extend rearward from the planter frame, and include separate, but adjustable, trailing arm assemblies for the opening implements and the closing implements.

In accordance with various embodiments, a trailing arm assembly may include a frame bracket attachable to a planter towing frame, a first frame, and a parallel linkage connecting the frame bracket and the first frame with a first pivot and a second pivot on the frame bracket and a first pivot and a second pivot on the first frame. The trailing arm assembly may also include an adjustable biasing member extending from the parallel linkage to the frame bracket. The parallel linkage may be connected between the first frame and the frame bracket such that the parallel linkage maintains a parallel orientation of the first frame. The orientation may be orthogonal to the resultant downward force F1 exerted by the adjustable biasing member on the parallel linkage. The adjustable biasing member is adjustably connected to a portion of the parallel linkage and adjustably engages a plurality of detents formed in the portion of the parallel linkage, wherein the adjustable biasing member is attached to the first frame below at least one pivot of the parallel linkage. The parallel linkage may be a four bar parallel linkage having an upper set of links and a lower set of links. The upper set of links in the four bar parallel linkage may be cross-braced with one or more plates forming a continuous frame between a first side and a second side of the upper link. The lower set of links in the four bar parallel linkage may be cross-braced with one or more plates forming a continuous frame between a first side and a second side of the lower link.

In accordance with various embodiments, the first frame forms a portion of an opener assembly including an opener disk and a gauge wheel. The first frame includes an adjustment mechanism operable to change the position of the gauge wheels relative to the first frame. The trailing arm assembly may include a second frame. The second frame may be a closer assembly frame having one or more closing wheels. The first frame and the second frame may be connected to one another such that they operatively move independently with respect to each other in the vertical direction and the second frame is connected to the first frame via a second parallel linkage. The second parallel linkage may be a four bar parallel linkage having a pair of upper links and a pair of lower links. The upper set of links in the four bar parallel linkage may be fixedly connected to one another by a plate. The second parallel linkage may include a second biasing member. The second biasing member may be adjustable.

In accordance with various embodiments, an adjustment lever may be connected to a first end of the biasing member with the second end of the biasing member connected to the first frame. Movement of the adjustment handle in a first direction causes the force from the biasing member to increase and movement of the adjustment handle in the opposite direction causes the force from the biasing member to decrease. The upper set of links in the four bar parallel linkage may be connected via a plate having an aperture defined therein with the aperture forming a plurality of separate detents which hold the adjustment lever movably in place, while allowing that the adjustment lever to be adjustable between the separate detents. The trailing assembly may include one or more gauge wheels adjustably connected to the first frame and connected to an adjustment handle such that movement of the adjustment handle changes the vertical relationship between the one or more gauge wheels and the first frame.

BRIEF DESCRIPTION OF THE DRAWINGS

FIG. 5B is a side view of a closer trailing arm assembly forming a part of the trailing arm assembly of FIG. 5A.

FIG. 14A illustrates a top-rear perspective view of an agricultural tractor pulling an agricultural planter with a press wheel in accordance with an embodiment of the present invention.

FIG. 16C illustrates a side perspective view of a walking arm having a biased axel in accordance with various embodiments.

FIG. 16D illustrates a biased axel in accordance with various embodiments.

FIG. 16E illustrates a biased axel in accordance with various embodiments.

FIG. 16F illustrates a side perspective view of a walking arm having a biased axel in accordance with various embodiments.

FIG. 16G illustrates a biased axel in accordance with various embodiments.

DETAILED DESCRIPTION

Figure 1:
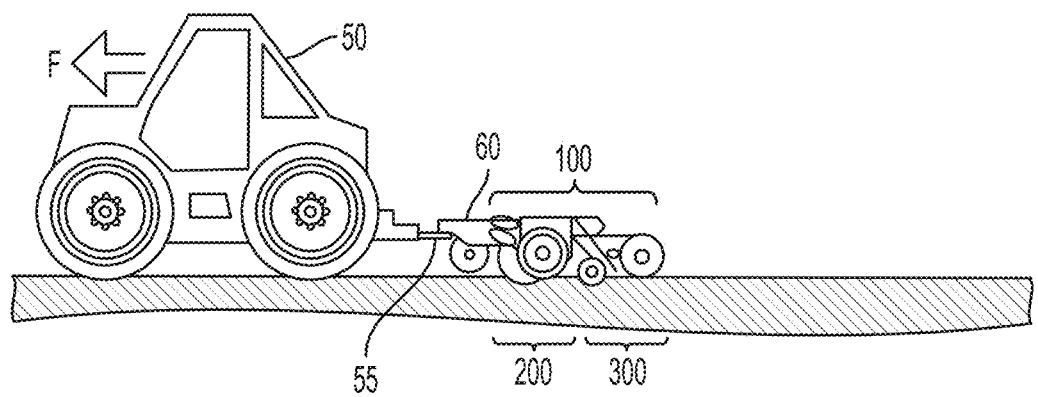
FIG. 1 is a side view of an agriculture tractor pulling an agriculture planter towing a liquid fertilizer tank trailer.

Disclosed herein is an agriculture planter having one or more trailing arm assemblies 100. Each trailing arm assembly 100 may be variously equipped with a fertilizer furrow opener assembly 200. Each trailing arm assembly 100 may also be variously equipped with a trailing furrow closer assembly 300. The furrow opener assembly 200 may include an opener disc 260. The furrow closer assembly 300 may include a closer wheel 360.

In accordance with one embodiment, the fertilizer furrow opener assembly 200 may be connected to a planter frame 60 via a parallel linkage 220, such as a four bar parallel linkage. This configuration, along with the location of the trailing arm assemblies 100, provides a number of advantages. For example, the parallel linkage 220 allows the furrow opener assembly 200 and the furrow closer assembly 300 to move vertically following the terrain (e.g., contours of the field), obstacles (e.g., debris or the like) or similar changes in the field. The may be connected by a pivoting hitch 530 (see FIG. 9). The movement allows the trailing arm assemblies 100 to follow or oscillate up and down as the discs and wheels negotiate over or through an obstruction in a field surface 400 without adversely impacting seed deposit depth or resulting in damage to the planter components. The parallel linkage 220 allows the trailing arm assemblies 100 to operate in substantially the same orientation throughout its range of motion relative to the planter frame 60. For example, the orientation may be parallel to the frame, the field or the original position of the trailing arm assembly. The position may be in a plane that is orthogonal to the downward force exerted on the trailing arm assemblies 100 by a biasing member. The orientation may be consistent through its entire range of motion. The ability of the trailing arm assemblies 100 to adjust to the contours of the field surface 400 facilitates the disc (e.g., 260) being in consistent contact with the field surface 400 to improve opening a fertilizer furrow and the trailing furrow closer wheel 360 being in contact with the field surface 300 to improve closing the seed and fertilizer furrows. The ability of the trailing arms 100 to oscillate over variances in the field surface 400 allows for the discs 260, 360 and wheel 265 to maintain a force in a consistent downward direction. In other words, the trailing arms 100 have relatively constant downward pressure, which allows for continuous opening and closing of furrows due to the constant pressure, which limits the seed depth from becoming too shallow or too deep.

Also, the trailing arm 100 being located at the rear or trailing end of the planter eliminates the issues with soil buildup on the gauge wheels 265 caused by fertilizer equipment being located on the front or leading end of the planter. The following discussion may include components for opening a fertilizer furrow, delivering liquid fertilizer from the distribution tube into the furrow, and closing the seed and fertilizer furrows.

Figure 2:
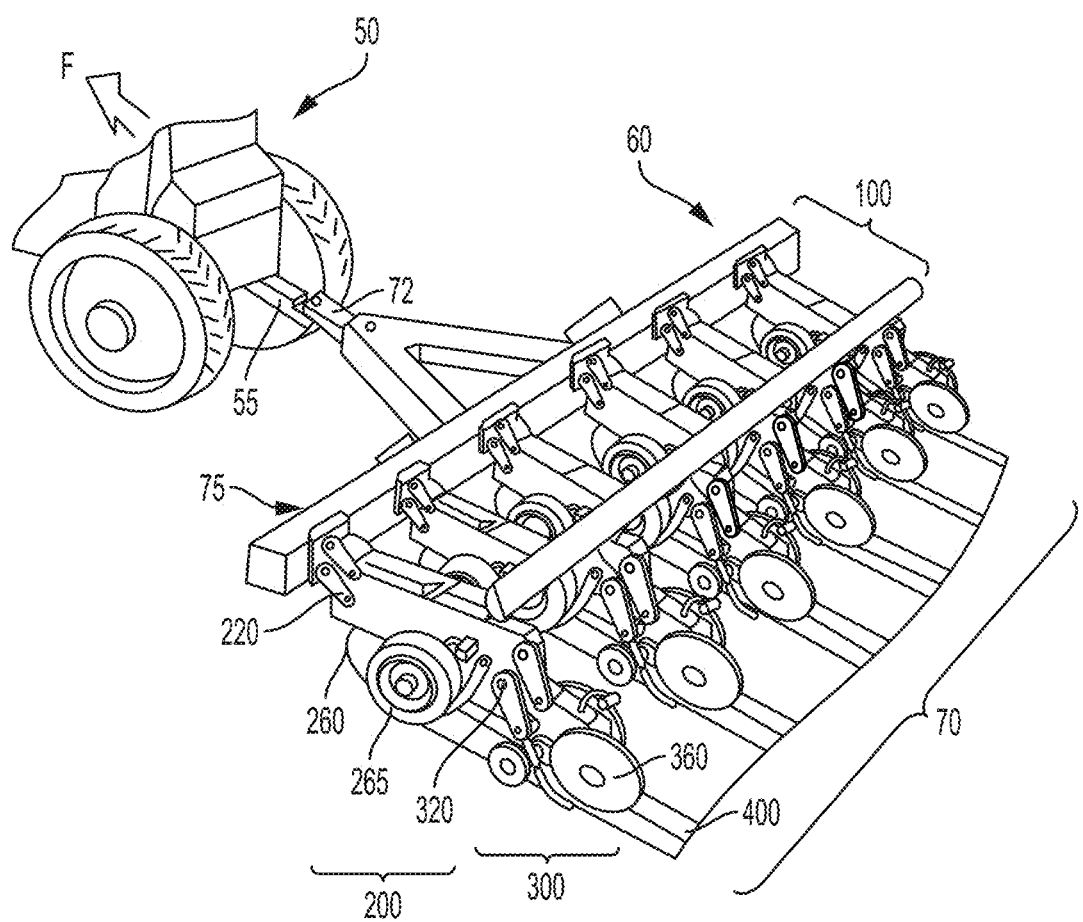
FIG. 2 is a top-rear isometric view of the planter.

For a detailed discussion of the planter and its features, reference is made to FIGS. 1 and 2. FIG. 1 is a side view of an agriculture tractor 50 pulling the agriculture planter 70 and FIG. 2 is a top-rear isometric view of the planter 70.

As shown in FIG. 1, the planter 70 may include a tongue or hitch 72 for hitching the planter 70 to the hitch 55 of the tractor 50. The tractor 50 tows the planter 70 in the direction of arrow F and provides power to the planter 70 (e.g., via a power take off ("PTO")) for powering the operations of the planter 70.

As illustrated in FIG. 2, the planter 70 may include a frame 75 from which the hitch 72 extends and the various planter components are supported. The various components of the planter 70 may include a plurality of trailing arm assemblies 100. The trailing arm assemblies 100 may function as row units for planting seeds and distributing liquid fertilizer.

For a discussion of the various components of the trailing arm assembly 100 and the operation of those components, reference is made to FIGS. 3-8. Each trailing arm assembly may include an opener assembly 200. Each trailing arm assembly 100 may additionally or alternatively include a closer assembly 300. The opener assembly 200 may include an opener frame 210. One or more of a furrow opener disc 260, a gauge wheel 265, seed hopper, and fertilizer reservoir may be attached to the opener frame 210. The seed furrow opener disc 260 creates a furrow in which the planter 70 deposits seed in a manner well known in the art. The gauge wheel 265 assists in determining the depth at which the planter opener assembly 200 deposits the seed. The gauge wheel 265 is mounted to the frame 210 via a gauge wheel lever arm, which is pivotally coupled to the frame 210.

The opener trailing arm assembly 200 may be coupled to the frame 75 via a connection that allows the trailing arm to move relative to the frame 75. In accordance with various embodiments, the connection may be configured such that the approximate relative orientation between the opener trailing arm assembly 200 and the frame 75 may be maintained through the range of motion of the trailer arm assembly 200. Any mechanical connection operable to maintain this relationship may be used. For example, the opener trailing arm assembly 200 may connect to the frame 75 via a parallel linkage 220. In various embodiments, the parallel linkage 220 may be a four bar parallel linkage.

While an opener four bar parallel linkage 220 is shown in the figures, other connection mechanisms may be used as well. In various other examples, a slide mechanism, rail mechanism or a similar mechanism may connect the trailing arm assembly to the frame.

Figure 6A:
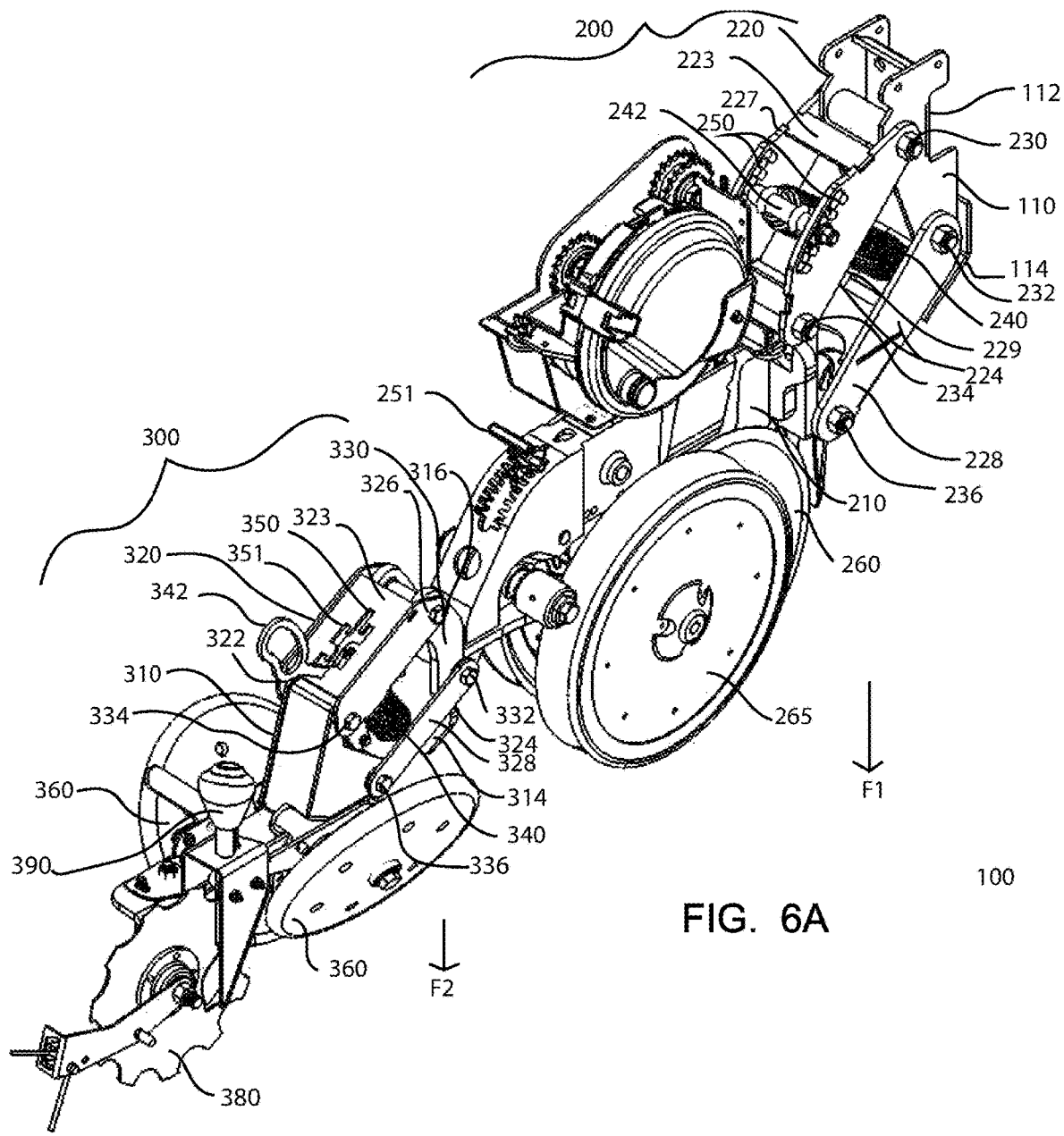
FIG. 6A is a top-rear isometric view of a trailing arm assembly forming part of the planter having a fertilizer disc and a fertilizer distribution system.
Figure 6B:
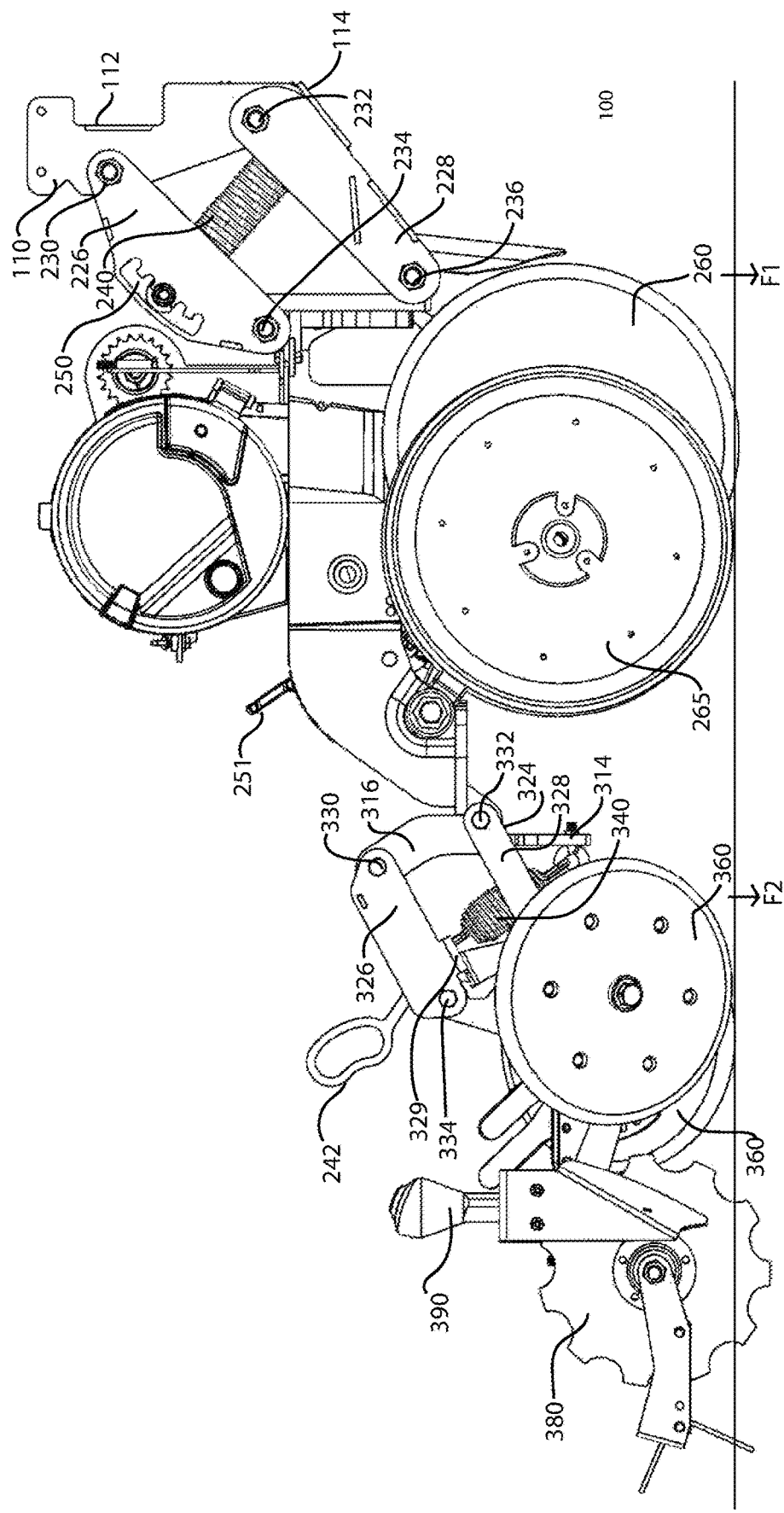
FIG. 6B is a side view of a trailing arm assembly forming part of the planter having a fertilizer disc and a fertilizer distribution system.
Figure 6C:
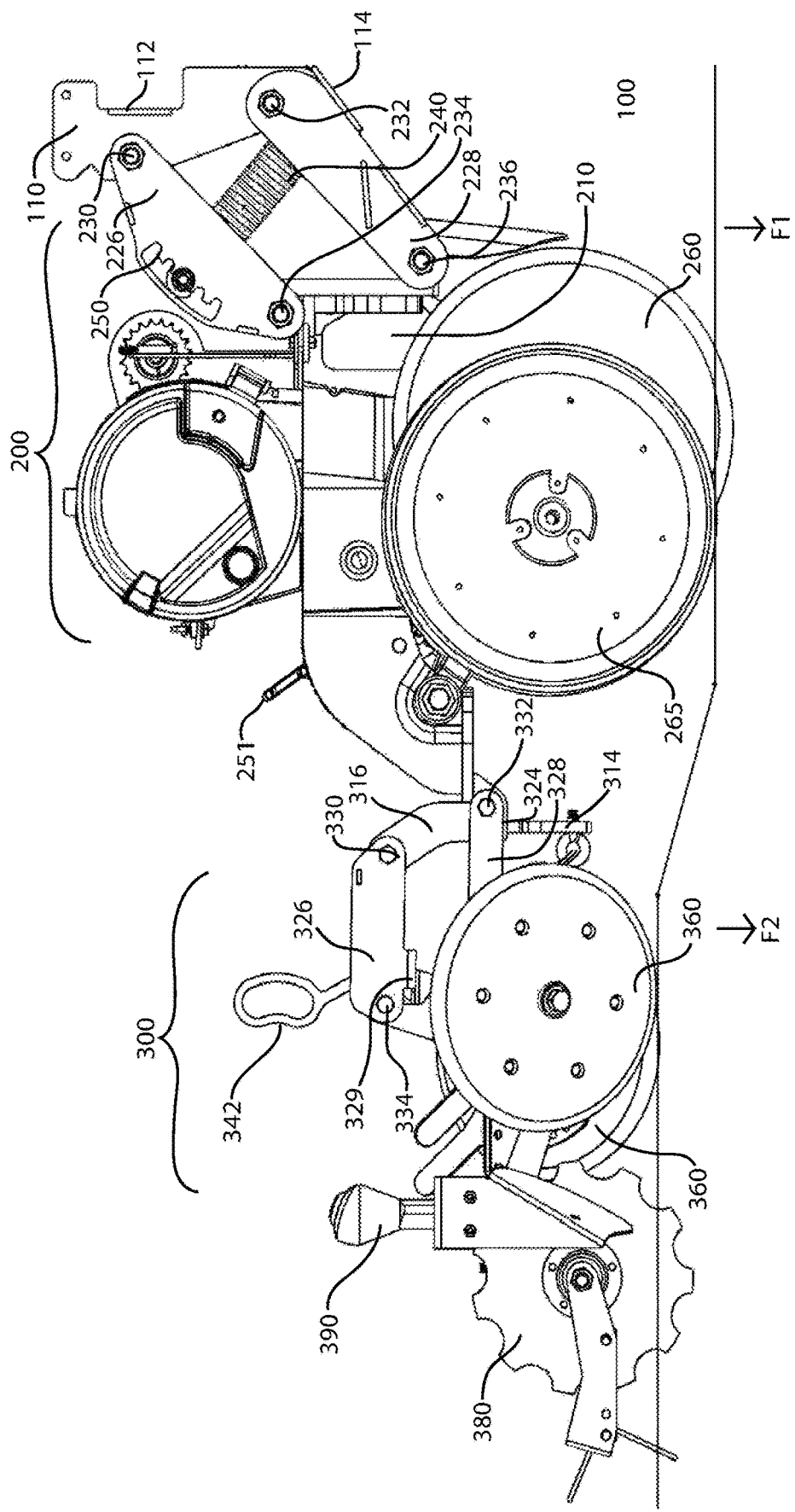
FIG. 6C is a side view of a trailing arm assembly forming part of the planter with the closer trailing arm assembly in an articulated position relative to the position shown in FIG. 6B.
Figure 7A:
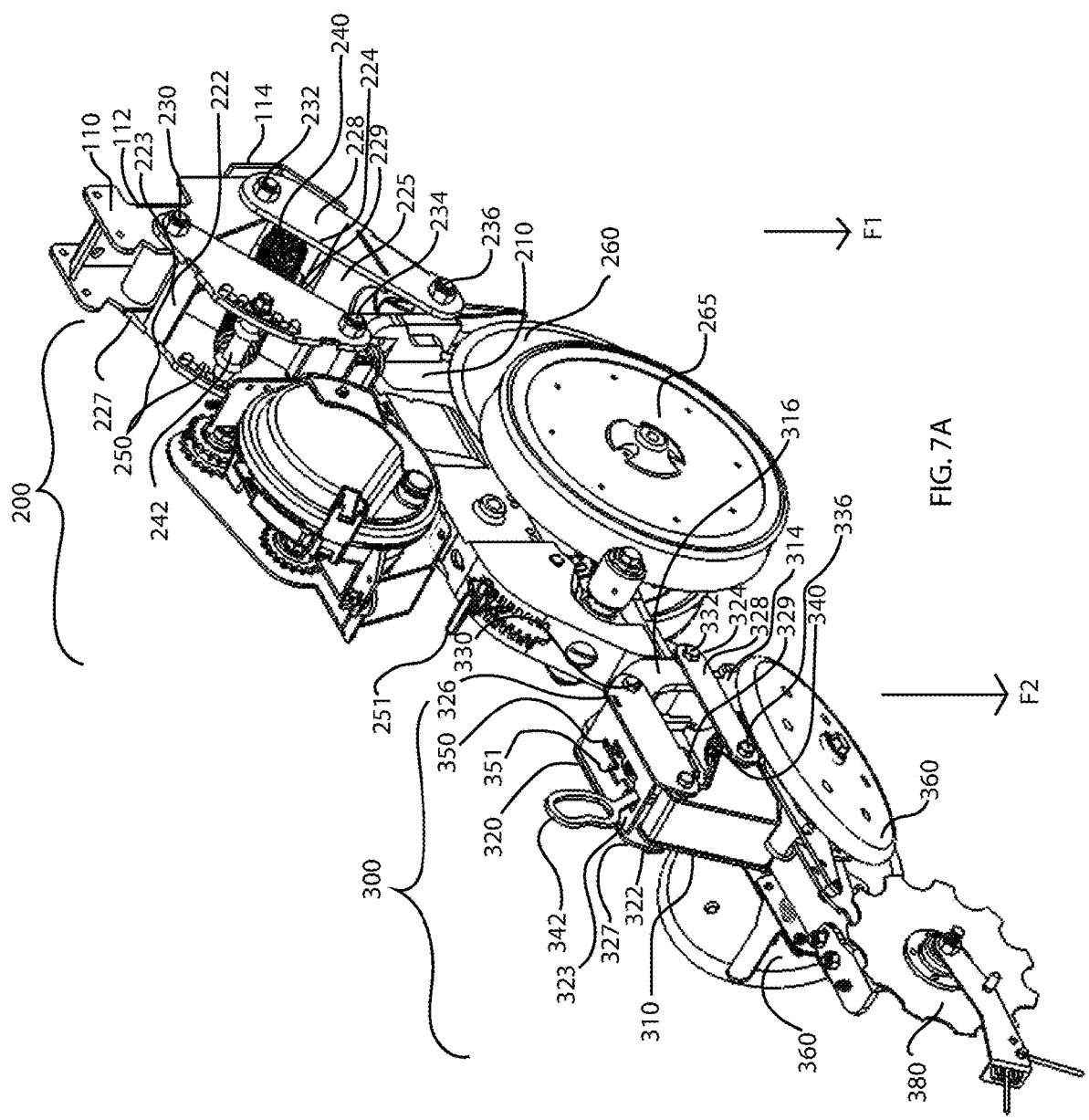
FIG. 7A is a top-rear isometric view of a trailing arm assembly forming part of the planter having a fertilizer disc.
Figure 7B:
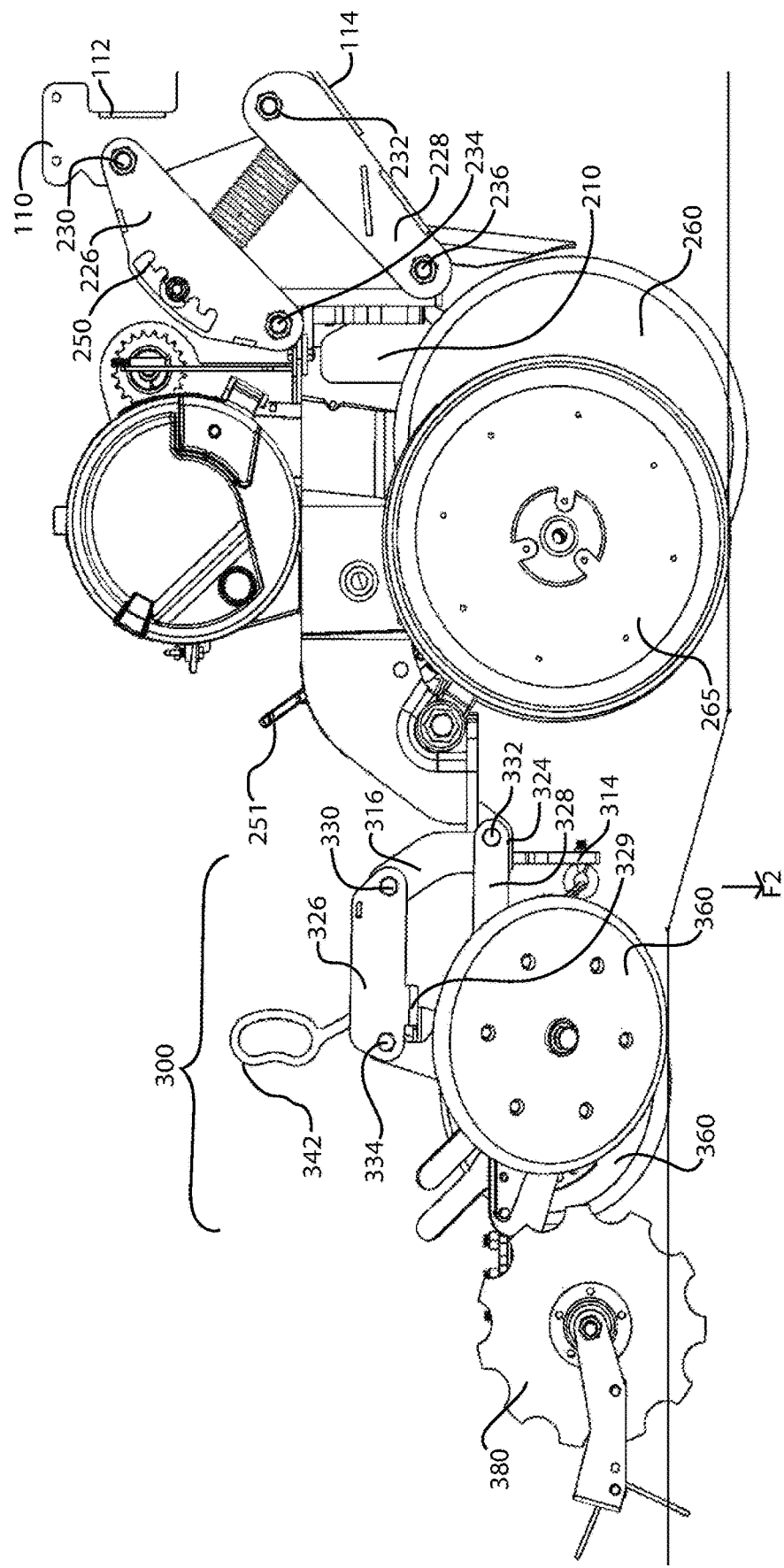
FIG. 7B is a side view of a trailing arm assembly forming part of the planter having a fertilizer disc.
Figure 8:
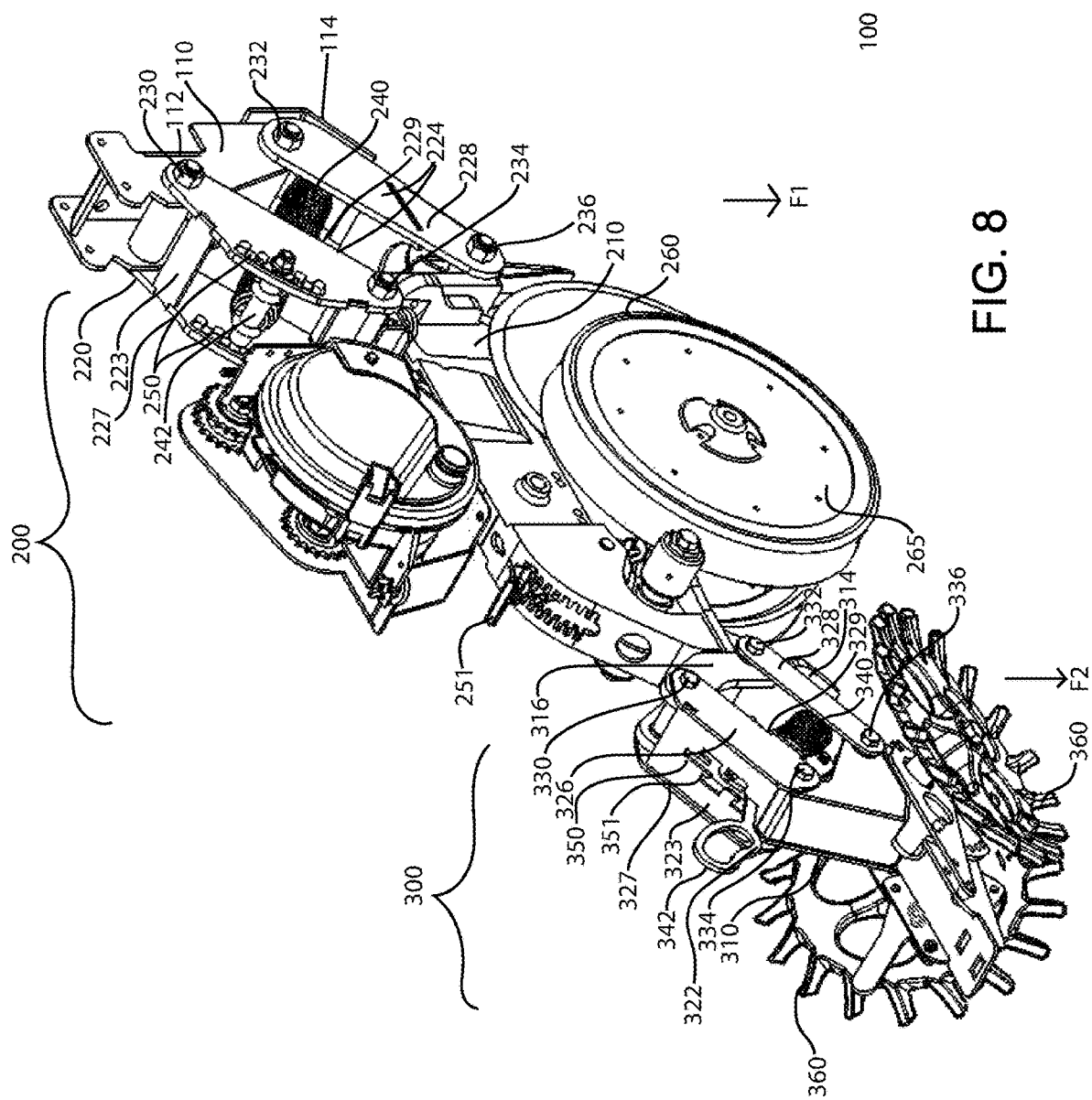
FIG. 8 is a top-rear isometric view of a trailing arm assembly forming part of the planter having an alternate style of closer wheel.

As indicated above, in various embodiments, the trailing arm assembly 100 may include a closing trailing arm assembly 300. The closing trailing arm assembly 300 may include a closer frame 310. The closer frame 310 may be connected to one or more furrow closer discs 360, fertilizer opener discs, fertilizer injectors or similar planter implements. The seed furrow closer disc 360 closes a furrow over a deposited seed in a manner well known in the art. Any type of implement may be used. For example, FIGS. 1-7 show a typical closer wheel on the closing trailing arm assembly 300. FIG. 8 shows an alternate style mohawk closing wheel on closing trailing arm assembly 300.

The closer trailing arm assembly 300 may be coupled to the opener frame 210 via a connection that allows the closer trailing arm 300 to move relative to the opener frame 210. In accordance with various embodiments, the connection may be configured such that the approximate relative orientation between the closer trailing arm assembly 300 and the opener frame 210 may be maintained through the range of motion of the closing trailing arm assembly 300. Any mechanical connection operable to maintain this relationship may be used. For example, the closer trailing arm assembly 300 may connect to the opener frame 210 via a parallel linkage 320. In various embodiments, the parallel linkage 320 may be a four bar parallel linkage.

While a closing four bar parallel linkage is shown in the figures, other connection mechanisms may be used as well. In various other examples, a slide mechanism, rail mechanism, or the like may connect the trailing arm assembly to the frame.

Figure 9:
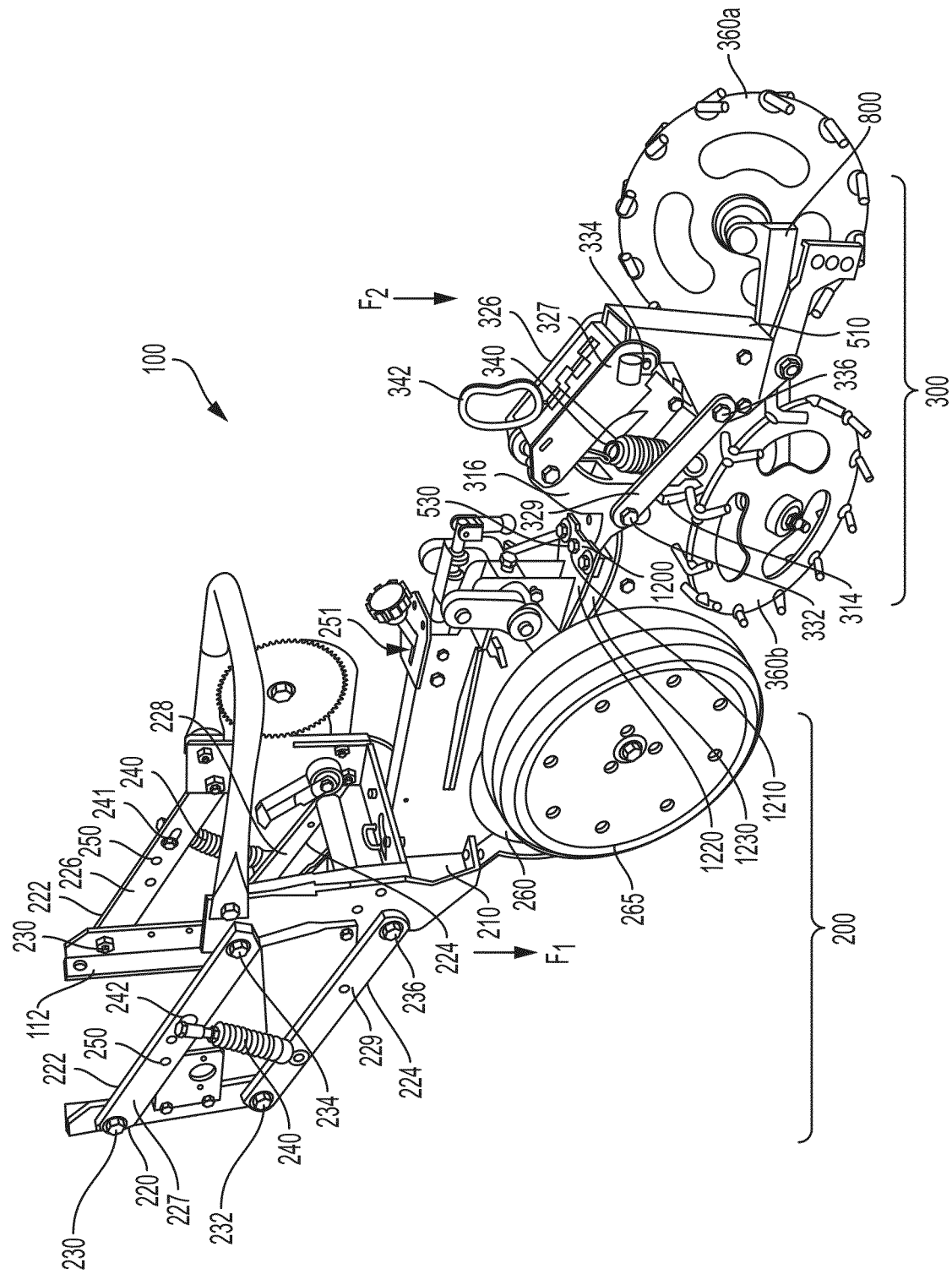
FIG. 9 is a top-rear isometric view of a trailing arm assembly forming part of the planter having closer wheel connected to a walking arm.

In accordance with various embodiments, the parallel linkage 220 may have a first link 226 and a second link 228. The first link 226 may have two pivots 230, 234. The pivot 230 may be located on a frame bracket 110. The pivot 234 may be located on the first frame 210. In this arrangement, the first link 226 allows movement between the frame bracket 110 and the first frame 210. The second link 228 may have two pivots 232, 236. The pivot 232 may be located on a frame bracket 110. The pivot 236 may be located on the first frame 210. The first link 226 and the second link 228 may be positioned in parallel relative to one another, meaning planes passing through pivots 230, 232 and pivots 232, 236, respectively, may be parallel to one another. Pivots 232 and 230 may be positioned relative to one another in positions that are the same or substantially similar to pivots 236 and 234. In this relationship, as the first link 226 and second link 228 articulate through their range of motion, they remain parallel to one another. Pivots 236 and 234 also maintain their position relative to one another. This arrangement allows the frame 210 to generally maintain its angular orientation throughout its range of motion. As shown in FIG. 9, the pivots may be discontinues across the links. For example, each end of each link may have its own pivot as shown in the exemplary FIG. 9.

In embodiments wherein the parallel linkage 220 is a four bar parallel linkage, the linkage 220 may also include a third link 227 and a fourth link 229. Links 227 and 226 have the same pivots 230, 234 and form a top linkage 222. Links 228 and 229 have the same pivots 232, 236 and form a bottom linkage 224.

In accordance with various embodiments, the frame bracket 110 may be fixedly attachable or removably attachable to a planter towing frame 75. The frame bracket 110 may have an engagement portion 112. The engagement portion 112 may be flat (see FIG. 9) or C-shaped (see FIG. 3) operable to engage around frame 75. Such an engagement portion may provide stability proximal to the sides of the linkage 220 such that twisting of the trailing arm assembly 100 is minimized. The frame bracket 110 may also include a mounting plate 114 that connects to a biasing member 240. The mounting plate 114 may be located above, below, or in between pivots 230 and 232. As shown in the FIGS. 3 and 5, the plate 114 may be below the pivots 230, 232 and also extend out under the top and bottom linkages 222, 224. By extending out and under the linkages 222, 224, the plate 114 may be positioned to stop the linkages from operating beyond a certain point. For example, the plate may limit the bottom linkage 224 from extending beyond 10-80 degrees off of the horizontal plane by being positioned to contact the linkage at an angular orientation between 20-70 degrees off horizontal. In other examples, this angle may be between 20-70 degrees or more particularly between 30-60 degrees. In one example, this angle may be approximately 35 degrees. By anchoring the biasing mechanism on the plate 114, which forms part of the bracket 110, at least one end of the biasing mechanism may be anchored to the frame 75 such that that anchor point has limited or no movement relative to the frame 75.

The plate 114 may also form an anchor point for the biasing mechanism 240 below the pivots 230, 232. In such a position, a tension-based biasing mechanism 240 may be used. One example of such a biasing mechanism may be a tension spring. The plate 114 may also anchor the biasing mechanism 240 between the pivots 230, 232 with the biasing mechanism being a torsion spring, for example. The plate 114 may also anchor the biasing mechanism 240 above the pivots 230, 232 with the biasing mechanism being a coil spring, air bag, or similar type of extension mechanism, for example. In another example, the biasing mechanism may be a hydraulic cylinder operable to extend or contract. A person of ordinary skill in the art, based on these examples, will appreciate that any of a variety of biasing member may be used with the system. These various embodiments are discussed in more detail below.

In accordance with various embodiments, the upper set of links 222 in the four bar parallel linkage 220 may be cross-braced such that link 226 and link 227 are integrally formed. Such integral formation may increase the lateral rigidity of the linkage 220. Similarly, the lower set of links 224 may be cross-braced such that links 228 and 229 are integrally formed. The integral formation of either or both the upper and lower links may be accomplished by a variety of means. For example, the links may be cast, molded, machined, stamped, welded or formed by any other method. In one example, one or more plates 223 may connect one side of the upper links 222 with the other side of the upper links 222. Similarly, plates 225 may connect one side of the lower links 224 with the other side of the lower links 224. The plates 222 and 225 may be welded in place or attached with fasteners.

In accordance with various embodiments, the adjustable biasing member 240 may extend from the parallel linkage 220 to the frame bracket 110. The adjustable biasing member 240 may be anchored to either the upper or lower links 222, 224 on one end of the adjustable biasing member 240 and anchored to the frame bracket 110 on the opposite end of the biasing member 240. The biasing member may be positioned such that the biasing member biases the linkage 220 in a downward direction. In one example, the plate 114 may be positioned below the pivots 230 and 232, with the biasing member 240 anchored to the plate 114 on one end and the biasing member 240 being anchored to the upper link 222 on the opposite end. In such an embodiment, the biasing member may also be an extension spring operable to exert a downward force on the linkage 220 by pulling the upper link toward the plate 114. While the biasing member may exert a force directly between the linkage 220 and the plate 114, the resultant force when reacting with the structure of the linkage 220 may be represented as F1.

In accordance with various embodiments, the parallel linkage 220 may be connected between the first frame 210 and the frame bracket 110 such that the parallel linkage maintains an angular orientation of the first frame 210. This angular orientation may be orthogonal to the effective downward force F1 of the adjustable biasing member 240. While the actual force exerted by the biasing member 240 may not be vertical, the interaction between the biasing member 240 and the parallel linkage 220 may result in a vertical force on the first frame 210. This vertical force may drive the first frame 210 and all implements attached thereto (e.g., the opener wheel 260 and the gauge wheel 265) against the ground 400.

In accordance with various embodiments, the biasing member 240 may be adjustable. For example, the biasing member 240 may be adjustably connected to a portion of the parallel linkage (e.g., the upper linkage 222). The adjustable connection may allow the biasing member 240 to move along the length of the parallel linkage, with a position on one end of the parallel linkage placing the biasing member 240 in greater tension than a position on the opposite end of the parallel linkage 220 or with the position on one end of the parallel linkage 220 providing the biasing member 240 with greater mechanical advantage relative to the frame 110. For example, an adjustable connection 250 may connect the biasing member 240 to the parallel linkage 220 at any of a variety of positions along about 50% of the length of the parallel linkage 220. In one example, the adjustable connection may be a plurality of detents 250 formed in the parallel linkage 220. The adjustable connection 250 may be an aperture extending through one or more of the links 226, 227, 228, or 229. The aperture may be an elongated slot with shorter slots extending transversely therefrom. An anchor member 242 may engage the aperture and be operable to slide along the elongated slot between the shorter slots. The biasing mechanism may pull the anchor member into the shorter slots, thereby forming a plurality of detents, allowing adjustability between each of the plurality of shorter slots. In one example, the anchor member 242 may be a pin that may extend between link 226 and link 227. Each link may have the adjustable connection aperture 250 formed therein with the pin 242 engaged on each side. The biasing mechanism may connect to the pin forming the anchor on one side of the biasing mechanism with the upper linkage 222. The pin may then be adjustable between the plurality of detents defined by the aperture 250. In other examples, adjustment control 250 may be similar or the same as those discussed below with regards to the closer trailing arm assembly 300.

Figure 5A:
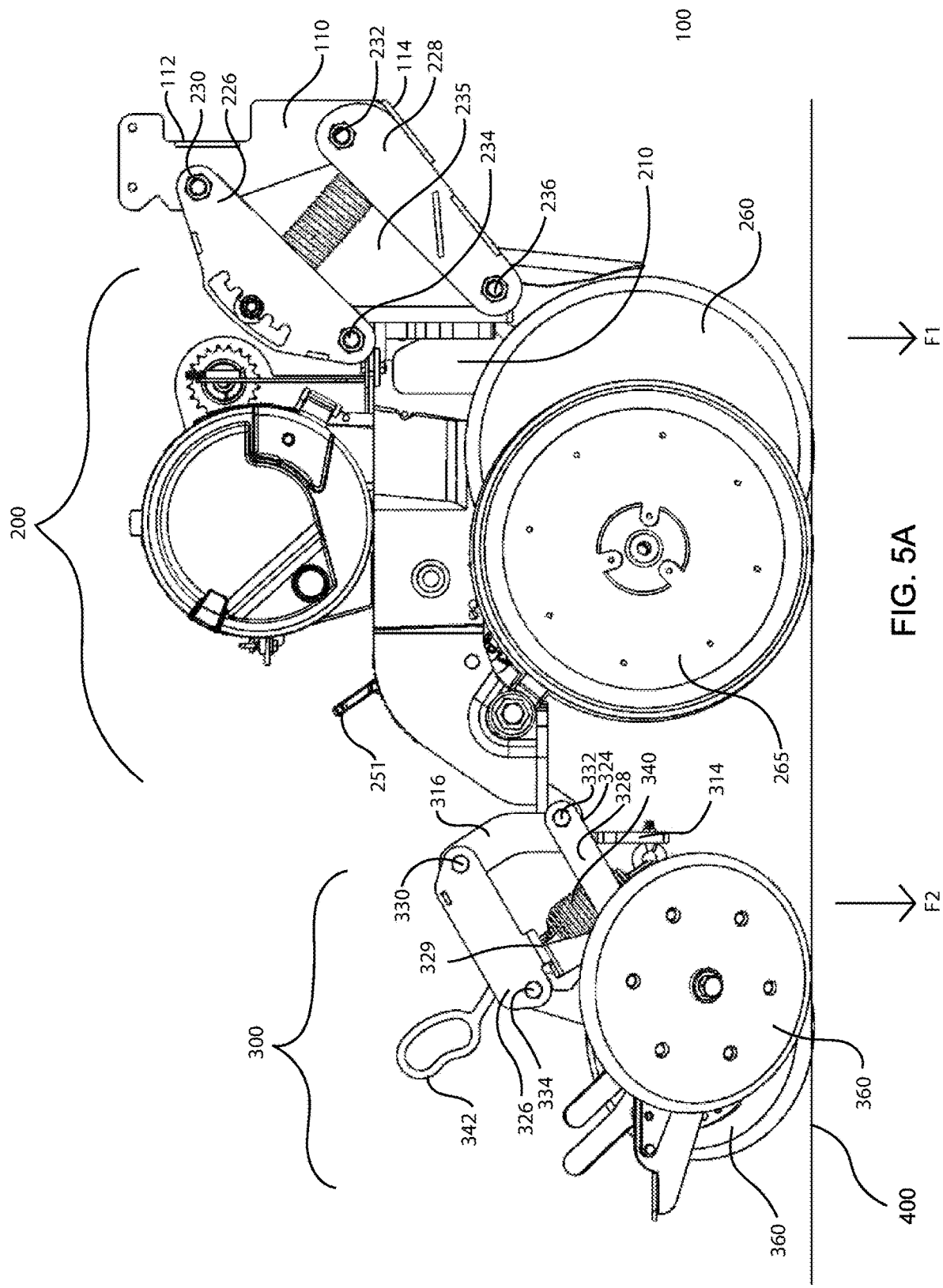
FIG. 5A is a side view of a trailing arm assembly forming part of the planter.

In accordance with various embodiments, the first frame may include an adjustment mechanism operable to change the position of the gauge wheels 265 relative to the first frame 210. The trailing arm assembly 200 may include an adjustment lever 251. This lever 251 may allow the downward force exerted by the gauge wheels 265 to be adjusted. A linkage may extend between a bottom end of the lever 251 and the opener frame 210. The position of the lever 251 may be set to set the gauge wheels 265 at a desired position relative to the opener frame 210. The relationship between the opener frame 210 and the frame 75 is influenced by the parallel linkage 220 and the biasing member 240. The influence may cause a change in force against the gauge wheels as the lever 251 is adjusted. When the lever 251 is in the first position fully extending the gauge wheels away from the frame 210, the resulting downward force on account of the biasing member 240 may be at a maximum for the particular detent in which the biasing member 240 is set. To fully maximize this downward force, the biasing member 240 may be located in the detent on the linkage 220, which maximizes the bias. (For example, as shown in FIG. 1, the detent distal from the bracket 110 provides the greatest mechanical advantage for the biasing member 240 and therefore the greatest downward force.) With the force F1 maximized in the distal detent, the lever 251 may be positioned such that the wheels are fully extended, maximizing the overall force. The force may also be minimized by positioning the biasing member 240 in the detent in the minimum force position (e.g., as shown in FIG. 5A, the detent proximal to the bracket 110 which provides the least mechanical advantage for the biasing member 240 and therefore the least downward force). With the force F1 minimized in the proximal detent, the lever 251 may be positioned such that the wheels are fully retracted to the frame 210, minimizing the overall force. One of ordinary skill in the art may recognize that intermediate adjustments may be made between the linkage control 250 and the frame control 251. It may also be noted that while the frame control 251 may have an effect on force, it may also be used to merely set the depth of the opener disc 260 by adjusting the gauge wheels 265 relative to the opener disc 260.

As discussed above, and in accordance with various embodiments, the planter may also include a second trailing arm assembly 300. The second trailing arm assembly 300 may include implements operable to close and/or fertilize a furrow. This second trailing arm assembly 300 may include a closer frame 310. The closer frame 310 may include one or more closing wheels 360. As shown in FIGS. 6-8, the closer frame 310 may also connect to a fertilizer disc 380 and/or a fertilizer distribution system 390.

Figure 5C:
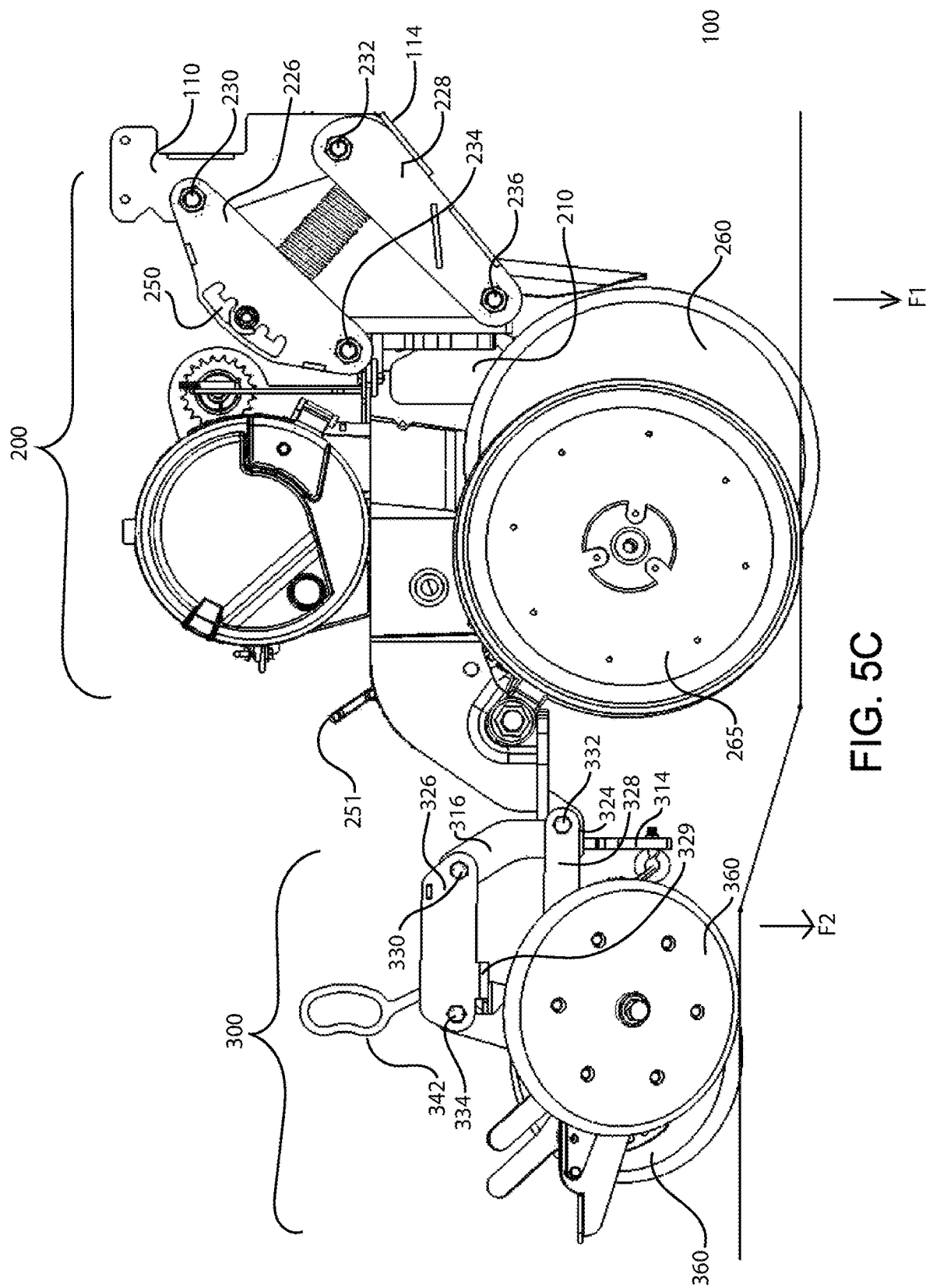
FIG. 5C is a side view of a trailing arm assembly forming part of the planter with the closer trailing arm assembly in an articulated position relative to the position shown in FIG. 5A.
Figure 5D:
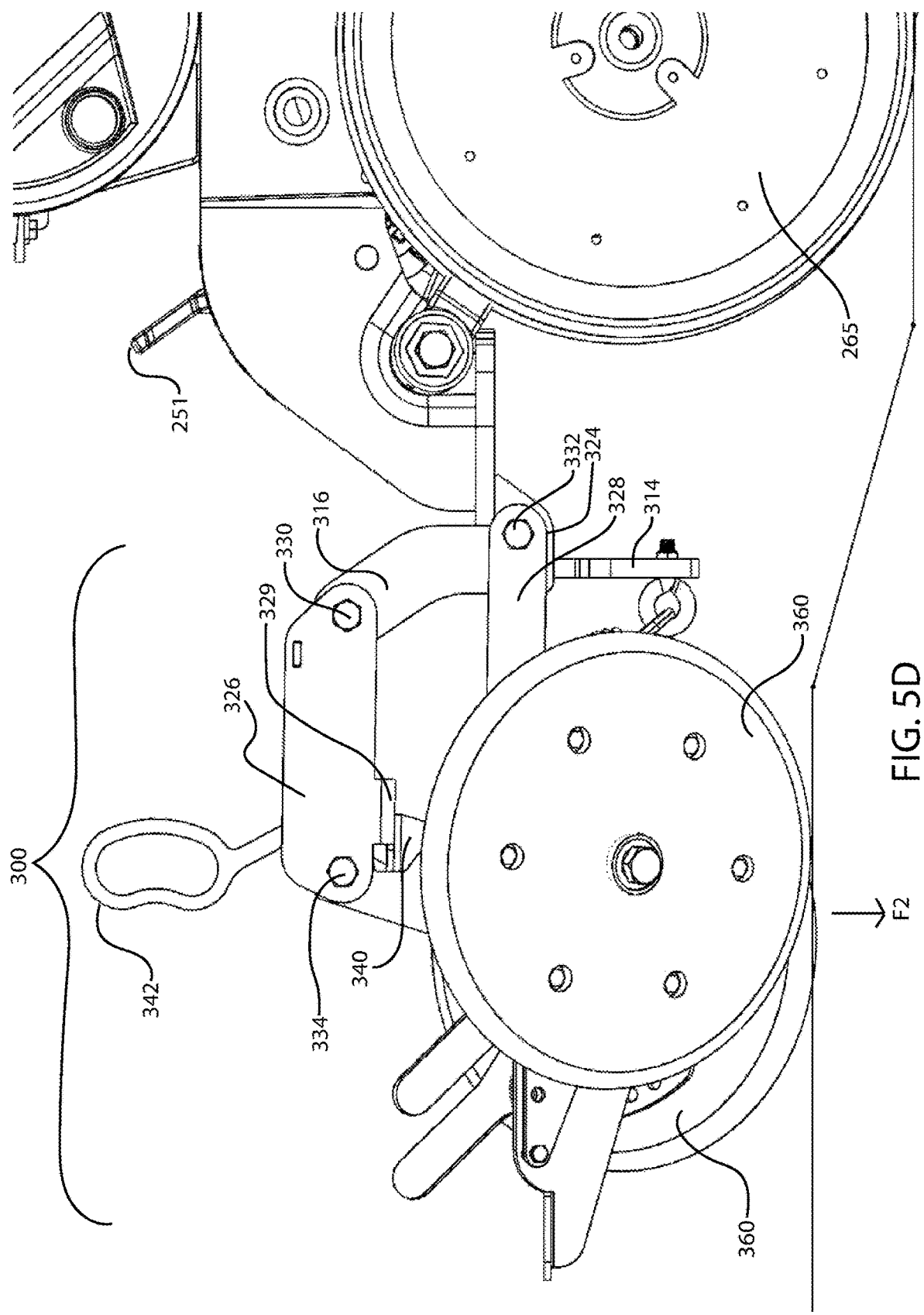
FIG. 5D is a side view of a closer trailing arm assembly forming a part of the trailing arm assembly of FIG. 5C.

The opener frame 210 and the closer frame 310 may be connected to one another such that the closer frame 310 may operatively move independently with respect to the opener frame 210 in the vertical direction. As shown in FIGS. 5A and 5B, the closing wheels 360 may generally operate at a similar level as the gauge wheels 265. However, the closer trailing arm assembly 300 may articulate vertically relative to the opener trailing arm assembly 200 as shown in FIGS. 5C and 5D. Here, the closer trailing arm assembly 300 operates on a higher level (due to, e.g., an obstacle or field 400 contour or the like) than the opener trailing arm assembly 200.

As discussed above, the closer trailing arm assembly 300 may be connected to the opener trailing arm assembly 200 in any manner known, especially in such a way as to provide the vertical articulating independence discussed above. In accordance with various embodiments, the closer frame 310 may be connected to the opener frame 210 via a second parallel linkage 320. The parallel linkage 320 may have a first link 326 and a second link 328. The first link 326 may have two pivots 330, 334. The pivot 330 may be located on the opener frame 210. The pivot 334 may be located on the closer frame 310. In this arrangement, the first link 326 allows movement between the opener frame 210 and the closer frame 310. The second link 328 may have two pivots 332, 336. The pivot 332 may be located on the opener frame 210. The pivot 336 may be located on the closer frame 210. The first link 326 and the second link 328 may be positioned in parallel relative to one another, meaning planes passing through pivots 330, 332 and pivots 332, 336 respectively may be parallel to one another. Pivots 332 and 330 may be positioned relative to one another in positions that are the same or substantially similar to pivots 336 and 334. In this relationship, as the first link 326 and second link 328 articulate through their range of motion, they remain substantially parallel to one another. Pivots 336 and 334 also maintain their position relative to one another. This arrangement allows the frame 310 to generally maintain its angular orientation throughout its range of motion.

In embodiments wherein the parallel linkage 320 is a four bar parallel linkage, the linkage 320 may also include a third link 327 and a fourth link 329. Links 327 and 326 have the same pivots 330, 334 and form a top linkage 322. Links 328 and 329 have the same pivots 332, 336 and form a bottom linkage 324.

Figure 3:
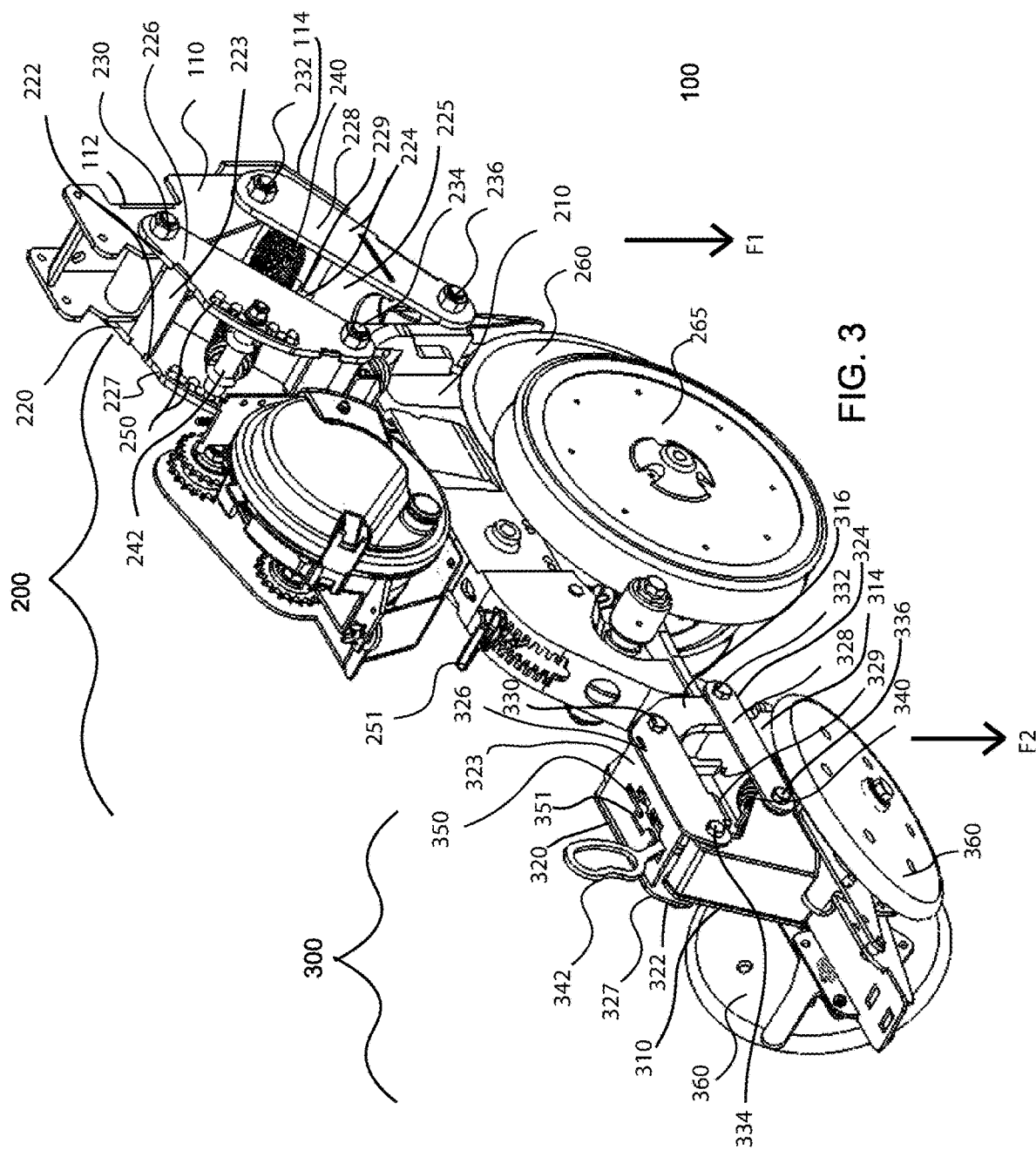
FIG. 3 is a top-rear isometric view of a trailing arm assembly forming part of the planter.
Figure 4:
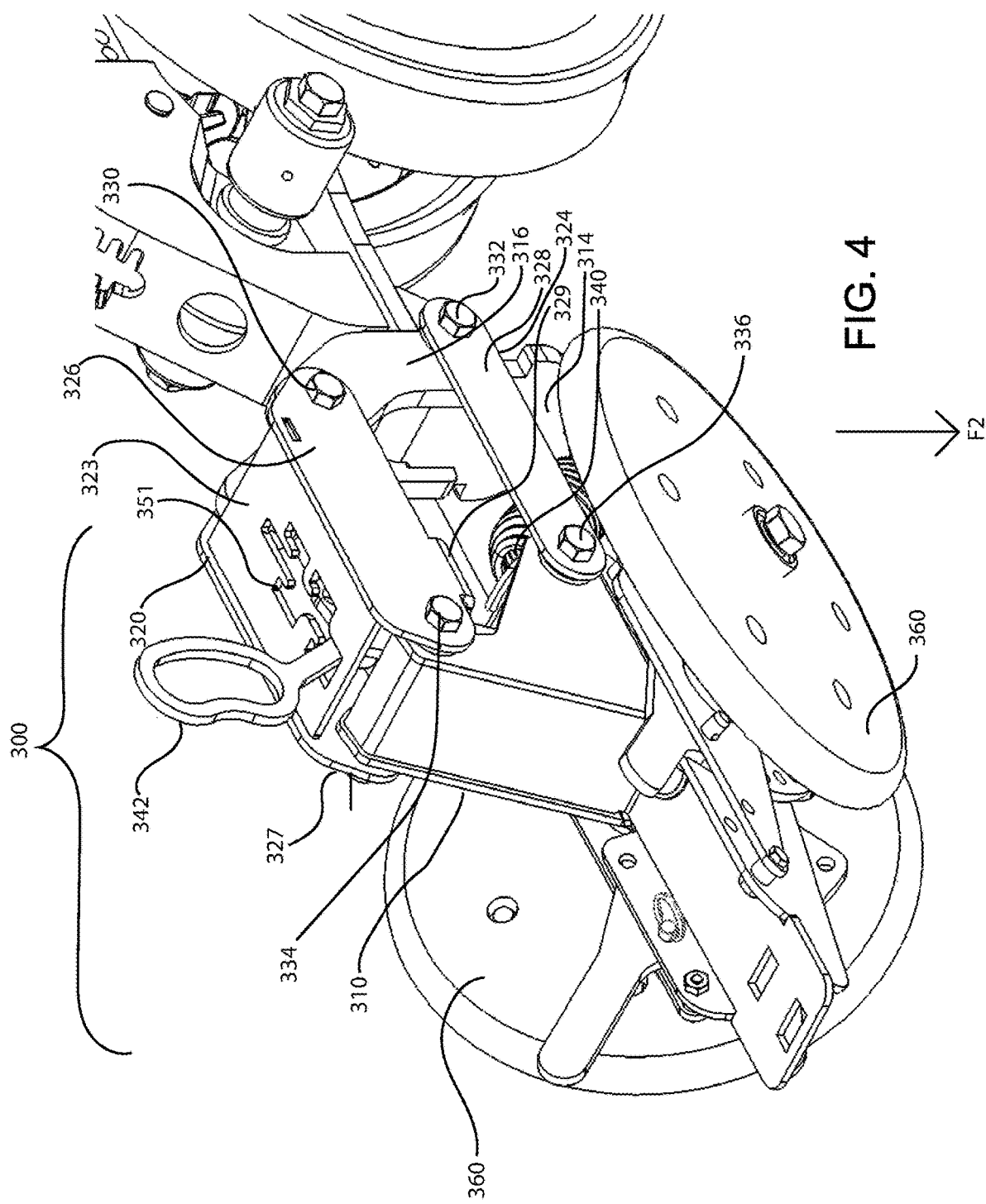
FIG. 4 is a top-rear isometric view of a closer trailing arm assembly forming a part of the trailing arm assembly of FIG. 3.

In accordance with various embodiments, the opener frame bracket 210 may include a bracket 316 fixedly attached or removably attachable thereto. The closer frame 310 may be movably attached to the bracket 316 via the parallel linkage 320. The attachment may be such that it provides stability to the sides of the linkage 320 such that twisting of the trailing arm assembly 300 is minimized. The bracket 316 may also include a mounting plate 314 that connects to a biasing member 340. The mounting plate 314 may be located above, below, or in between pivots 330 and 332. As shown in the FIGS. 3 and 5, the plate 314 may be below the pivots 330, 332. Similar to plate 214, plate 314 may extend out under the top and bottom linkages 322, 324. By extending out and under the linkages 322, 324, the plate 314 may be positioned to stop the linkages from operating beyond a certain point similar to those discussed above. However, as shown in FIGS. 3, 5 and 9, the plate 314 may have lateral tabs, which perform a similar function. In this way, the plate 314 may limit the bottom linkage 324 from extending beyond a certain point. The plate 314 may also anchor the biasing member 340 below the rear lower pivot 332. In one example, the plate 314 may support an anchor 315 for a biasing mechanism 340. (See FIG. 10A) The anchor 315 may be an eye bolt located below the rear lower pivot 332 such that it can exert a downward force on the linkage 300.

The plate may also anchor biasing mechanism 340. By anchoring the biasing mechanism 340, at least one end of the biasing mechanism 340 may be anchored to the opener frame 210 such that that anchor point has limited or no movement relative to the opener frame 210. The plate 314 may form an anchor point for the biasing mechanism 340 below the pivots 330, 332. In such a position, a tension-based biasing mechanism 340 may be used. One example of such a biasing mechanism may be a tension spring. Similar arrangements to those discussed above with regards to biasing mechanism 240 may be employed with the biasing mechanism 340. A person of ordinary skill in the art, based on these examples, will appreciate that any of a variety of biasing members may be used with the system.

In accordance with various embodiments, the upper set of links 322 in the four bar parallel linkage 320 may be cross-braced such that link 326 and link 327 are integrally formed. Such integral formation may increase the lateral rigidity of the linkage 320. Similarly, the lower set of links 324 may be cross-braced such that links 228 and 229 are integrally formed. The integral formation of either or both the upper and lower links may be accomplished by a variety of means. For example, the links may be cast, molded, machined, stamped, welded or formed by any other method. In one example, one or more plates 323 may connect one side of the upper links 322 with the other side of the upper links 322. Similarly, plates 325 may connect one side of the lower links 324 with the other side of the upper links 324. The plates 322 and 325 may be welded in place or attached with fasteners.

In accordance with various embodiments, the adjustable biasing member 340 may extend from the parallel linkage 320 to the opener frame 210. The adjustable biasing member 340 may be anchored to either the upper or lower links 322, 324 on one end of the adjustable biasing member 340 and anchored to the opener frame 210 on the opposite end of the biasing member 340. The biasing member may be positioned such that the biasing member biases the linkage 320 in a downward direction. In one example, the plate 314 may be positioned below the pivots 330 and 332, with the biasing member 340 anchored to the plate 314 on one end and the biasing member 340 being anchored to the upper link 322 on the opposite end. In such an embodiment, the biasing member 340 may also be an extension spring operable to exert a downward force on the linkage 320 by pulling the upper link 322 toward the plate 314. While the biasing member may exert a force directly between the linkage 320 and the plate 314, the resultant force when reacting with the structure of the linkage 320 may be represented as F2.

In accordance with various embodiments, the parallel linkage 320 may be connected between the closer frame 310 and the opener frame 210 such that the parallel linkage maintains an angular orientation of the closer frame 310. This angular orientation may be orthogonal to the effective downward force F2 of the adjustable biasing member 340. While the actual force exerted by the biasing member 340 may not be vertical, the interaction between the biasing member 340 and the parallel linkage 320 may result in a vertical force on the closer frame 310. This vertical force may drive the closer frame 310 and all implements attached thereto (e.g., the opener wheel 360 and the gauge wheel 365) against the ground 400.

In accordance with various embodiments, the biasing member 340 may be adjustable. For example, the biasing member 340 may be adjustably connected to a portion of the parallel linkage (e.g., the upper linkage 322). The adjustable connection may allow the biasing member 340 to move along the length of the parallel linkage 320, with a position on one end of the parallel linkage placing the biasing member 340 in greater tension than a position on the opposite end of the parallel linkage or with the position on one end providing the biasing member 340 with greater mechanical advantage than the position on the other end. For example, an adjustable connection 350 may connect the biasing member 340 to the parallel linkage 320 at any of a variety of positions along about 50-80% of the length of the parallel linkage 320. In one example, the adjustable connection 250 may be a plurality of detents 351 formed in the parallel linkage 320. The adjustable connection 350 may be an aperture extending through one or more of the links 326, 327, 328, or 329 similar to the structure discussed above with respect to linkage 220 and adjustable connection 250. Or the adjustable connection may be an aperture 350 extending through the connecting plate 323. The aperture may be an elongated slot 350 with shorter slots 351 extending transversely therefrom. An anchor member 342 may pass through the aperture 350 and be operable to slide along the elongated slot 350 between the shorter slots 351. In one example, the anchor member 342 may be a lever that may extend through plate 323. The biasing mechanism 340 may connect to the lever 342, forming the anchor on one side of the biasing mechanism 340 with the upper linkage 322. The pin may then be adjustable between the plurality of detents 351 defined along aperture 350.

In accordance with various embodiments, the planter may have the first trailing arm section 200 attached to the planter frame 75 via a four bar parallel linkage 220 and the second trailing arm section 300 attached to the first trailing arm section 200 via the second four bar parallel linkage 320. The first four bar parallel linkage 220 and the second four bar parallel linkage 320 may be biased toward the ground 400. The first bias mechanism 240 may bias both the first trailing arm section 200 and the second trailing arm section 300. The second bias mechanism 340 may only bias the second trailing arm section 300. The first and second bias mechanisms may include their own individual adjustment systems 250 and 350, respectively. These mechanisms may adjust the respective forces exerted by the bias mechanisms associated therewith. A third adjustment mechanism 251 may be included in the first trailing arm section 200. The third adjustment mechanism 251 may adjust the position of the first trailing arm section 200 (more specifically, the frame 210 associated therewith) with respect to the ground. This adjustment may translate into an additional adjustment of force on the first biasing mechanism 240.

It may be noted that the directions used herein may be generally stated, while in actual application in the field the conditions may vary the practical effect. For example, a tractor 50 pulling planter 70 up a hill may result in the forces F1 or F2 being non-vertical while still being generally normal to the ground or normal to the direction of travel of the system as a whole. Or, as debris or small hills may have a very temporary effect on the angle of the system as a whole, the overall effect or the larger average effect is that the effective force is generally normal to the average plane of the field 400 or generally normal to the average direction of travel of the system.

As shown in FIG. 9 the closing assembly 300 may include staggered closing wheels 360a and 360b attached an articulating bracket 800. The articulating bracket 800 may provide an additional degree of articulation relative to the closing assembly 300. As indicated above, opener assembly 200 provides a first degree of articulation moving the components rearward of opener assembly 200, e.g. the closing assembly 300 and the articulating bracket 800. The closing assembly 300 provides a second degree of vertical articulation that is independent of the opener assembly 200, but articulates the components rearward of the closing assembly 300, e.g. the articulating bracket 800. The articulating bracket 800 provides a third degree of vertical articulation that is independent of the opener assembly 200 and the closing assembly 300. The articulating bracket 800 is operable to move components attached thereto without causing movement of forward components such as the opener assembly 200 and the closing assembly 300. For example, staggered closer wheels or a fertilizer disc may be attached to the articulation bracket 800. These components may articulate independent of the linkage of the closing assembly 300. In accordance with one embodiment, the articulation bracket 800 may be a pivotable arm bracket as disclosed in any of the various embodiments of U.S. Pat. Pub. No. 2013/0263767, which is hereby incorporated by reference in its entirety. As shown, in FIG. 9 the staggered closing wheels 360a and 360b may be v-tine closing wheels discussed in more detail below.

The articulation of the articulation bracket 800 may be limited by an upper stop 510. The stop may limit the upward travel of the rear portion of the articulation bracket 800. The stop 510 may part of or a protrusion extending from the closing frame 310. As shown in FIG. 9 the stop 510 may be a sheet metal bracket that connects the pivot 334 and pivot 336 forming a part of the parallel link suspension.

Figure 10A:
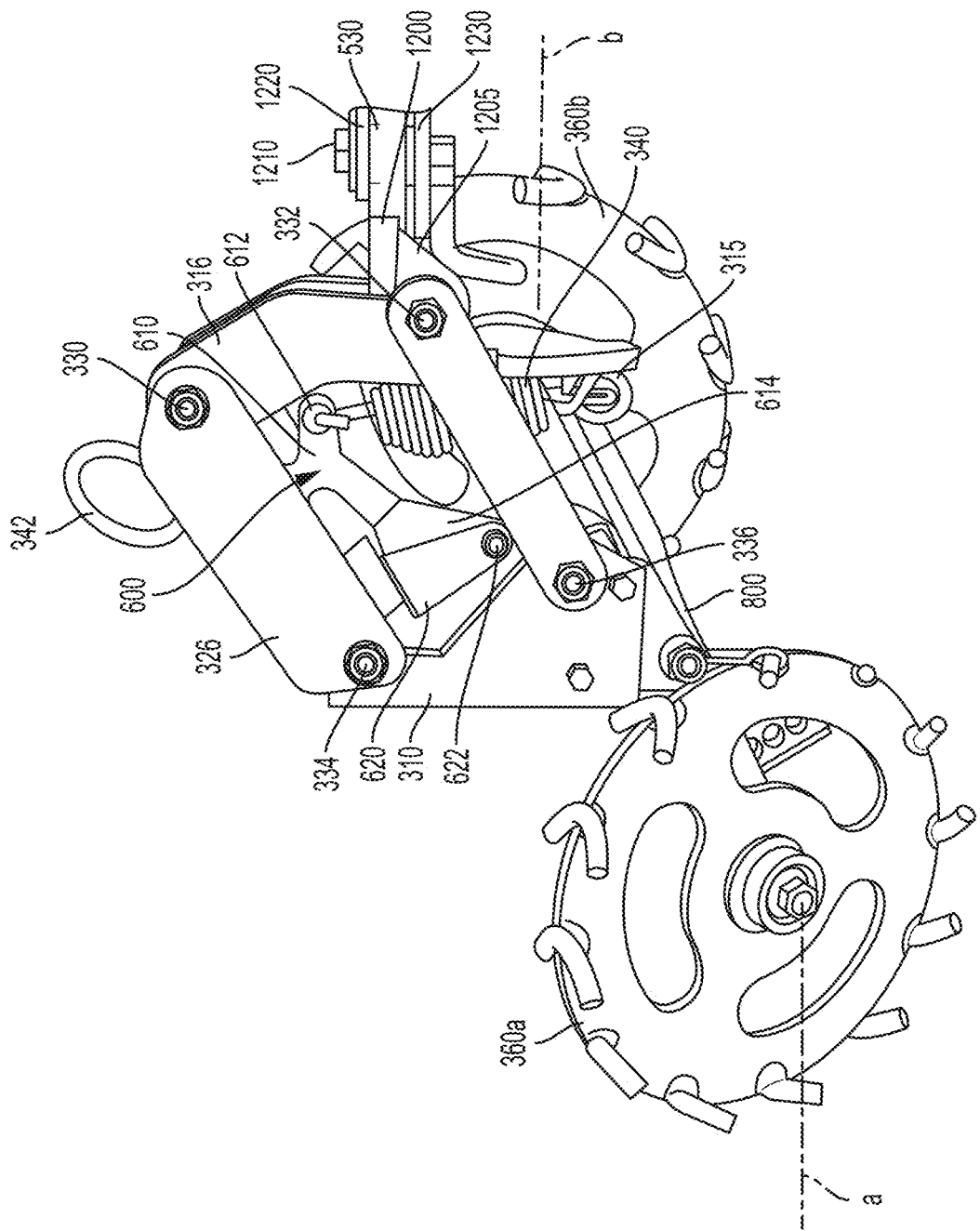
FIG. 10A is a side plane view of a trailing arm assembly forming part of the planter having closer wheel connected to a walking arm with the walking arm in a rear closing wheel down position and the rear four-link in a down position.
Figure 10B:
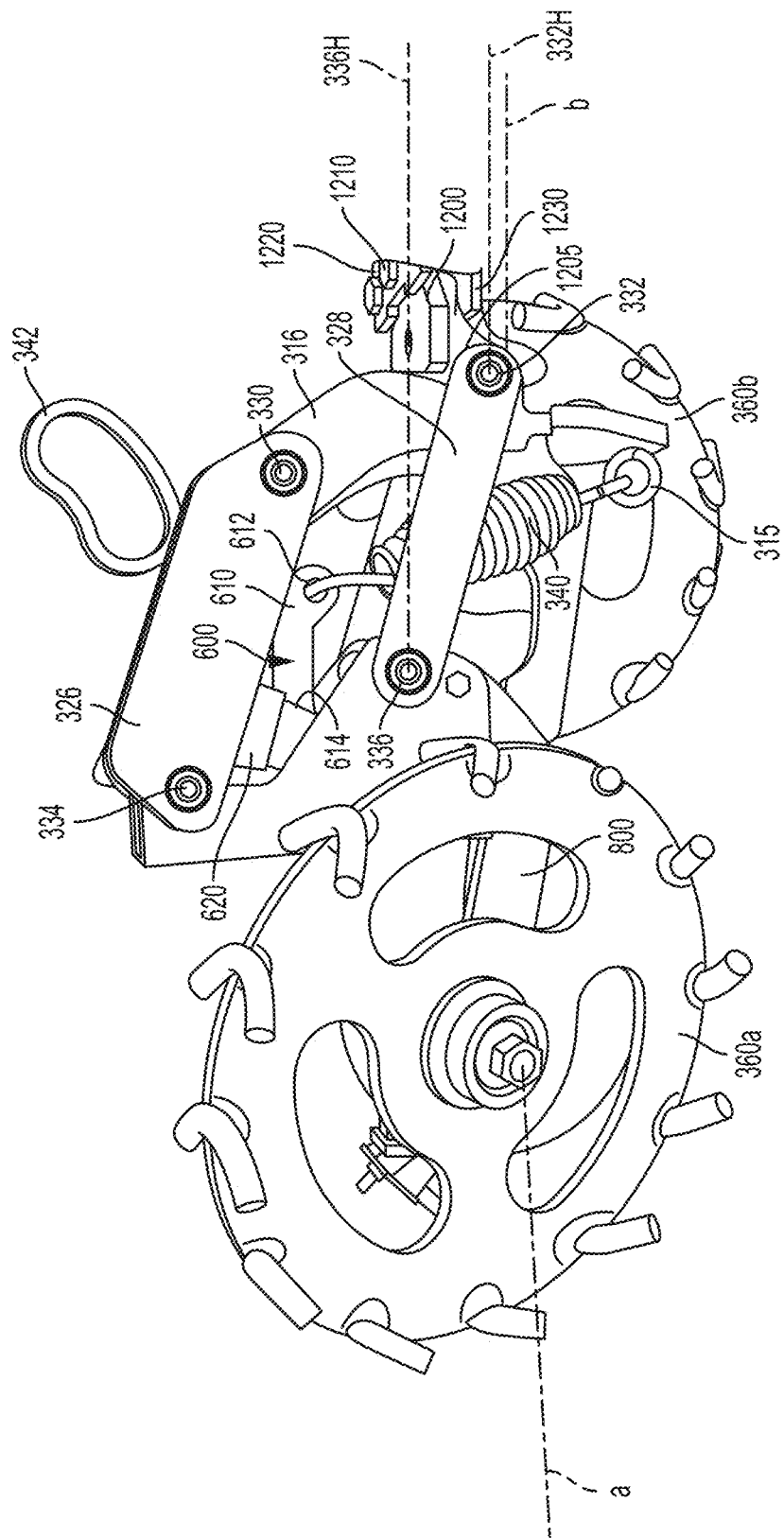
FIG. 10B is a side plane view of a trailing arm assembly forming part of the planter having closer wheel connected to a walking arm with the walking arm in a rear closing wheel upper position and the rear four-link in an upper position.

As shown in FIGS. 10A and 10B, the closing assembly 300 may provide articulation to the closing wheels and/or fertilizer disc between a lower position shown by dotted line "a" in FIG. 10A and an upper position shown by line "a" in FIG. 10B. When these articulation measurements are compared between the parallel linkage disclosed herein and the traditional swing arm linkage it is noted that the parallel linkage has, in one example, 7 inches travel compared to a similarly sized traditional setup of the swing arm linkage, which only achieves 4 inches of travel up and down. When measuring lateral movement is measured that a traditional swing arm linkage yields 2 inches of lateral movement when rotated from a down to an up position. This results in a wheel that is further away from center of Double disc openers in the 4 inches of travel. Whereas, the parallel linkage disclosed herein moves only ½ away from the center of Double Disc openers in the exemplary 7 inches of travel. The swing arm distance for closing wheels or press wheels through the range of motion is 1 inch wider when fully lifted than when down on ground contact. Whereas, the parallel linkage doesn't change throughout the 7 inches of travel. The reason is that due to the geometric configurations, the parallel linkage stays parallel, while the swing arm design makes an arch when moving up and down. By adding the parallel linkage to the closing wheels numerous unexpected benefits are realized. For example, blank areas through ditches and over the tops of terraces are limited, wheel travel can be approximately doubled over similar sized swing arm setups, the bounce in row units when planting above 5 MPH is limited, less down pressure can be run on row units, the press wheels lateral movement can be limited so the seed furrow is more consistent as the linkage flexes, there is even more depth control of planter unit, seed to soil contact is improved for uniform emergence, pinch points are minimized as the wheels travel, use with other moving devices such as the walking arms discussed herein is improved, and travel of parallel linkage can be kept parallel to the ground.

FIG. 10A shows the trailing arm assembly 300 having the closer wheel 360a connected to an articulating bracket 800 with the closing wheel 360a in a down position and the rear four-link in a down position. In this position, both closing wheels 360a, b, may be positioned below the hitch 530. FIG. 10B shows the trailing arm assembly 300 with the closer wheel 360a connected to an articulating bracket 800 in a wheel upper position and the rear four-link in an upper position. In this configuration, the rear closing wheel 360a may be close to or above the hitch 530 with the front closing wheel 360b being close to the same height as the hitch 530 or about the same height as the rear lower pivot 332. The difference in height is illustrated as the comparison between line 332H and line b. In some embodiments, the combination of the articulating bracket 800 and the rear parallel link may allow at least one of the closing wheels to articulate between at least half the wheel height and 1 and ½ wheel heights.

Figure 10C:
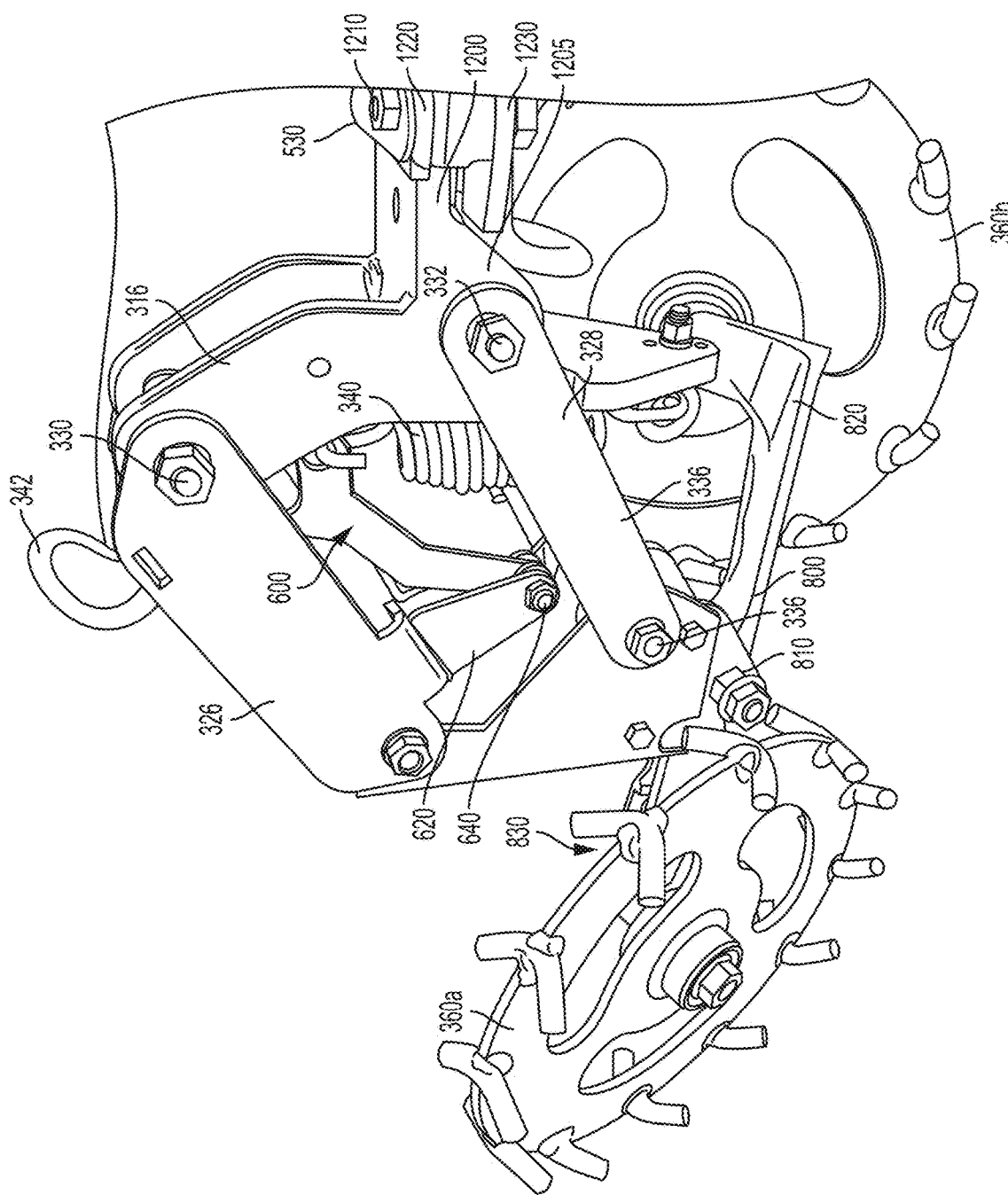
FIG. 10C is a side isometric view of a trailing arm assembly forming part of the planter having an alternate style of closer wheel.

As shown in FIGS. 10A-10C, the biasing member 340 may be adjustable via handle 342. The 340 may be attached to the anchor 315 which is located below the rear lower pivot 332. The biasing member may exert a down ward force on the upper linkage. The tension in the biasing member 340 may be adjusted via adjustment linkage 600. The biasing member 340 may attached to a first end 612 of the adjustment linkage 600. The adjustment linkage 600 may pivot about a pivot 622 that is connected to the upper linkage via bracket 620. By moving the handle 342 backwards, the adjustment linkage 600 may pivot raising the first end 612 elongating the biasing member 340 and thereby creating more tension in the member. The tension may be communicated through the pivot 622 and bracket 620 into the upper linkage creating a downward force on the linkage.

FIG. 10A-C illustrates various views of a trailing arm assembly connected to a planter with a connection in accordance with one embodiment. While the embodiments and examples provided below are described with respect to the trailing arm assembly connecting to a planter (e.g. a closing assembly connected to an opener assembly) it may be appreciated that the concepts are not so limited. For example, each of the embodiments and examples may similarly be applied to a trailing arm planter connected to the rear of a tractor or other farm implement as a person of ordinary skill in the art would understand based on the disclosure provided herein. As illustrated as an example in FIGS. 10A-C, a trailing arm assembly 300 may forwardly connect to another farm implement such as a plantar assembly 200. The plantar assembly 200 may also be a trailing arm assembly. In accordance with various embodiments, the trailing arm assembly may include frame bracket 316. The frame bracket 316 may have a connecting bracket 1200 extending therefrom. The connecting bracket 1200 may be operable to attach the trailing arm assembly 300 to another implement such as plantar 200. The connection bracket 1200 may be cantilevered from the frame bracket 316 toward the other implement such that, the connection bracket 1200 is suitably positioned to connect direct to the other implement. The connection bracket may be a plate suitable to mate flush against a planter unit (see e.g. FIG. 16B). The plate may have a thickness that allows it to be sandwiched between other plates 1220, 1230 above and below forming a double shear attachment.

In accordance with various embodiments, the connection bracket 1200 may extend from the frame bracket 316 at a location that provides suitable stability and flexibility between the trailing arm assembly (e.g. closer 300) and the other implement (e.g. planter 200). For example, the connection bracket 1200 extends from the frame bracket 316 above at least one pivot of the parallel linkage, such as the pivot 332 or the pivot 330 on the bracket 316. In a preferred embodiment, the pivot is the lower pivot 332. The connection bracket 1200 may be positioned closer to the lower pivot 332 than to the upper pivot 330. In various embodiments, the cantilevered connection bracket 1200 includes a gusset 1205 positioned to support a lower portion of the connection bracket 1200. In one example, the gusset 1205 extends from adjacent or around the lower pivot 332.

In accordance with various embodiments, the connection bracket 1200 may provide lateral movement between the trailing arm assembly and the implement it is attached to. For example, the connection bracket 1200 may include a pivot attachment 1210 such the trailing arm assembly pivots relative to the plantar around the axis device by the pivot attachment 1210. This axis may be vertical.

With respect to the various connecting brackets discussed herein, the connecting bracket (e.g. 1200) may be integrally formed with the frame bracket or it may be removably attached to the frame bracket.

Figure 11A:
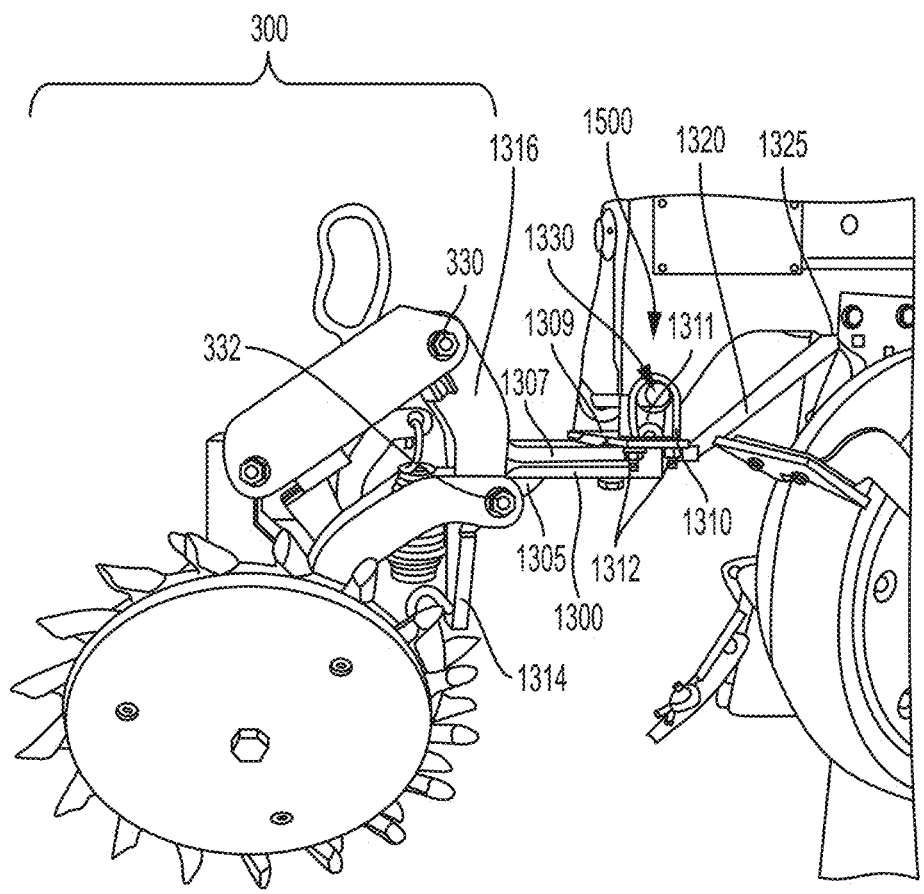
FIG. 11A is a side plane view of a trailing arm assembly connected to a planter with a connection in accordance with one embodiment.

FIG. 11A is a side plane view of a trailing arm assembly connected to a planter with a connection in accordance with one embodiment. As illustrated as an example in FIG. 11A, a trailing arm assembly 300 may forwardly connect to another farm implement such as a plantar assembly 200. The plantar assembly 200 may also be a trailing arm assembly. In accordance with various embodiments, the trailing arm assembly may include frame bracket 1316. The frame bracket 1316 may have a connecting bracket 1300 extending therefrom. The connecting bracket 1300 may be operable to attach the trailing arm assembly 300 to another implement such as plantar 200. The connection bracket 1300 may be cantilevered from the frame bracket 1316 toward the other implement, such that the connection bracket 1300 is suitably positioned to connect direct to the other implement. The connection bracket may be a plate suitable to mate flush against a planter unit (see e.g. FIG. 16B) or against an adapter.

In accordance with various embodiments, the connection bracket 1300 may extend from the frame bracket 1316 at a location that provides suitable stability and flexibility between the trailing arm assembly (e.g. closer 300) and the other implement (e.g. planter 200). For example, the connection bracket 1300 extends from the frame bracket 1316 above at least one pivot of the parallel linkage, such as the pivot 332 or the pivot 330 on the bracket 316. In a preferred embodiment, the pivot is the lower pivot 332. The connection bracket 1300 may be positioned closer to the lower pivot 332 than to the upper pivot 330. In various embodiments, the cantilevered connection bracket 1300 includes a gusset 1305 positioned to support a lower portion of the connection bracket 1300. In one example, the gusset 1305 extends from adjacent or around the lower pivot 332.

In accordance with various embodiments, the connection bracket 1300 may include plate 1307 positioned between the trailing arm assembly and the implement it is attached to. The connection bracket 1300 may include one or more features for cradling the adjacent implement. For example, the connection bracket 1300 may include one or more saddles 1311 for engaging the planter bracket. The saddle 1311 may be suitable to cradle one or more portions of the adjacent implement upon connection. For example, the saddle 1311 may be a concave notch formed within a tab extending up from the plate 1307 or the connection bracket 1300. The saddle 1311 may receive a cylindrical member 1330 that extends from or passes through the adjacent implement. The plate 1307 may have apertures 1312 positioned to receive various fasteners. In one example the apertures 1312 may be formed on a secondary plate 1309 that is wider than plate 1307. The apertures may be located to receive u-bolts 1310. The u-bolts 1310 may extend over the protrusion 1330 and pass through the apertures 1312 to be fastened on the opposing side with a fastener. In this way, the saddle 1311 engages the horizontal cylinder 1330 extending from or through the planter and the u-bolt pulls the planter towards the saddle 1311.

The connection bracket 1300 may further comprise a brace 1320 that extends from a first portion of the connection bracket 1300 longitudinally forward of the saddle 1311. The brace 1320 forms a second attachment to the adjacent implement with the saddle 1311 forming a first attachment point. The two attachment points provide greater stability and limits rotational movement about an axis that is transverse to the direction of travel of the machine. In one example the brace 1320 extends from the farthest forward portion of the connection bracket 1300 at an angle upward to connect with the planter at a connection 1325. In one example the brace may be connected approximately between the disc scrapers on the planter. In accordance with various embodiments, the brace 1320 and the saddle 1311 are integrally formed with a plate 1307. The plate 1307 is then removably attachable to the connection brace 1300 such that the brace 1320 and the saddle 1311 are removable from the trailing arm assembly 300. In this way, the trailing arm has flexibility to adapt to different connection points on different implements. For example, a John Deer planter may have a flat mounting surface whereas a Case IH planter may have an alternate mount. In accordance with various embodiments, the brace 1320 and the saddle 1311 are integrally formed with the connection bracket 1300, which is integrally formed with the frame bracket 1316.

Figure 11B:
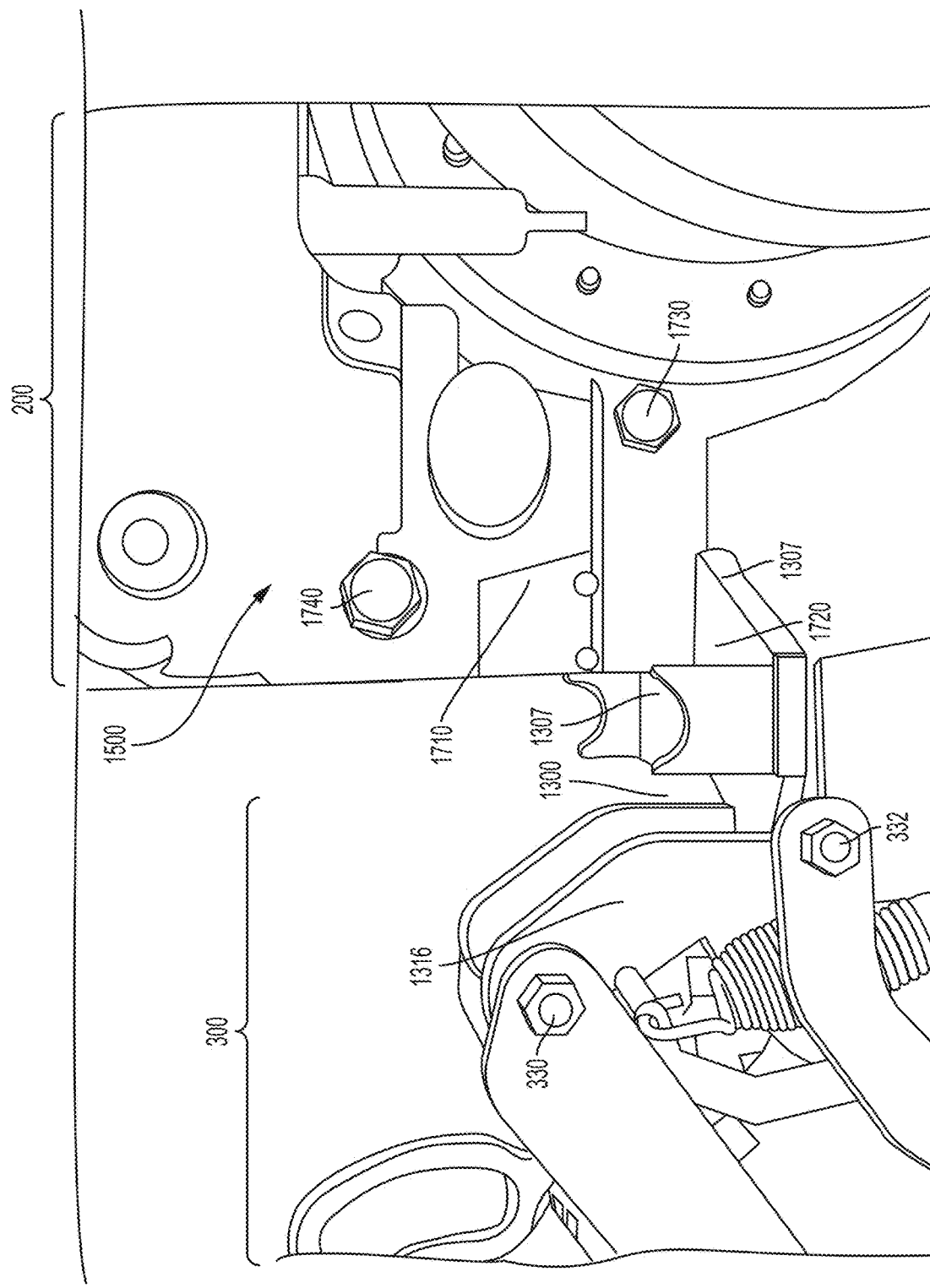
FIG. 11B is a side plane view of a trailing arm assembly connected to a planter with a connection in accordance with one embodiment.

FIG. 11B is a side plane view of a trailing arm assembly connected to a planter with a connection in accordance with another embodiment. Each of the brackets discussed with regards to this embodiment or other embodiments can have more or fewer components than those recited. For example, the embodiment shown in FIG. 11B includes a connection bracket 1300 having some similar features to those shown in the embodiment of FIG. 11A. For example, the trailing arm assembly 300 may forwardly connect to another farm implement such as the plantar assembly 200. The trailing arm assembly includes frame bracket 1316. The frame bracket 1316 may have a connecting bracket 1300 extending therefrom. The connecting bracket 1300 may be operable to attach the trailing arm assembly 300 to another implement such as plantar 200. The connection bracket 1300 may be cantilevered from the frame bracket 1316 toward the other implement, such that the connection bracket 1300 is suitably positioned to connect direct to the other implement.

The, the connection bracket 1300 may extend from the frame bracket 1316 similar to what is discuss and shown with regards to FIG. 11A. The connection bracket 1300 may include plate 1307 positioned between the trailing arm assembly and the implement it is attached to. The plate 1307 may have one or more braces extending therefrom. For example, the plate 1307 may include a horizontal brace 1720 and a vertical brace 1710. The combination of the two braces may limit rotation of the closer 300 relative to the planter 200. Each brace may have a closer end proximal to the closer assembly and a planter end proximal to the planter. The closer end may be fixedly attached to the plate 1307. The plate 1307 may be welded, fastened, or otherwise attached to the closer. The planter end of the braces may be removably attached to the planter. For example pins, bolts, or other attachment mechanisms (e.g. 1740 and 1730.) may attach the braces 1710 and 1720 to the planter In some embodiments the connector may be fixedly attached to the planter and removably attached to the closer or removably attached to both. One or both of the braces 1710, 1720 may be configured to match the form, shape, profile or other characteristic of the planter or closer. For example, one brace (e.g. 1710) can be placed between two beams of the planter so that the brace is placed in double shear. In another example, one brace (e.g. 1720) may be split in a y-shape such that the planter can have a beam pass through the brace, such that the brace holds the planter beam in double shear.

Figure 12:
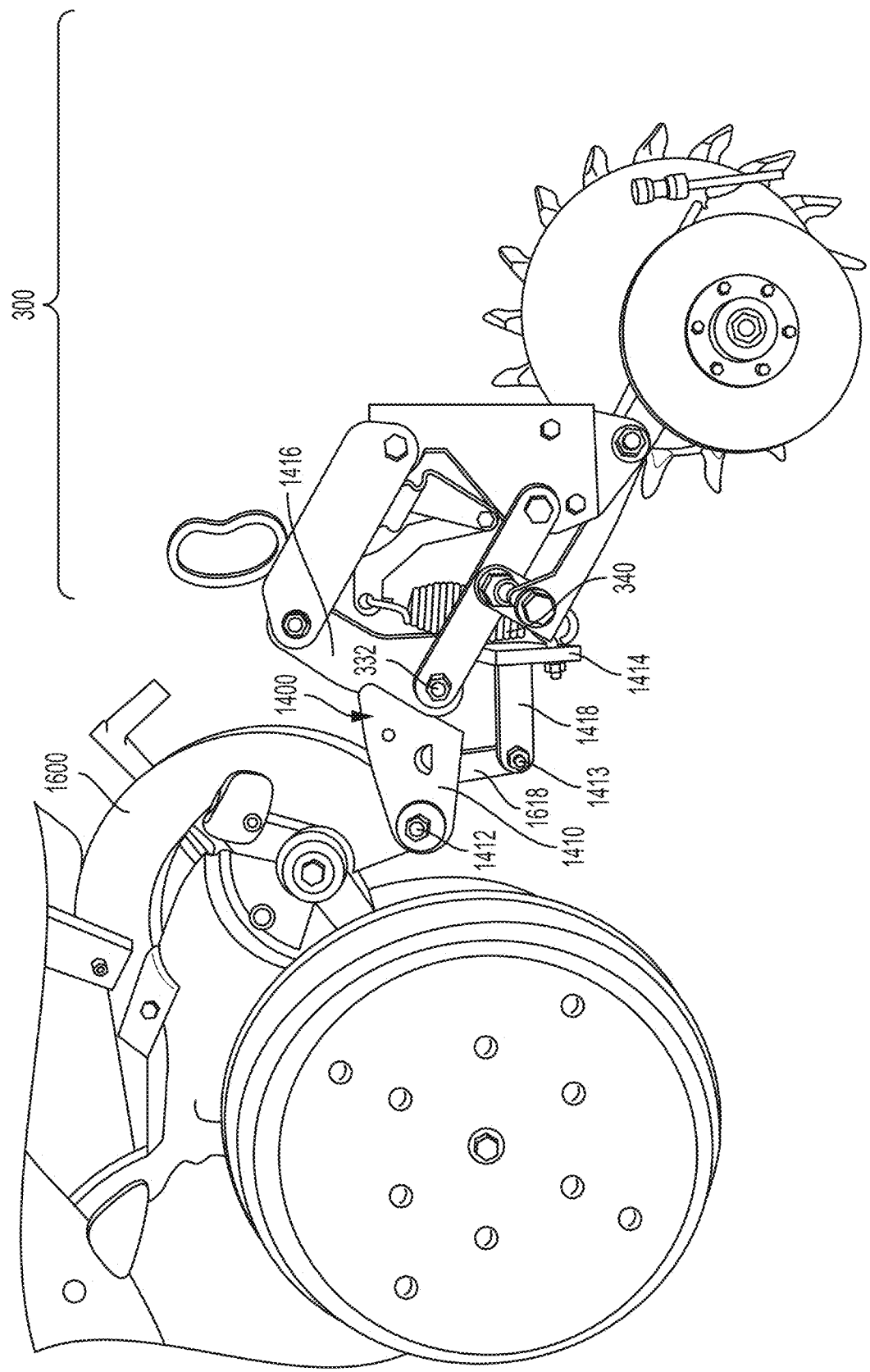
FIG. 12 is a side plane view of a trailing arm assembly connected to a planter with a connection in accordance with one embodiment.

FIG. 12 is a side plane view of a trailing arm assembly connected to a planter with a connection in accordance with one embodiment. In accordance with various embodiments, a connection bracket 1400 may include two rearwardly facing extensions. For example, a first bracket 1410 may be position above a second bracket 1418. One or both portions may be cantilevered from the frame bracket 1416. The first bracket 1410 may be near or above the lower pivot 332 with the second bracket 1418 below the first bracket. The first bracket 1410 and the second bracket 1418 are attachable to the adjacent implement via pivot points 1412 and 1413 respectively. The second bracket 1418 may connect to a bracket 1618 on the adjacent implement 1600. One or more of the first bracket 1410 and the second bracket 1418 may be attachable to the planter in double shear. For example, the first bracket 1410 includes two cantilevered tabs positioned relative to one another to engage the planter in double shear. The second bracket 1418 includes two cantilevered tabs positioned relative to one another to engage the planter in double shear. These extensions may also take other forms than tabs. The second bracket 1418 extends from a mounting plate 1414 that is proximal to a biasing member 340, wherein the second bracket 1418 and the biasing member 340 are mounted on opposite sides of the mounting plate 1414.

Figure 13A:
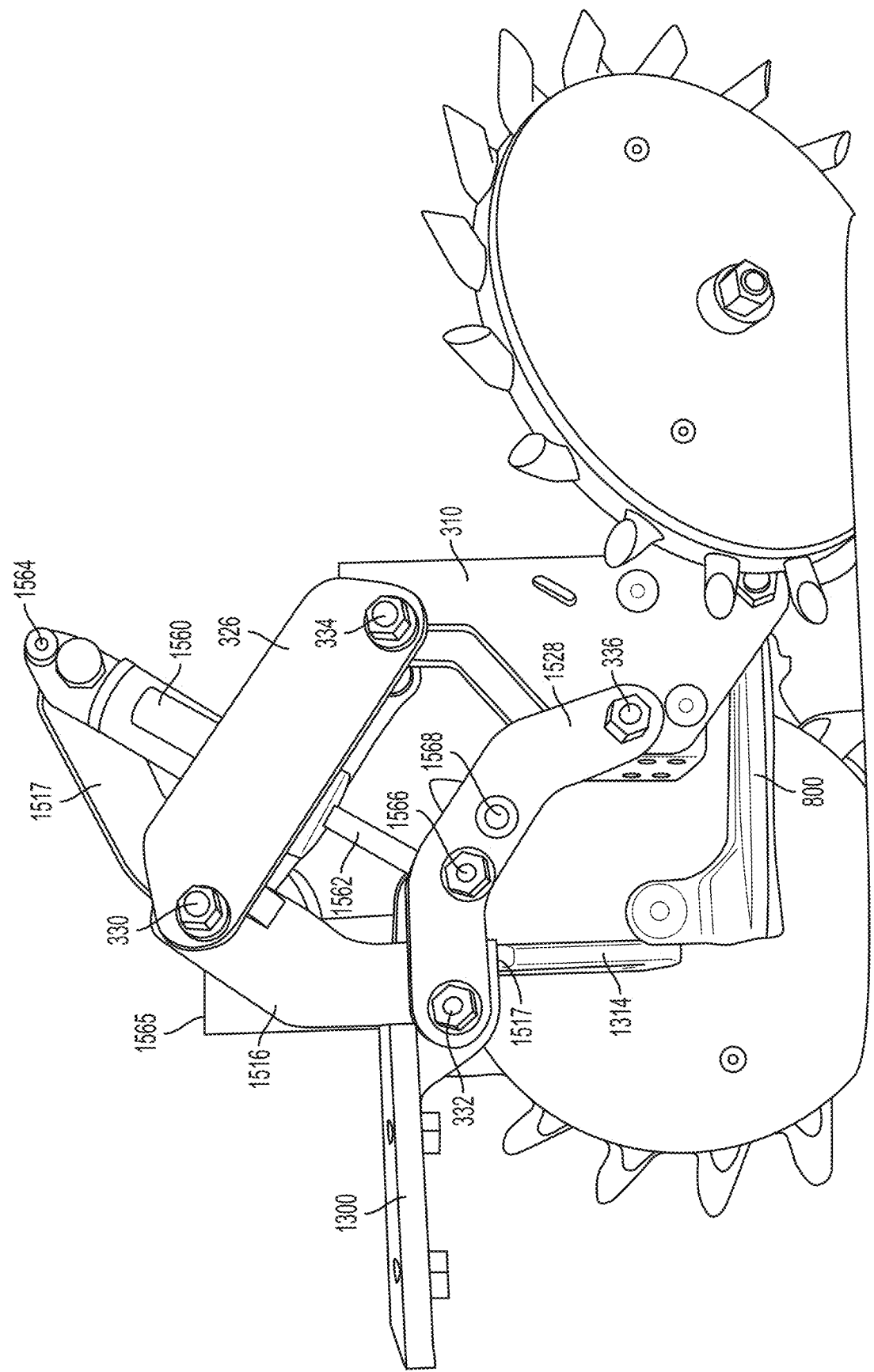
FIG. 13A is a side view of a trailing arm assembly with an alternative embodiment of the biasing member.

FIG. 13A is a side view of a trailing arm assembly with an alternative embodiment of the biasing member. As indicated above, the biasing mechanism may be any mechanism suitable to bias the furrow closer assembly 300 in either an upward or downward direction. For example, the biasing mechanism may be an extension spring, a coil spring, an air bag, a hydraulic cylinder, or similar types of mechanisms. Each of these biasing mechanisms may be structured such that they bias the furrow closer assembly 300 in a raised or lowered position. Each of these biasing mechanisms may be operable to extend or contract thereby biasing the closer assembly 300. A person of ordinary skill in the art, based on these examples, will appreciate that any of a variety of biasing members may be used within the various embodiments of the planter systems discussed herein.

In accordance with one example, as illustrated in FIG. 13A, the biasing member is a hydraulic cylinder 1560. While the biasing member is further discussed herein by way of example, as a hydraulic cylinder, it will be appreciated that the associated structure and functionality may also be utilized with other embodiments having biasing members such as an air cylinder, air bag, coil spring or the like, which can be used as alternatives. The hydraulic cylinder 1560 includes an end that is fixed relative to the furrow opener assembly 200. In FIG. 13A, the furrow opener assembly 200 is represented by the connecting bracket 1300, the frame bracket 1516, or biasing bracket 1517, which may also be fixed relative to the furrow opener assembly 200. The hydraulic cylinder 1560 also includes an end that moves relative to the furrow opener assembly 200. For example, the second end of the hydraulic cylinder 1560 moves with one or more of the links (e.g., 326, 1528) or closer bracket 310. This allows the hydraulic cylinder 1560 to bias the furrow closer assembly 300 by, for example, exerting a down pressure on the trailing arm assembly 300.

In various examples, the end of the hydraulic assembly that is fixed with respect to the furrow opener assembly 200 may be a pivot 1564 attachment. In various examples, the end of the hydraulic assembly that moves with respect to the furrow opener assembly 200 may be a pivot 1566 attachment. The pivot 1564 may be positioned on, adjacent to, or in connection with the connecting bracket 1300 or the frame bracket 1516. For example, the pivot 1564 may form a part of a biasing bracket 1517. In various examples, the biasing bracket 1517 may extend from the frame bracket 1516. The biasing bracket 1517 may be an integral extension of the frame bracket 1516 or the biasing bracket 1517 may be connected via fasteners or another bracket to the frame bracket 1516.

Figure 13B:
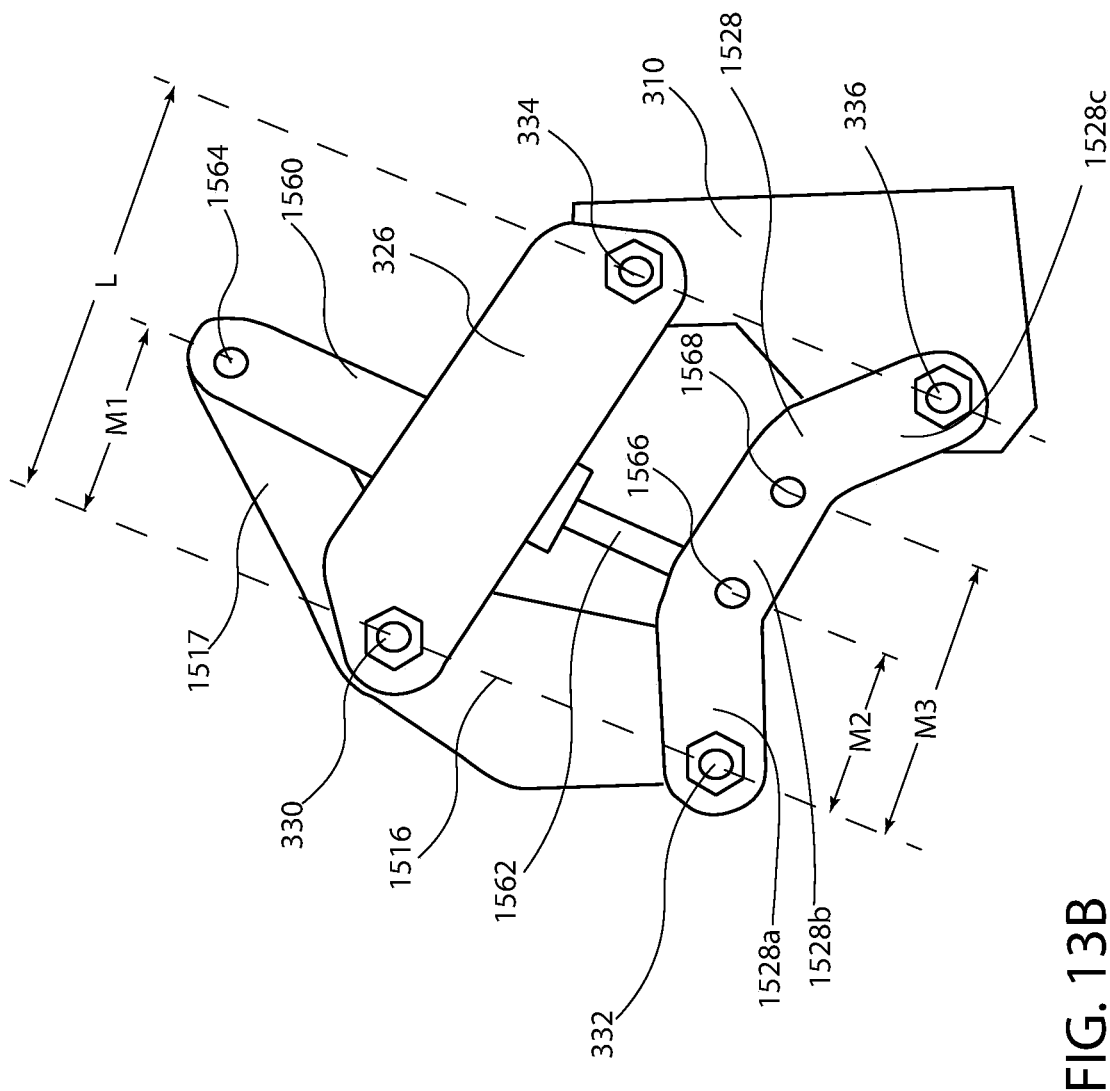
FIG. 13B is a side view of a linkage assembly with the alternative embodiment of the biasing member of FIG. 13A.

In various examples, the pivot 1566 may be located on a portion of the linkage that is movable with respect to the furrow opener assembly 200, such as one or more of the links (e.g., 326, 1528) or closer bracket 310. To maximize length and or leverage of the hydraulic cylinder 1560, the pivot 1566 may be located on the lower link 1528 or the closer bracket 310. As illustrated in FIGS. 13A and 13B and in accordance with various examples, the hydraulic cylinder 1560 extends between pivot 1564 on the biasing bracket 1517 and pivot 1566 on the lower link 1528.

In various examples, the linkage assembly includes a variety of mounting positions for the pivot 1566. The variety of mounting positions allows a user to adjust the leverage and stroke that the hydraulic cylinder inputs into the linkage assembly. The variety of mounting positions may be located on one linkage member or on more than one linkage member (e.g., 1528, 310, or 326). In one particular example, as shown in FIGS. 13A and 13B, link 1528 may include a plurality of pivot locations such as pivot 1566 and pivot 1568. These pivot locations may be apertures, fasteners, brackets, or the like suitable to form a pivotable attachment between the two components. The linkage system may have a distance L, as shown in FIG. 13B, between connected link pivots such as 332 or 336. In one example, the pivot 1566 may be positioned at a distance of M2 that is less than ½ of L away from pivot 332. In a more particular example, the pivot 1566 may be positioned at a distance of M2 that is between ¼ of L and ½ of L away from pivot 332. In still a more particular example, the pivot 1566 may be position at a distance of M2 that is about ¼ of L way from pivot 332. In one example, the pivot 1568 may be positioned at a distance of M3 that is more than 1 of L away from pivot 332. In a more particular example, the pivot 1566 may be positioned at a distance of M3 that is between ½ of L and ¾ of L away from pivot 332. In still a more particular example, the pivot 1566 may be positioned at a distance of M3 that is about % of L way from pivot 332.

The lower link 1528 may be a straight link extending between pivots 332 and 336 as shown and described in other embodiments herein. In another example, lower link 1528 may be a have a curved shape with a convex side facing the side from which the hydraulic cylinder 1560 extends. This curved shape may be defined by a plurality of straight splines forming the curve or it may have a smooth curvilinear or arched shape. As illustrated in FIG. 13B, the lower link 1528 may have a plurality of sections that provide the curved shape. For example, the low link may have a first section 1528a and a second section 1528c that support a third section 1528b that is substantially parallel with the link structure of the upper link 326. In one example, the adjustable mounting locations 1566 and 1568 are positioned along the parallel section 1528b.

In accordance with various embodiments, the pivot 1564 may be positioned relative to the one or more corresponding pivots (e.g., 1566 or 1568) such that the relationship allows for maximum stroke length and or maximum leverage. In one embodiment, the pivot 1564 may have a distance M1 from the line that passes through both link pivots 330 and 332. In one embodiment, M1 may be about the same as M2. In one embodiment, M1 may be less than M2. In one embodiment, M1 may be about the same as M3. In one embodiment M1 may be between M2 and M3. In one embodiment M1 may be more than M3.

As shown in FIGS. 13A and 13B the hydraulic cylinder 1560 is in single shear pivot attachment with biasing bracket 1517 at pivot 1564. However, it is appreciated that this system can also be structured in double shear by providing a second biasing bracket that corresponds to biasing bracket 1517 on the opposite side of the hydraulic cylinder 1560. While discussed herein with respect to the two dimensional links shown (e.g., 1516, 326, 310, and 1528) in FIGS. 13A and 13B, it should be appreciated that these various embodiments of the link system correspond to the other embodiments of the link system discussed throughout and as such while not discussed with respect to FIGS. 13A and 13B, there may be corresponding links, not shown in 13A and 13B, that make this a four link system similar to the other embodiments discussed throughout.

In accordance with various embodiments, the biasing bracket 1517 may have a sufficient length to fit the hydraulic cylinder 1560 between the pivot 1564 and the corresponding movable link that the hydraulic cylinder 1560 is attached to. The length of the hydraulic cylinder 1560 is a length sufficient to allow the closing assembly to adequately navigate over debris in the field. As one example, the hydraulic cylinder 1560 has a stroke between about 1½ inches and about 3½ inches. Depending on the geometry of the hydraulic cylinder attachments and linkage geometry, this length can correspond to a closing assembly 300 that travels between about 5½ inches and about 7½ inches. In a preferred embodiment, the cylinder includes about a 21/inch stroke (about 8 inches over collapsed length) that corresponds to a closing assembly travel of about 6 ½ inches.

The hydraulic cylinder 1560 may be a single action cylinder with a small hydraulic accumulator 1565. The hydraulic cylinder 1560 may be a self-contained system with the accumulator 1565 mounted on or near the linkage assembly such as proximal to the frame bracket 1516. The accumulator may be connected with the hydraulic cylinder 1560 in such a way as to allow the hydraulic cylinder 1560 to have a spring action that corresponds to an expandable fluid charge in the accumulator. For example, the accumulator can be charged with dry nitrogen gas that exerts a pressure on the hydraulic fluid in the hydraulic cylinder 1560 forcing the closing assembly 300 toward the ground. Other gases may be used as well. The system is adjustable with a hand pump and a quick attach hydraulic port that allows a change in the gas pressure or an increase of hydraulic fluid to increase or decrease the amount of down pressure on the closing assembly 300. In a preferred embodiment, the system produces about 100 lbs. of down force on the closing assembly 300. However, this force can be adjustable depending on the field conditions, the type of crops, or user preference. The system may be adjustable to each row or as a gang to all the row unites.

In accordance with other embodiments, the biasing mechanism may be a unit that only utilizes compressible fluids such as an air cylinder or an air bag. The structure of the system is similar to the structure discussed above. An air cylinder system utilizes similar type of cylinder and mount as the hydraulic system, but it uses air pressure to increase and or decrease the force needed to close the seed furrow. An air system ties into the farmers or planters existing air system. This air system is used to control down pressure of each row unit as an individual entity or the gang as a whole. An air system allows a user to tap into the present air system or down force system of the existing front parallel linkage system or air bag systems that many typical planters or drills have. This also allows the air system on the closing assembly 300 to maintain a substantially uniform pressure on both the opener discs. In some situations an increased air supply can provide an increase pressure on the closing system over the plantar unit. For example, when planting in a rough terrain or up and over terraces or through ditches, the pressure on the opener discs when topping a terrace will decrease, forcing air to be transferred from the front system to the back system where the press wheels need more pressure to close the seed furrow properly. Air can also be transferred from the back to the front when the closing assembly 300 bottoms out and the disc opener assembly 200 need more pressure to stay in the ground. The maximum amount of pressure may be controlled by a regulating adjustable valve on each individual row unit in line from the opener parallel down pressure system into the air cylinder. This will let the operator regulate the amount of down force or up force with this valve thus customizing each row for each and every differing planting condition in the field.

As indicated above the planter unit may utilize multiple articulating trailing arm assemblies. These assemblies may assert a uniform downward force that is generally perpendicular to the ground. This force may be beneficial to utilizing press wheels and closing wheels as they typically bring up the rear of the mechanism. In accordance with various embodiments these wheels may be a v-tined wheel suitable to condition the soil as press wheels, closing wheels, or some other implement.

Aspects of the subject matter discussed herein include the use of a wheel on the rear of an agricultural seed planter and drill. The wheel includes a center rim and tines extending from the rim. The rim may also extend radially beyond the tines such that when pressing down on top or side of the closed furrow, the rim makes small cuts into the soil to aid in the sprouting of the plant. The tines are arranged on the exterior portion of the rim such that at least a portion of at least one tine may be in contact with the soil during a full rotation of the wheel. The rim and tines press down on top of the closed furrow over the planted seed or the side of an open furrow to close the furrow. As the press wheel rotates, the tines contact the soil proximal to the location over or near the seed. As the wheel continues to rotate the tines begin to engage the soil outwardly.

In accordance with various embodiments, as shown in the top-rear perspective view of FIG. 14A, an agricultural seed planter and drill 1200 may include a tongue or hitch 1215 for hitching the planter 1200 to the hitch 1220 of the tractor 1205. The tractor 1205 tows the planter 1200 in the direction of arrow F and provides power to the agricultural seed planter and drill 1200 via a power take-off for powering the operations of the planter 1200.

As illustrated in FIG. 14A, the agricultural seed planter and drill 1200 may include a frame 1245 from which the hitch 1215 extends and the various planter components are supported. The various components of the agricultural seed planter and drill 1200 may include row units 1250 and a liquid fertilizer distribution tube 1255. The distribution tube 1255 distributes the liquid fertilizer to the various row units 1250.

In accordance with various embodiments, the agricultural seed planter and drill 1200 may have a series of the row units 1250. Each row unit may include a furrow opener disc 1260, a gage wheel 1265, a frame 1270, and a seed hopper 1275. The seed furrow opener disc 1260 creates a furrow in which the planter 1200 deposits seeds. The gage wheel 1265 assists in determining the depth at which the planter 1200 deposits the seed. The agricultural planter 1200 may have a series of trailing arm assemblies 300 each equipped with a trailing furrow closer wheel 1315 (while not shown as the wheels described herein the wheels 315 may also be the wheel 1100) followed by a press wheel assembly 1100. This configuration allows for treating the soil after the furrow has been closed by the closing wheel. In accordance with various embodiments, the wheel 1100 may form part of the main agricultural seed planter assembly 1200 or the wheel 1100 may extend off of the main agricultural seed planter assembly via a trailing arm frame 1320 or another bracket.

Figure 15:
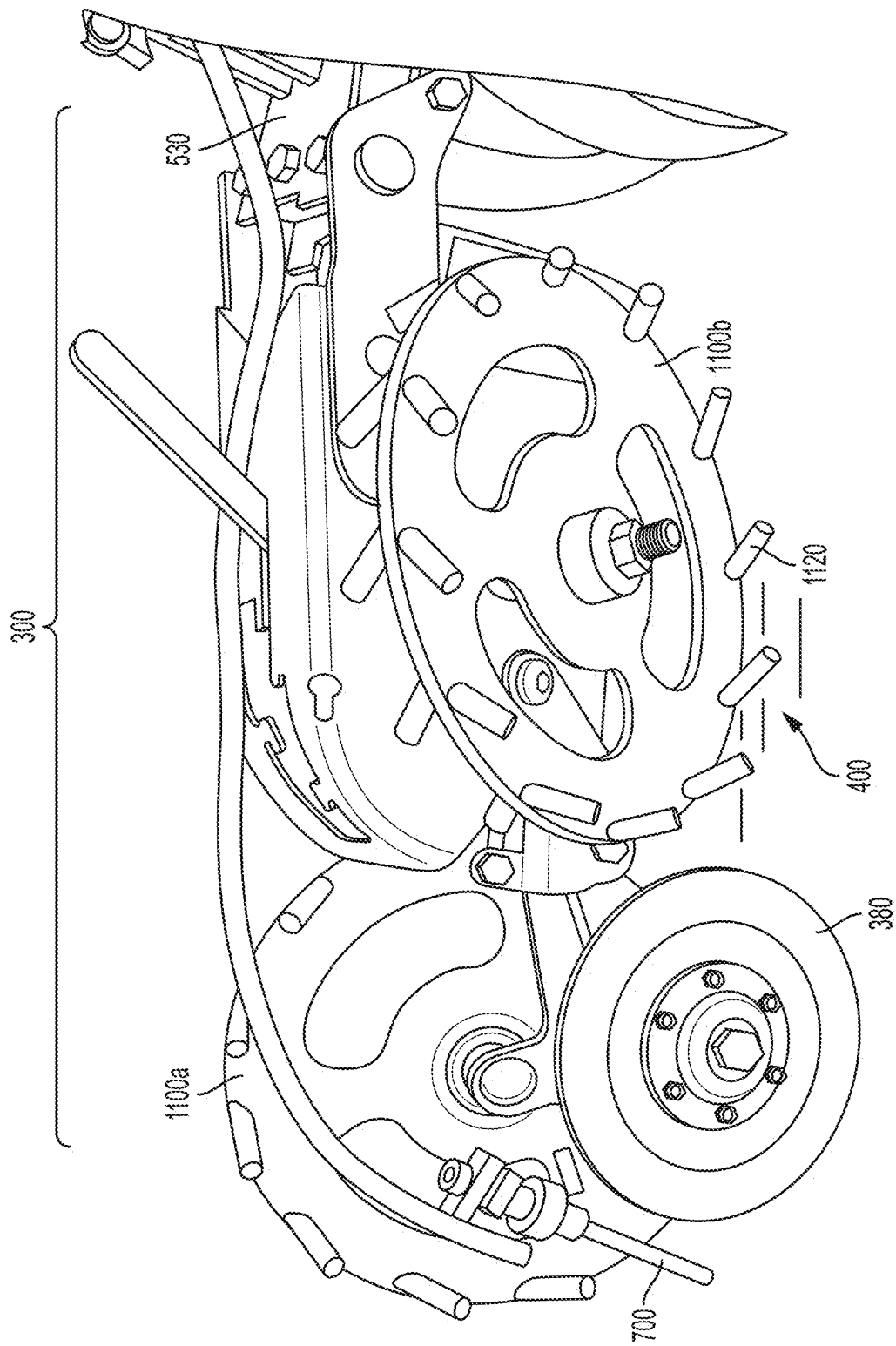
FIG. 15 illustrates a perspective view of a tail section having a closing wheel assembly in accordance with various embodiments.

In various embodiments, the planter 1200 may include a fertilizer furrow opener disc 1305 operable to cut a furrow proximal to the seed furrow 1280 for depositing fertilizer at the time of planting. In various embodiments, the planter 1200 may include a fertilizer furrow opener disc 1305 leading the furrow closer wheel 1315 (which can be wheels 1100 as shown in FIGS. 15 and 16) and/or the press wheel assembly 1100.

As described herein, the wheel 110 may be described as a press wheel however it may also be utilized as a closing wheel or other such implement suitable to condition the soil 400 in different ways. For example, the press wheel assembly 1100 may condition soil over the area affected by the closed fertilizer furrow in addition to the seed furrow 1280. Reference to wheel assembly 1100 does not limit it to such a use as other embodiments are discussed herein and a person of ordinary skill in the art understands the general application as a farm implement based on the disclosure provided herein.

Figure 14B:
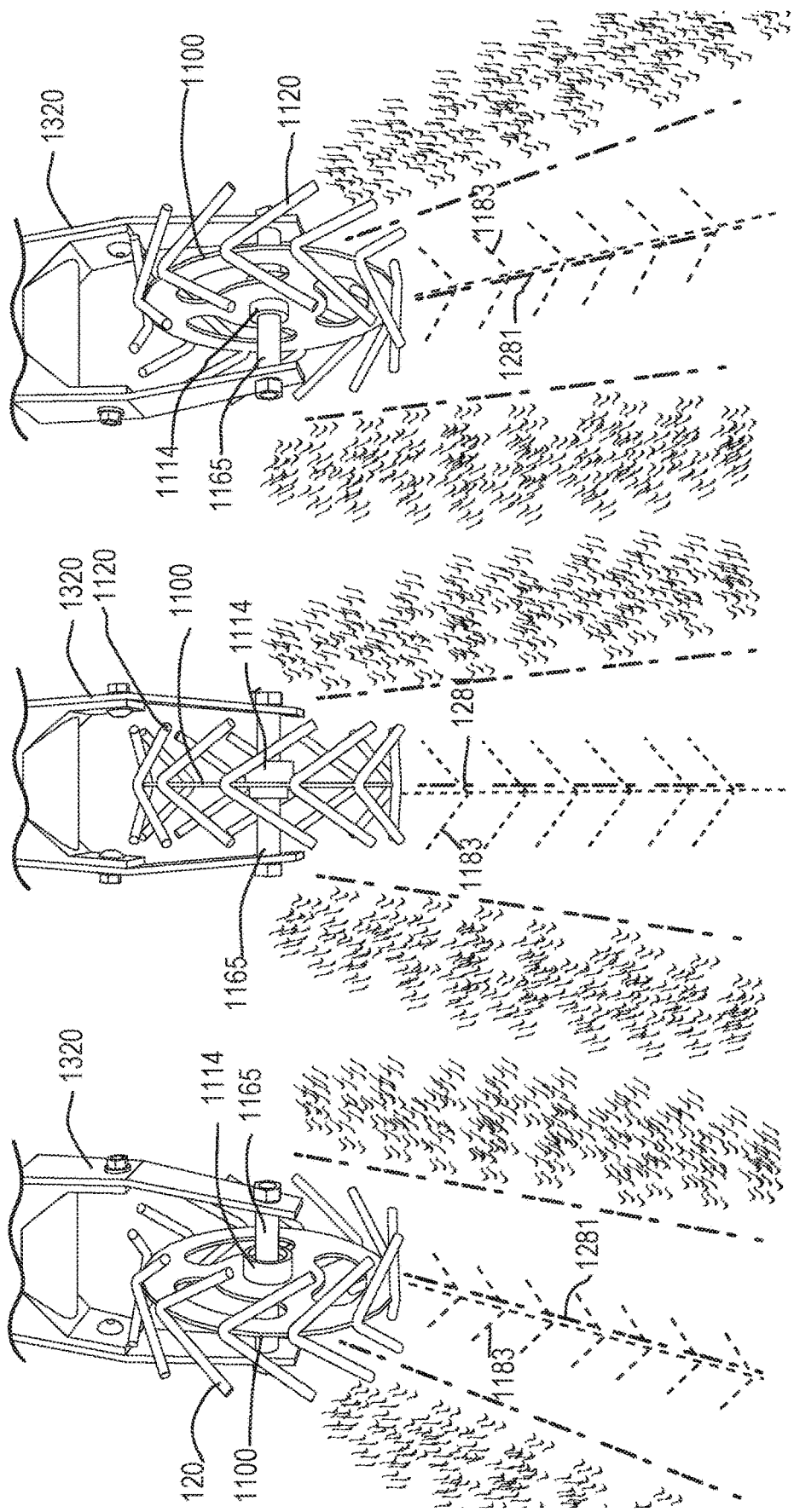
FIG. 14B illustrates a rear view of the agricultural planter showing the press wheel in accordance with an embodiment of the present invention.

In one embodiment, the closing wheels 1315 include an exterior radial surface 1340 which contacts the soil closing the open furrow. As the closing wheels 1315 close the open furrow 1280, a closed furrow seam 1281 is formed as the walls collapse against one another. In accordance with various embodiments, as illustrated in FIG. 14B and 3A-B, the press wheel 1100 may follow the closing wheels 1315 and condition the closed furrow seam 1281. In doing so, the press wheel 1100 applies a downward pressure on the closed furrow 1281. The pressure against the soil may come from tread portions 1120 and/or a rim. The pressure may be applied without applying pressure from webbing or other material linking the tread portions 1120 at any point other than that proximal to a center plane. In one example, the tread portions 1120 may extend from each side of a center plane, which as shown in FIG. 14B may be a rim. Each tread wheel may include a plurality of tread portions 1120a, 1120b, and 1120c as shown in FIGS. 16-17.

In accordance with various embodiments, the press wheel 1100 may be approximately centered on the closed furrow seam 1281. This position may be independent of the location of either the opening wheels 1260 or the closing wheels 1315. But, the closing wheels 1315 may be positioned on the sides of the open furrow 1280 in order to close the furrow. As such, additionally or alternatively the press wheel 1100 may be centered between the closing wheels. However, in embodiments with a single closing wheel or offset closing wheels, the press wheel may be positioned on the side of the closing wheel which directs soil into the open furrow. In accordance with various embodiments, the press wheel 1100 may be positioned relative to the opening wheel (or opening wheels) 1260 regardless of the presence or position of closing wheels. In such an embodiment, the press wheel 1100 may follow the opening wheel 1260. The press wheel 1100 may be positioned so that the press wheel 1100 is centered in line with or approximately in line with the location at which the opening wheel 1260 engages or is designed to engage the soil. In other embodiments, the press wheel 1100 may be offset from the location of engagement between either the opening disk and the soil or the closing disk and the sides of the furrow 1280. For example, the press wheel 1100 may be aligned such that one set of tines 1120 may extend from one side of the press wheel 1100 and may engage or press on the closed furrow seam 1281.

As the press wheel 1100 creates a downward pressure, the press wheel 1100 and the tread portions 1120 may imprint a tread pattern 1183 on the ground. The tread pattern 1183 may resemble a chicken track. The imprint pattern may be formed because the volume between tread portions 1120 may not contact the soil, limiting contact to either or both of the rim and the tread portion 1120. In one example, two lines may extend from and at an angle to a line passing at or close to the closed furrow seam 1281. The two lines may be angled in the same direction. The lines may be symmetric, having a common point meeting proximal to the center plane and pointing away from the direction of travel of the tractor 1205. In another example, the lines may be non-symmetric but still have a common point meeting proximal to the center plane and pointing away from the direction of travel of the tractor 1205. In another example, the lines may be staggered, not having a common point proximal to the center plane but still angled such that the imprint points away from the direction of travel of the tractor 1205.

U.S. patent application Ser. No. 14/835,553, filed Aug. 25, 2015, is incorporated herein by reference in its entirety and it illustrates various examples of a press wheel (e.g. 1100) that is contemplated herein and may be used in accordance with the various embodiments and examples disclosed herein.

FIG. 15 illustrates a perspective view of a tail section having a closing wheel assembly in accordance with various embodiments. In this embodiment the wheels 1100a and 1100b are positioned as closing wheels. They are staggered along an articulating bracket similar to those discussed above. The wheels are positioned on either side of a furrow and are angled with respect to the ground. In this way the outer tines, e.g. 1120 engage the soil and churn it pushing the soil into the furrow. The wheels 1100a and 1100b may be positioned at angles offside from the perpendicular with respect to the ground. The top of the wheels may extend out such that the outside tines point more directly at the soil than the inside tines do.

Figure 16A:
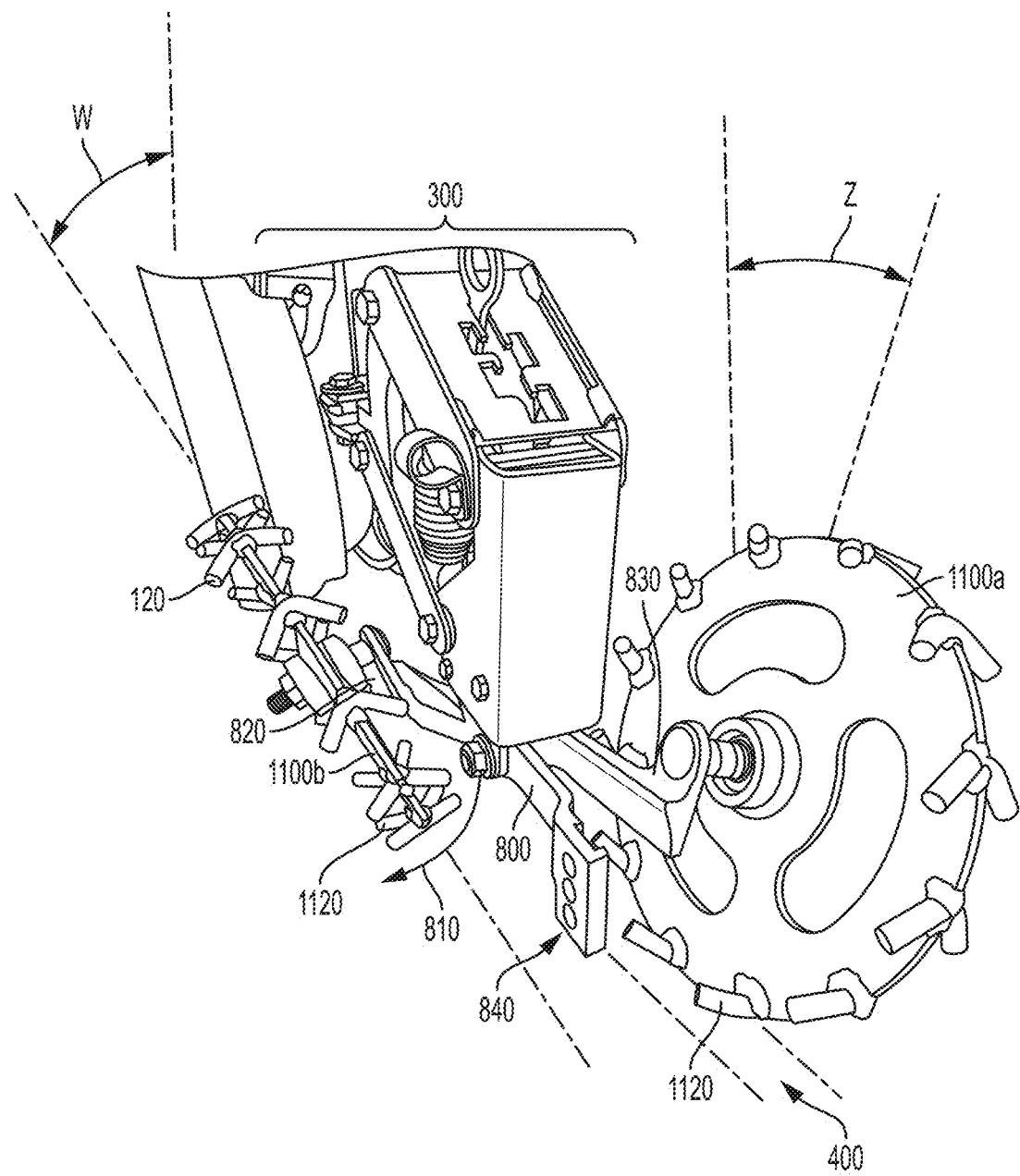
FIG. 16A illustrates a rear perspective view of a tail section having a closing wheel assembly on a walking arm in accordance with various embodiments.

FIG. 16A illustrates a rear perspective view of a tail section having a closing wheel assembly on a walking arm in accordance with various embodiments. In this embodiment the wheels 1100a and 1100b are positioned as closing wheels. They are staggered along an articulating bracket 800 with the rear wheel 1100a proximal to the rear end 830 of the bracket 800 and the front wheel 1100b proximal to the front end 820 of the bracket. The bracket 800 may pivot between the two wheels at pivot 810 which is connected to the body of the trailing arm assembly. The bracket 800 may be similar to those discussed above and those in the application incorporated by reference. The wheels are positioned on either side of a furrow and are angled with respect to the ground. The front wheel may have an angle of W and the rear wheel 1100a may have an angle of Z. The angles W and Z may be optimized to so that the outside tines engage the furrow and provide the best seed cover. In this way the outer tines, e.g. 1120 engage the soil and churn it pushing the soil into the furrow. The wheels 1100a and 1100b may be positioned at angles offside from the perpendicular with respect to the ground. The top of the wheels may extend out such that the outside tines point more directly at the soil than the inside tines do. The bracket 800 may be a part of a parallel linkage as discussed above.

Figure 16B:
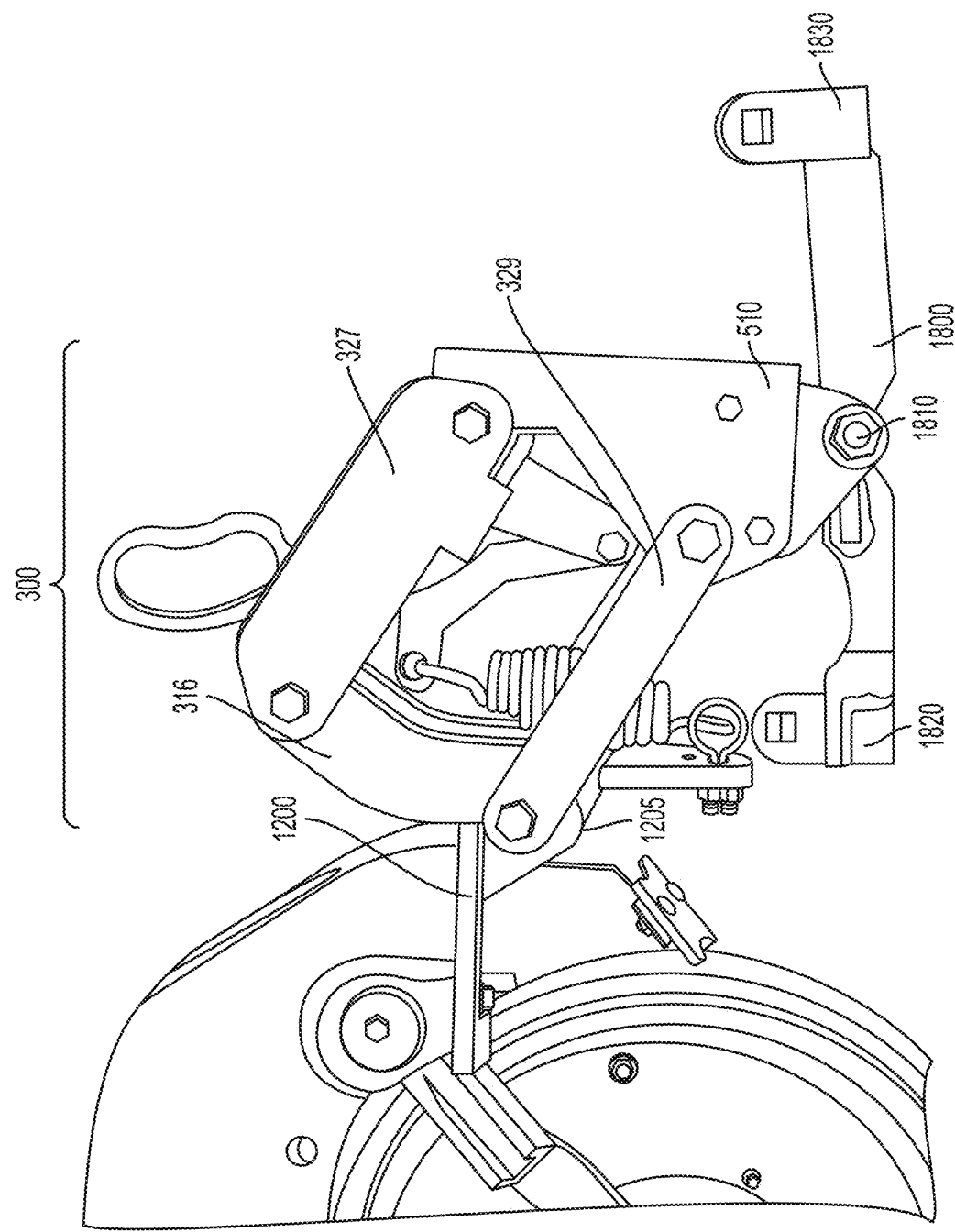
FIG. 16B illustrates a rear perspective view of a tail section having a closing wheel assembly on a walking arm in accordance with various embodiments.

FIG. 16B illustrates a rear perspective view of a tail section having a closing wheel assembly on a walking arm without a fertilizer opening disc in accordance with various embodiments. In accordance with various embodiments, a walking beam 1800 may be configured to keep substantially constant pressure on both press wheels and also keep trash and rocks from making the back of the planter bounce up and down as it travels through the field. The walking beam 1800 may be configured to do this with minimal down pressure. By combining a parallel linkage trailing assembly 300 with a walking beam 1800 bouncing and up draft on the planter units is limited. By staggering the wheels (as shown here the wheel mounting points 1820, 1830) forward and back of the center pivot 1810, a better closing action of the seed furrow is created. By having the press wheels separated so that there is minimal or no lateral overlap with one another, the competition between press wheels (i.e. the force they interact on one another) is limited. This allows, the front wheel at connection 1820 can push the soil further across or beyond the center of the furrow and when the back closing wheel at connection 1830 comes along, it pushes the soil back across tying the soil together eliminating or limiting the air pockets and the seam that cause the cracking of the closed furrow. Thus, the furrow does not open in the center of the seed V and exposing seeds. The economic loss of the furrow cracking open in less than ideal weather conditions can be devastating and can lead to having to replant acres or loss of yield at the end of the growing season. The stagger reduces this. This configuration can also reduce premature wear and tear on the bearings, making the life expectancy longer than with traditional closing wheel setups. Additionally, the walking arm 1800 allows less pressure on the planter up front because the pivoting arm is able to climb over debris in the field with its swinging action in conjunction with the four-bar linkage and have less feedback from the debris reach the planter. By providing a walking arm 1800 without a fertilizer disc, the staggered closing wheels at 1830 and 1820 are better balanced for improved performance as shown in FIG. 16B.

FIG. 16C illustrates the walking arm 1800 having an additional biasing mechanism 1890 suitable to level out the walking arm 1800 when the closing assembly is not on the ground. Specifically, this example shows a walking arm 1800 having a biased axle. As described herein with regards to FIGS. 16C-16G the axle may be a solid axle for mounting a bracket thereon, a threaded aperture for receiving a fastener to mount to a bracket, or similar structure allowing the walking arm 1800 to pivot relative to the bracket. The biased axle may include a protrusion or aperture 1920 for mounting to bracket. The protrusion or aperture may form a part of a biasing element such as block 1922. As shown in FIG. 16D the block 1922 may be cylindrical. Whereas, in another example shown in FIG. 16E the block 1922 may be more cubic. The block 1922 may be inserted into housing 1910. One or more biasing elements (e.g., 1914a, 1914b, 1914c, and 1914d in FIG. 16D and 1924a, 1924b, 1924c, and 1924d in FIG. 16E) and may fit between the block 1922 and the housing 1910. The fit is a very tight fit that limits or prevents rotation of the block 1922 relative to the housing 1910 except by flexing the biasing elements. In this way the axle 1920 only rotates relative to the housing by flexing the biasing elements. This allows the axle to remain fixed relative to the rest of the trailing arm assembly 300 while the walking arm 1800 rotates relative thereto. However the biasing elements will bias the walking arm 1800 back to its original shape when ground pressure is removed from the wheels attached to the walking arm. The biasing elements may be elastomeric cords that extend through the housing 1910. For example, the biasing elements may be rubber cords that are about 2-3 inches long in a square tube. The square tube in one example is about 2 inches by 2 inches but may be larger or smaller or other shapes. The axel shaft 1920 can be tapped for a bolt on each end for holding it in place. The biasing elements may be selected to obtain a biasing force that is greater to equal to the weight of implements mounted onto each end of the walking arm 1800. For example, the biasing elements together may provide a biasing force of between 5 lbs. and 10 lbs. of centering ability. In one example, the walking beam moves up about 2 ½ inches from center and about 2 ½ inches down from center for a total of about 5 inches of overall travel. This torsion assembly can be used to center up the assembly when the planter is raised.

FIG. 16F illustrates another embodiment of the walking arm 1800 having an additional biasing mechanism 1890 suitable to level out the walking arm 1800 when the closing assembly is not on the ground. In this embodiment bout the housing 1910 and a biasing block 1934 are round. A round axle 1920 then fits within the round biasing block 1934. In this embodiment, an oversized round rubber bushing may be used as the biasing block 1934. The biasing block 1934 has a metal tube or shaft 1920 molded into it for mounting with an exterior bracket. The shaft 1920 may be the size of bolt with bolt type threads or no threads. Alternatively the shaft 1920 may be a shaft with a hole in the center for a bolt to be threaded into it. This shaft 1920 holds the biasing mechanism in place on the closing assembly 300. The biasing block 1934 is over sized for the aperture that defines the housing 1910, which can be a cylindrical shaped tube. The biasing block 1934 is pressed into the housing 1910. The rubber bushing could be made to flex allowing the shaft 1920 to pivot relative to the housing 1910, which in turn allows the walking beam to pivot up and down relative to the closing assembly 300 with minimal pressure exerted by the press wheels when engaged in the soil. The pivot bushing gives a range of motion both ways from center when engaged in the soil and then when the planter was picked up it would center itself. The bushing is strong enough to center everything on the walking beam 1800 back up when the planter was raised.

Figure 16H:
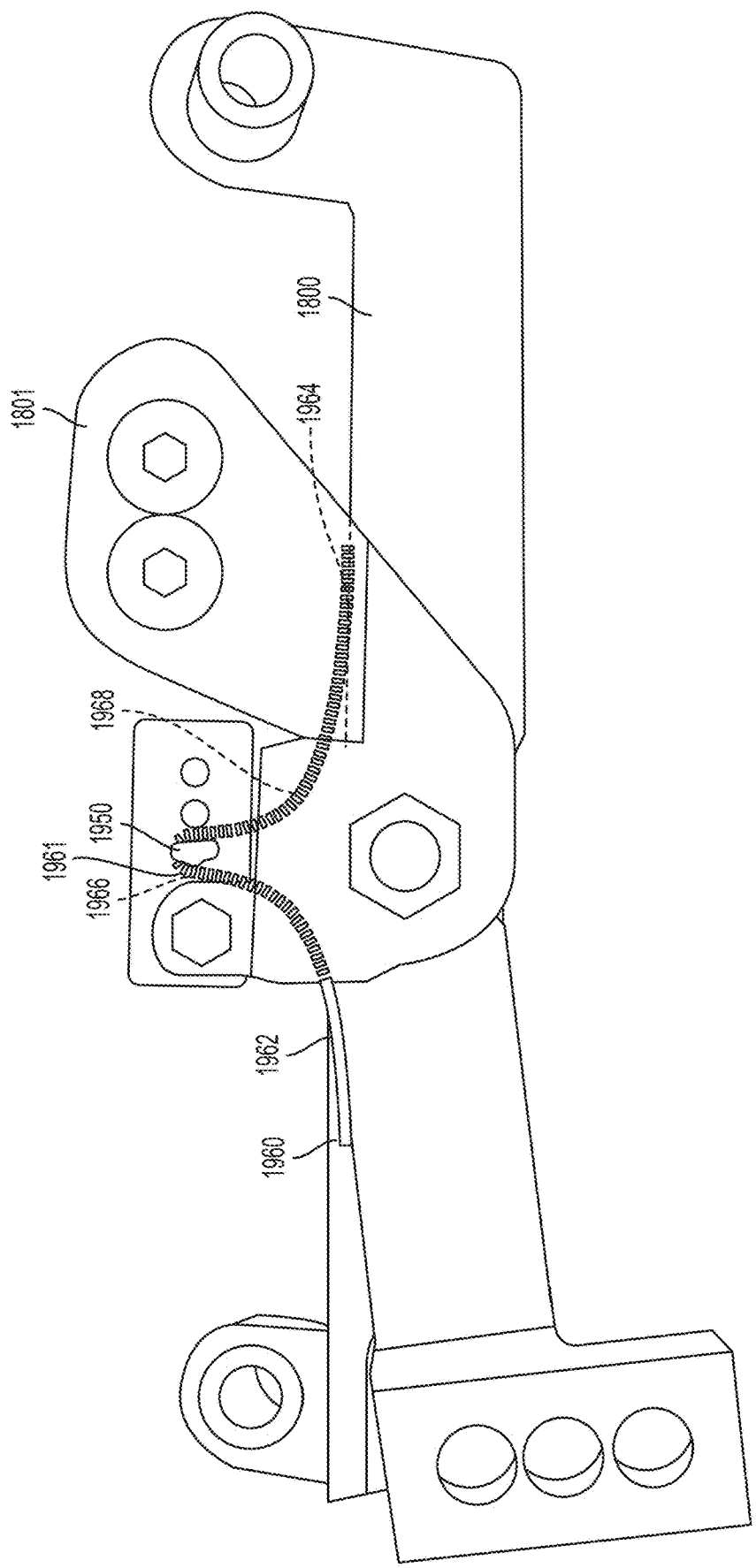
FIG. 16H illustrates a side perspective view of a biased walking arm in accordance with various embodiments.
Figure 16I:
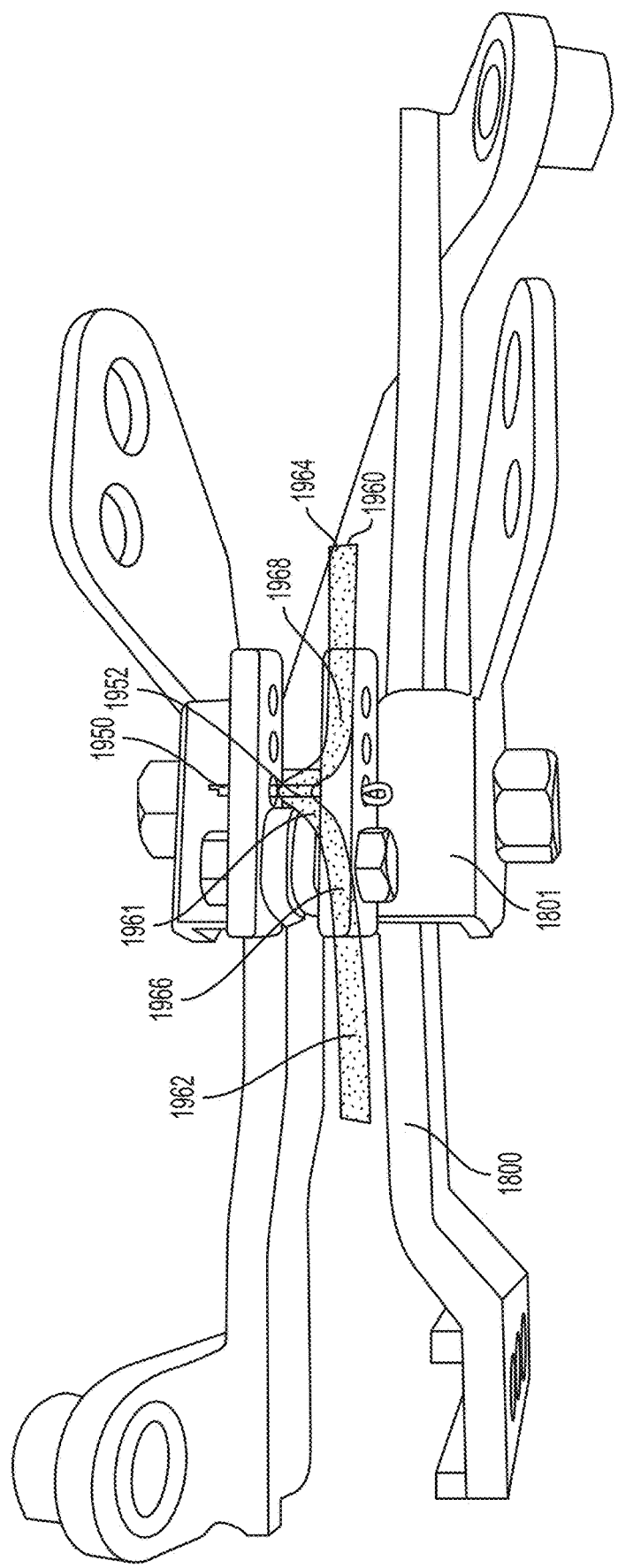
FIG. 16I illustrates a top perspective view of a biased walking arm in accordance with various embodiments.

FIGS. 16H and I illustrate a flat spring biasing mechanism for walking beam 1800. The flat spring 1960 may contact the top of the walking beam 1800 on each side of its pivot. However, the flat spring 1960 may be formed over an offset 1950 such that the pin will not pivot around the same axis as the walking beam 1800. This allows a first end 1962 of the flat spring to exert a force against the walking beam on a first end when the beam presses into it and also allows the flat spring to exert a force against the walking beam on a second end 1964 when the beam on that side presses into it. The spring may bend up at bends 1968 and 1966 and the fold back at inflection 1961. This shape places the point the spring 1960 would pivot (i.e. at offset 1950) at a point offset from the pivot of the walking beam 1800. The spring may be support at the offset 1950 by a pin. This spring set up would be like having a balanced teeter totter so it would cause the walking beam 1800 to rest and return to a neutral position when no force is exerted on the beam 1800. In one example, the flat spring may be from about ½ inch to about ⅝ inch. In one example, the spring is suitable to exert from about 10 pounds to about 12 pounds of pressure to center the walking beam axle.

Figure 16J:
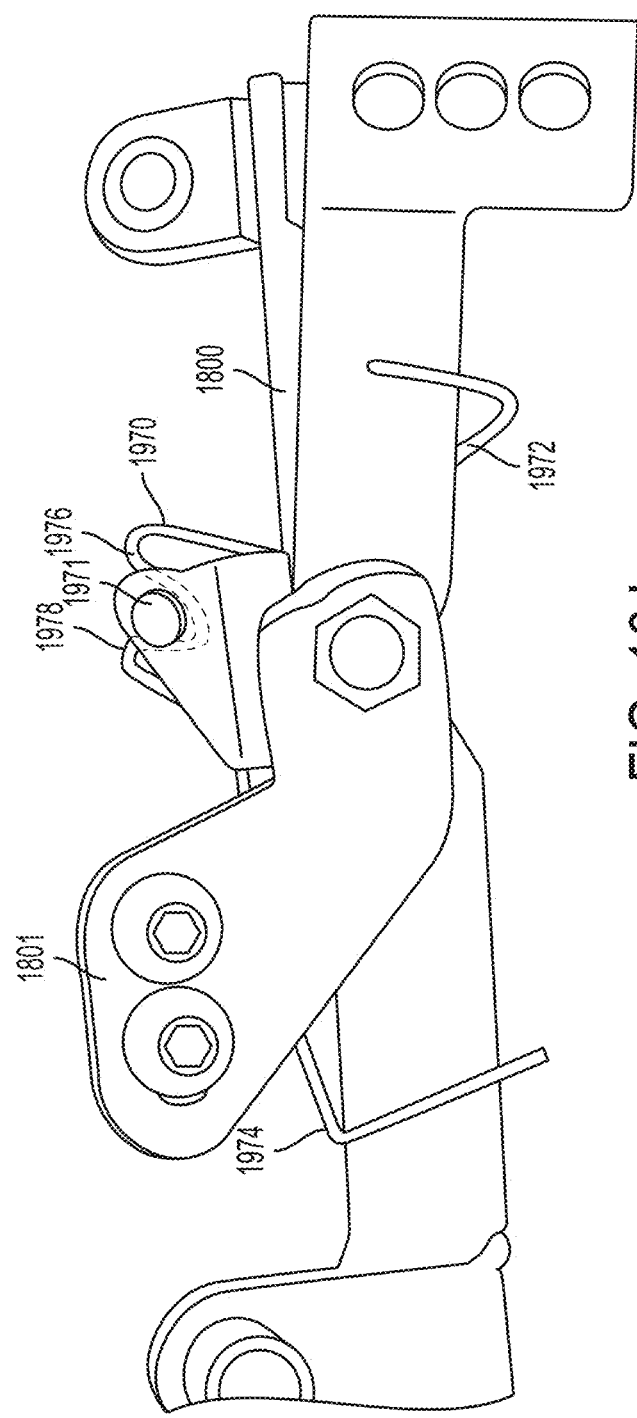
FIG. 16J illustrates a side perspective view of a biased walking arm in accordance with various embodiments.

FIG. 16J illustrates wire spring 1970 biasing mechanism for walking beam 1800. The wire spring 1970 includes a wire that extends to either side of the walking beam 1800 pivot. One side of the wire spring 1970 has a hook 1974 that retains the top of the walking beam 1800 and the other side of the wire spring 1970 has a hood 1972 that retains the bottom of the walking beam. The middle portion of the wire spring 1970 includes two wire portions 1978 and 1976 that engage either side of an offset 1971. The offset is positioned above or below the walking beam 1800 pivot. The engagement between the offset 1971 and the two wire portions biases the hook portions of the wire 1974 and 1972, which in turn biases the walking beam into a neutral position. The spring is sufficiently strong to bias the walking beam 1800 into a neutral position when it is fully loaded with implements such as closing wheels, opening wheels, fertilizer discs or the like.

While discussed with respect to the various embodiments discussed herein as two parallel linkage assemblies, it is understood that only the planter may be a parallel linkage assembly, only the closer may be a parallel linkage assembly, both may be parallel linkage assemblies, or in various embodiments employing the various wheel structures discussed herein or other inventive laments as understood from the disclosure provided herein, neither the planter or closer are parallel linkage assemblies. As illustrated in these alternative examples, the various embodiments, aspects, or examples may be variously combined with other embodiments, aspects, or examples of the various inventive concepts disclosed herein.

Although various representative embodiments of this invention have been described above with a certain degree of particularity, those skilled in the art could make numerous alterations to the disclosed embodiments without departing from the spirit or scope of the inventive subject matter set forth in the specification and claims. The various embodiments discussed herein are not exclusive to their own individual disclosures. Each of the various embodiments may be combined with or excluded from other embodiments. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A trailing arm assembly for connection with a row unit of an agricultural planter, the trailing arm assembly comprising:
   a closer frame configured for mounting one or more closing wheels thereto for rotation with respect to the closer frame and further comprising a connection portion;
   a parallel linkage configured to pivotably connect the closer frame to a planter frame bracket of the row unit via a first pivot and a second pivot on a first end of the parallel linkage and to pivotably connect with the connection portion of the closer frame via a third pivot and a fourth pivot on a second end of the parallel linkage; and
   an adjustable hydraulic cylinder or air cylinder pivotably connected to the closer frame at a first end and pivotably connected to the parallel linkage at a second end, wherein the adjustable hydraulic cylinder or air cylinder is configured to provide a downward force on the closer frame;
   a walking arm assembly pivotally connected to the closing frame, wherein the walking arm assembly includes a first closing wheel rotationally mounted toward a first end of the walking arm assembly and a second closing wheel rotationally mounted toward a second end of the walking arm assembly such that as the first closing wheel lifts, the second closing wheel drops and vice versa;
   wherein:
      a first end of the hydraulic cylinder or air cylinder is configured to be fixed with respect to the planter frame bracket and a second end of the hydraulic cylinder or air cylinder is configured to move with respect to the planter frame bracket;
      the first end of the hydraulic cylinder or air cylinder is configured to be pivotably mounted to the closer frame at a position above a plane containing the first pivot and the second pivot; and.
      the first end of the hydraulic cylinder or air cylinder is configured to be pivotably mounted in double shear with respect to the closer frame.

2. The trailing arm assembly of claim 1, wherein the parallel linkage is connected between the closer frame and the planter frame bracket such that the parallel linkage maintains a parallel orientation of the closer frame with respect to the planter frame bracket, which parallel orientation is orthogonal to the downward force exerted by the adjustable hydraulic cylinder or air cylinder on the closer frame.

3. The trailing arm assembly of claim 2, wherein the parallel linkage is a four bar parallel linkage having an upper pair of links attached to the closer frame at the second pivot and a lower pair of links attached to the closer frame at the fourth pivot.

4. The trailing arm assembly of claim 3, wherein the upper pair of links is cross-braced with one or more plates forming a continuous frame between a first side and a second side of the upper pair of links.

5. The trailing arm assembly of claim 3, wherein the lower pair of links in the four bar parallel linkage are cross-braced with one or more plates forming a continuous frame between a first side and a second side of the lower pair of links.

6. The trailing arm assembly of claim 3, wherein
   the upper pair of links rotates about the first pivot at a first end and rotates about the second pivot at a second end; and
   the lower pair of links rotates about the third pivot at a first end and rotates about the fourth pivot at a second end.

7. The trailing arm assembly of claim 3, wherein the adjustable hydraulic cylinder or air cylinder is attached to the closer frame below the lower pair of links.

8. The trailing arm assembly of claim 3, wherein adjustment of the adjustable hydraulic cylinder or air cylinder in a first manner causes the downward force applied by the adjustable hydraulic cylinder or air cylinder on the closer frame to increase and adjustment of the adjustable hydraulic cylinder or air cylinder in a second manner causes the downward force applied by the adjustable hydraulic cylinder or air cylinder on the closer frame to decrease.

9. The trailing arm assembly of claim 1, wherein the adjustable hydraulic cylinder or air cylinder is attached to the closer frame below at least one of the pivots of the parallel linkage.

10. The trailing arm assembly of claim 1, further comprising a press wheel pivotally connected to the closing frame and mounted behind the first and second closing wheels.

11. The trailing arm assembly of claim 1, wherein
   the parallel linkage is a four bar parallel linkage having an upper pair of links attached to the closer frame at the second pivot and a lower pair of links attached to the closer frame at the fourth pivot; and
   the second end of the hydraulic cylinder or air cylinder is pivotably connected to the lower pair of links.

12. The trailing arm assembly of claim 11, wherein the lower pair of links are configured with a midsection that extends above a plane containing the third and fourth pivots; and
   the pivotable connection of the second end of the hydraulic cylinder or air cylinder to the lower pair of links is above a plane containing the third and fourth pivots.

13. The trailing arm assembly of claim 12, wherein the pivotable connection of the second end of the hydraulic cylinder or air cylinder to the lower pair of links is variable between several positions on lower pair of links.

14. The trailing arm assembly of claim 13, wherein the pivotable connection of the second end of the hydraulic cylinder or air cylinder to the lower pair of links is positioned forward of a midpoint of the lower pair of links between the third pivot and fourth pivot and forward of the position of the first end of the hydraulic cylinder or air cylinder between the first pivot and the second pivot.

15. The trailing arm assembly of claim 13, wherein the pivotable connection of the second end of the hydraulic cylinder or air cylinder to the lower pair of links is positioned rearward of a midpoint of the lower pair of links between the third pivot and fourth pivot and rearward of the position of the first end of the hydraulic cylinder or air cylinder between the first pivot and the second pivot.

16. The trailing arm assembly of claim 1, wherein the hydraulic cylinder is a single action cylinder with a self-contained hydraulic accumulator.

17. The trailing arm assembly of claim 1, wherein the hydraulic cylinder is adjustable to provide up to 100 pounds for the downforce.

* * * * *